United States Patent
Daley

(10) Patent No.: US 10,054,983 B2
(45) Date of Patent: Aug. 21, 2018

(54) WEARABLE PROPPING DISPLAY APPARATUS IMPROVEMENTS

(71) Applicant: Charles Augustus Daley, Rawai (TH)

(72) Inventor: Charles Augustus Daley, Rawai (TH)

(*) Notice: Subject to any disclaimer, the term of this patent is extended or adjusted under 35 U.S.C. 154(b) by 22 days.

(21) Appl. No.: 14/999,812

(22) Filed: Jul. 5, 2016

(65) Prior Publication Data

US 2016/0320795 A1 Nov. 3, 2016

Related U.S. Application Data

(63) Continuation-in-part of application No. 14/999,009, filed on Mar. 17, 2016, which is a continuation-in-part of application No. 14/998,517, filed on Jan. 13, 2016, which is a continuation-in-part of application No. 14/757,169, filed on Nov. 30, 2015, which is a continuation-in-part of application No. 14/121,914, filed on Nov. 3, 2014.

(60) Provisional application No. 62/391,813, filed on May 12, 2016, provisional application No. 62/391,775, filed on May 11, 2016, provisional application No. 62/231,806, filed on Jul. 16, 2015, provisional application No. 62/230,926, filed on Jun. 19, 2015, provisional application No. 62/230,065, filed on May 27, 2015, provisional application No. 62/179,821, (Continued)

(51) Int. Cl.
*G06F 1/16* (2006.01)
*A45F 3/02* (2006.01)
*A45F 5/00* (2006.01)

(52) U.S. Cl.
CPC ............. *G06F 1/163* (2013.01); *A45F 3/02* (2013.01); *A45F 5/00* (2013.01); *G06F 1/1616* (2013.01); *G06F 1/1628* (2013.01); *G06F 1/1643* (2013.01); *G06F 1/1675* (2013.01); *G06F 1/1698* (2013.01); *A45F 2005/006* (2013.01); *A45F 2200/0525* (2013.01); *G06F 2200/1632* (2013.01); *G06F 2200/1633* (2013.01)

(58) Field of Classification Search
CPC ...... G06F 1/163; G06F 1/1616; G06F 1/1628; G06F 1/1643; G06F 1/1675; G06F 1/1698; G06F 2200/1633; G06F 2200/1632; A45F 3/02; A45F 5/00; A45F 2200/0525; A45F 2005/006
See application file for complete search history.

(56) References Cited

U.S. PATENT DOCUMENTS 1,232,089 A * 7/1917 Riebe .................... A47B 23/002
108/43
4,715,293 A * 12/1987 Cobbs .................. A47B 23/002
108/43
(Continued)

FOREIGN PATENT DOCUMENTS

WO WO-0201932 A1 * 1/2002 ........... G06F 1/1628

*Primary Examiner* — Michael C Zarroli

(57) ABSTRACT

Disclosed in this application are: 1) several arrangements and features to slidably and/or pivotally attach a display panel to a holder, cover or computing unit panel on a bag computer; 2) several wearable display arrangements based on the bag computer front wall and pivoting display panel format with the display propped against the operator and in his view; 3) removable interface between an operator and a portable display/computer for wearable use and including various computer accessories; 4) a display for mounting to a bag's back wall so it can be propped against the operator for wearable viewing.

26 Claims, 27 Drawing Sheets

Related U.S. Application Data filed on May 20, 2015, provisional application No. 62/179,337, filed on May 5, 2015, provisional application No. 62/178,802, filed on Apr. 20, 2015, provisional application No. 62/177,911, filed on Mar. 27, 2015, provisional application No. 62/177,589, filed on Mar. 19, 2015, provisional application No. 62/177,182, filed on Mar. 9, 2015, provisional application No. 62/125,127, filed on Jan. 14, 2015.

(56) References Cited

U.S. PATENT DOCUMENTS

| | | | | |
|---|---|---|---|---|
| 5,649,654 | A * | 7/1997 | Hayward, Jr. | A45F 5/00 108/43 |
| 5,667,114 | A * | 9/1997 | Bourque | A45F 5/00 224/257 |
| 6,349,864 | B1 * | 2/2002 | Lee | A45F 3/14 224/257 |
| 6,384,810 | B1 * | 5/2002 | Selker | G06F 1/163 345/156 |
| 6,659,319 | B2 * | 12/2003 | Purpura | A45C 9/00 224/270 |
| 8,418,629 | B2 * | 4/2013 | Yu | A45F 5/00 108/43 |
| 8,881,961 | B1 * | 11/2014 | Cibirka | A45F 5/00 2/268 |
| 9,504,300 | B1 * | 11/2016 | Donahue | A45F 5/00 |
| 9,690,327 | B2 * | 6/2017 | Kielland | G06F 1/1633 |
| 2009/0272779 | A1 * | 11/2009 | Vu | A45F 5/00 224/677 |
| 2013/0038995 | A1 * | 2/2013 | Fang | F16M 11/10 361/679.03 |

* cited by examiner

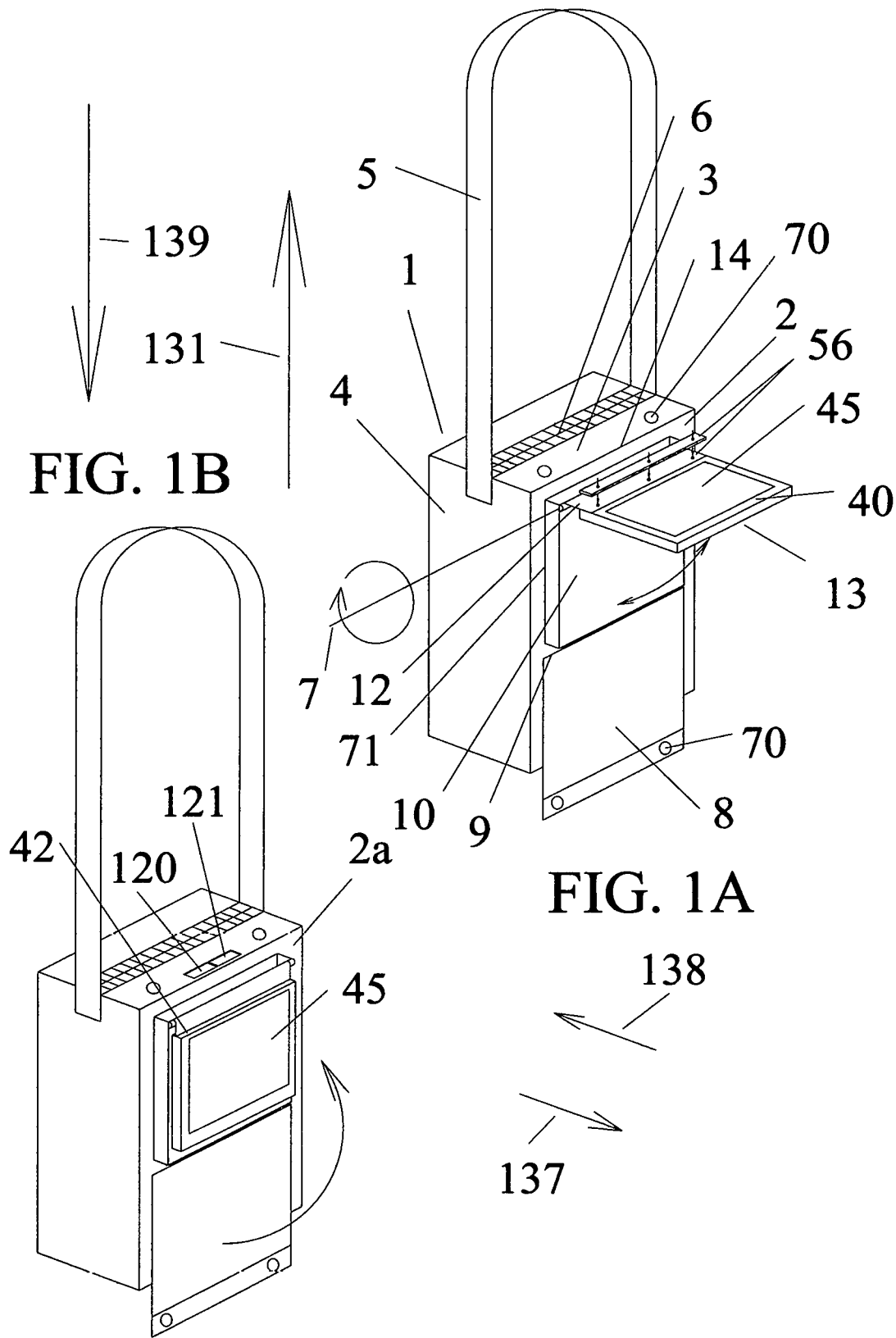

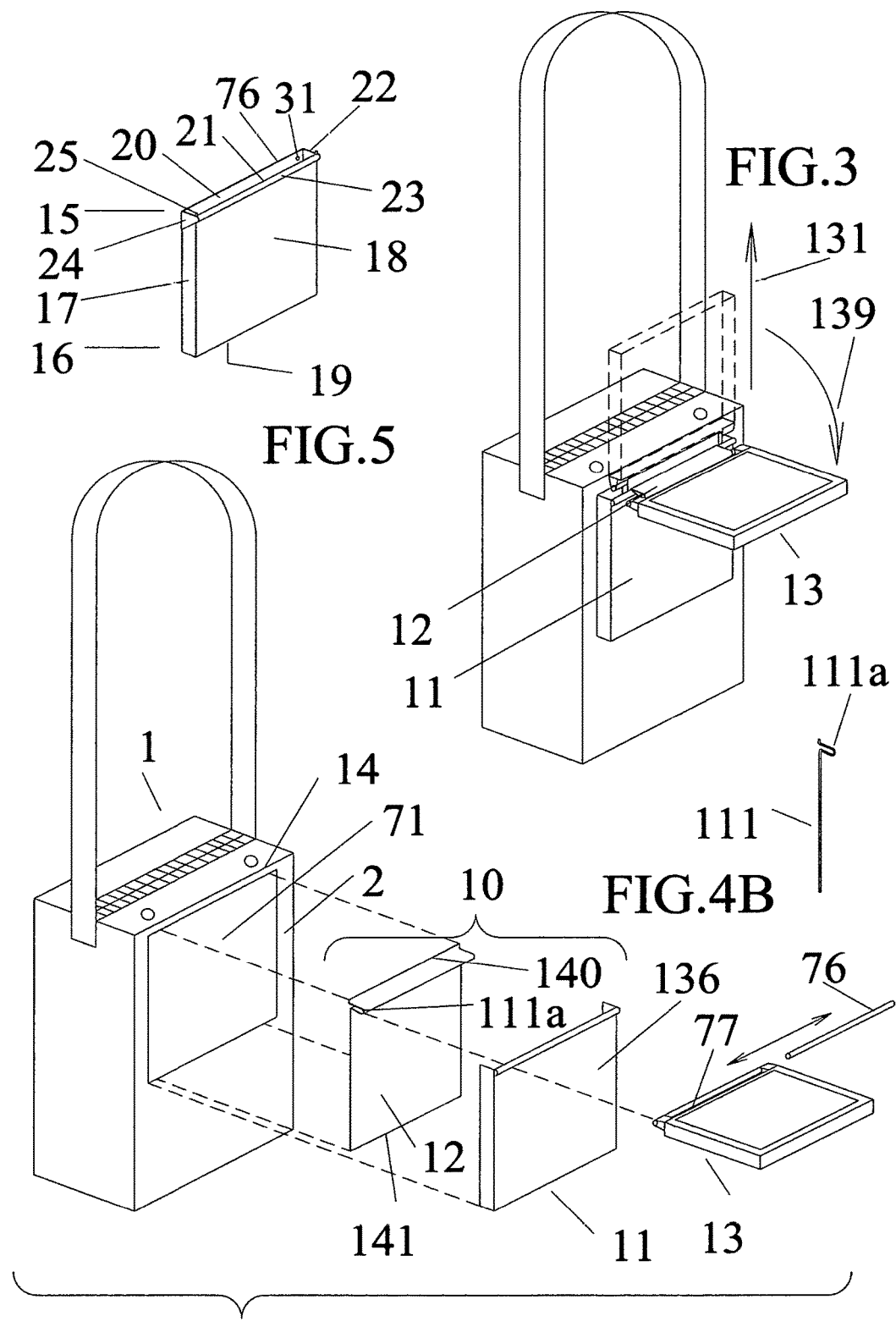

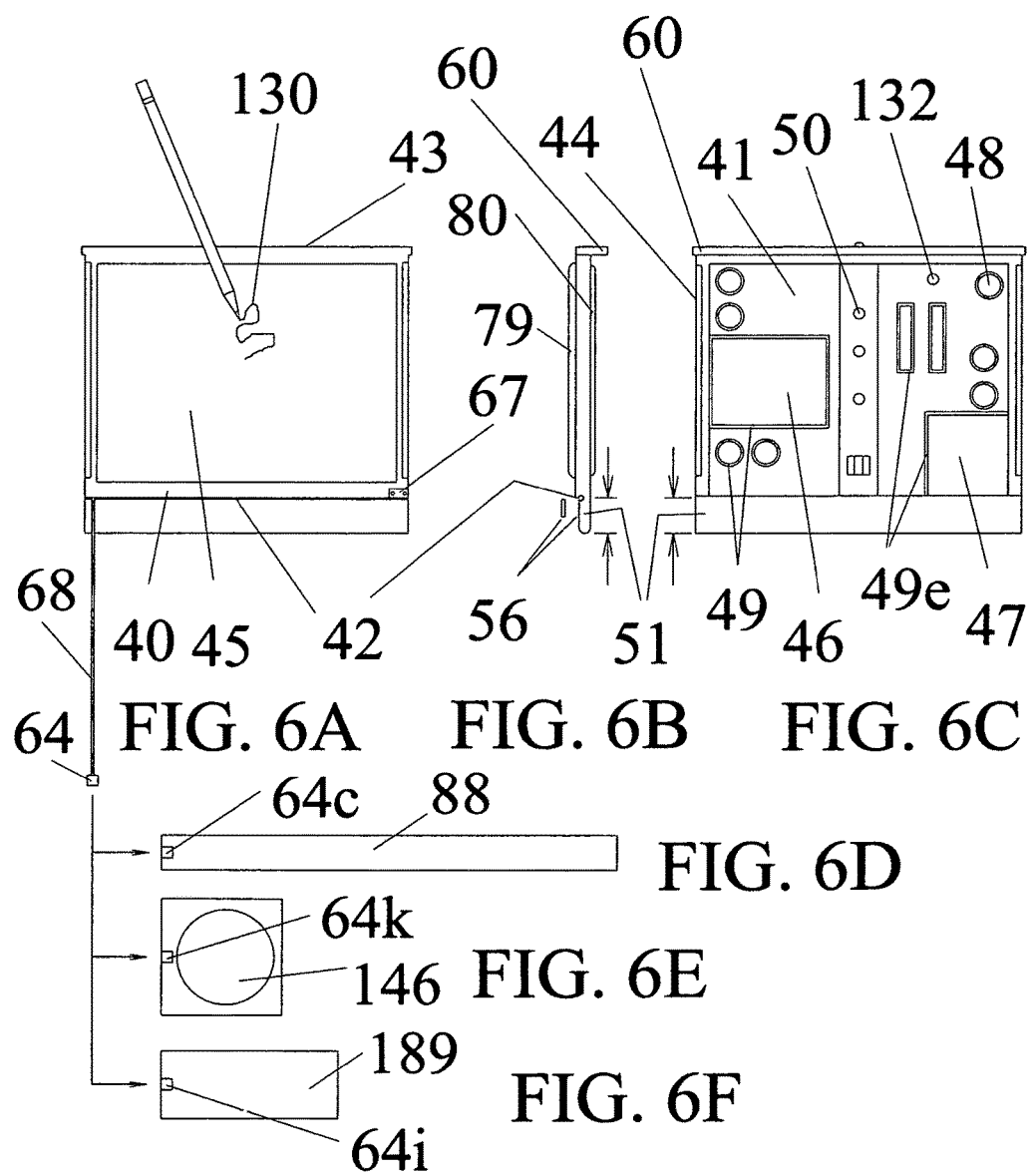

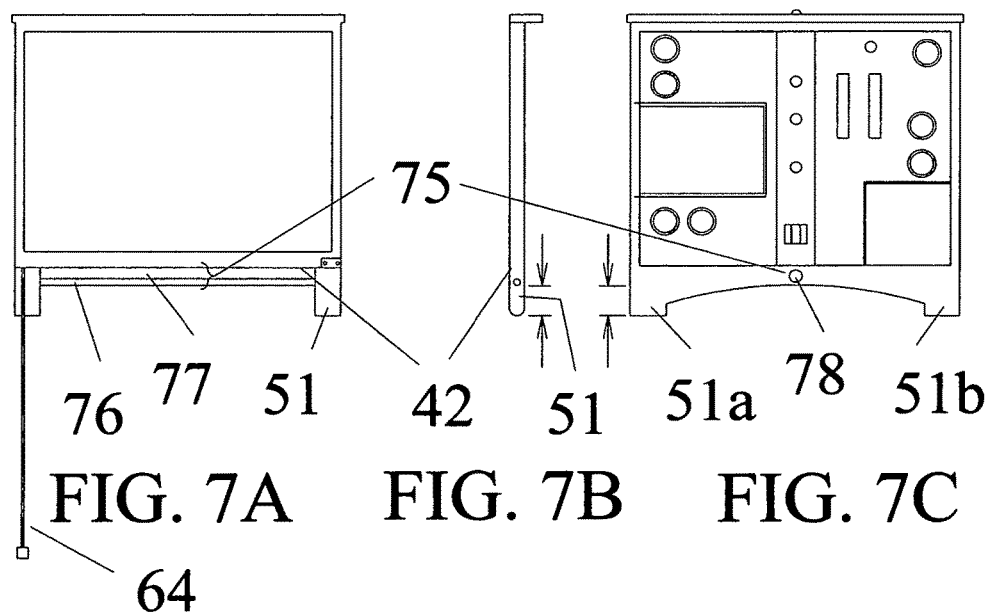
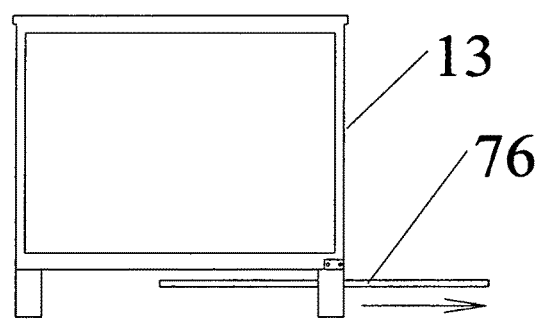

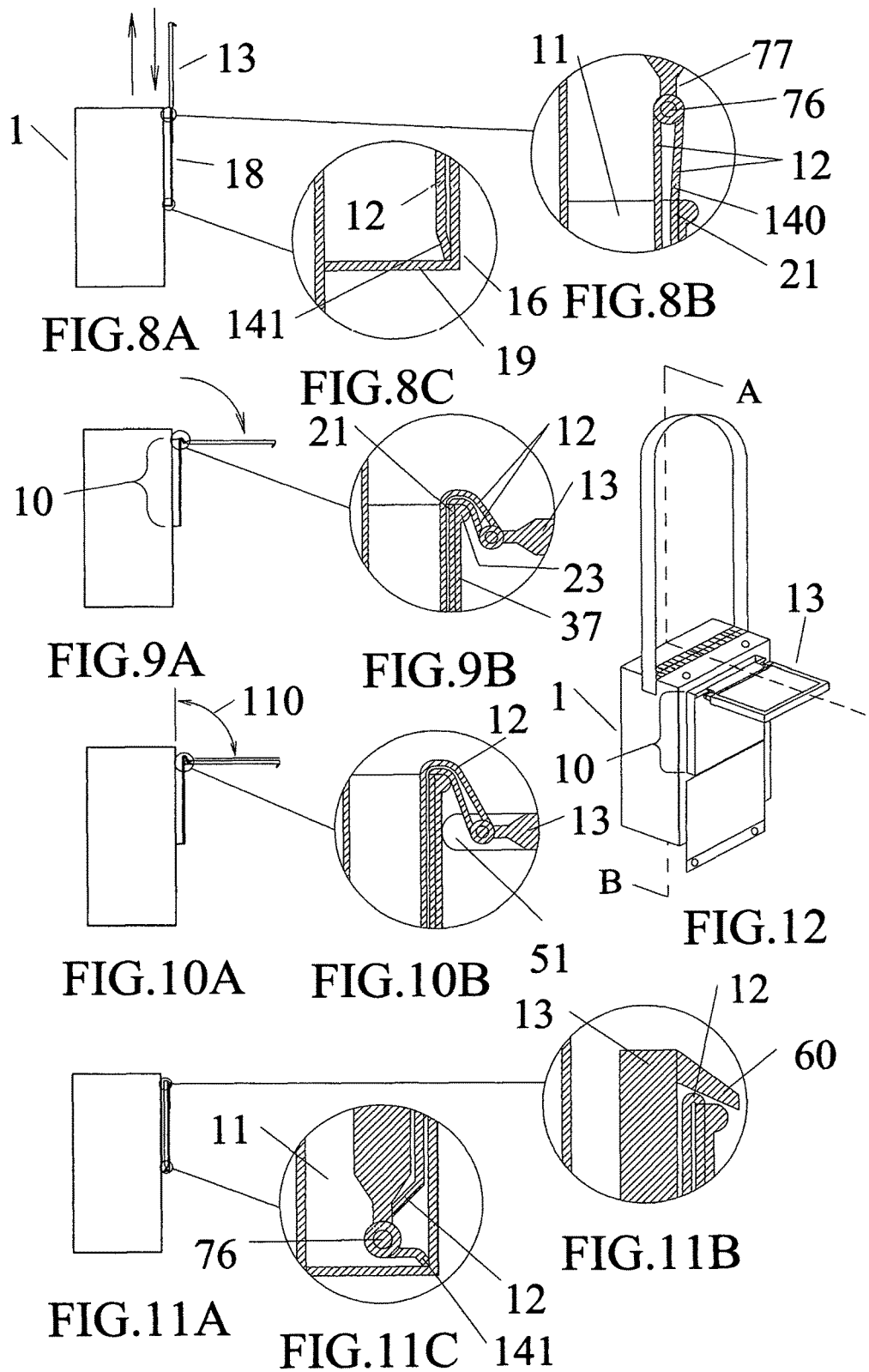

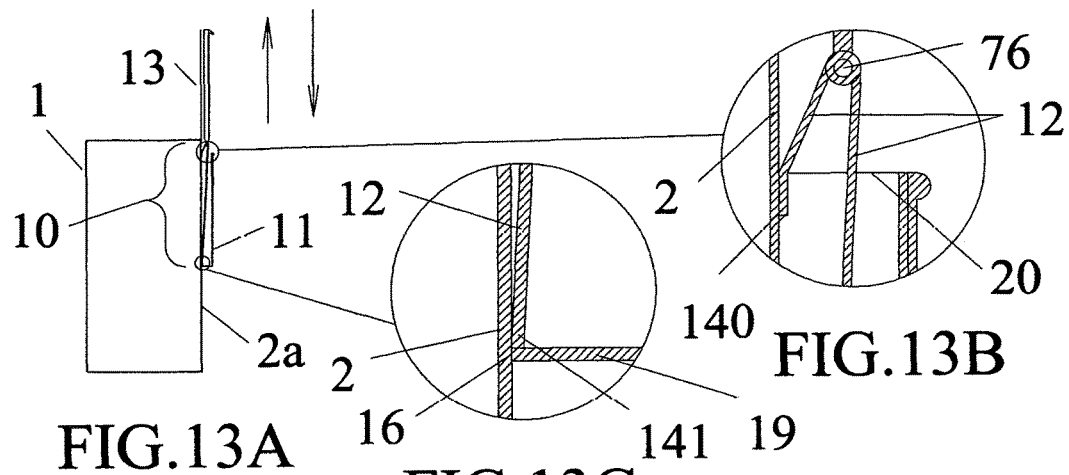
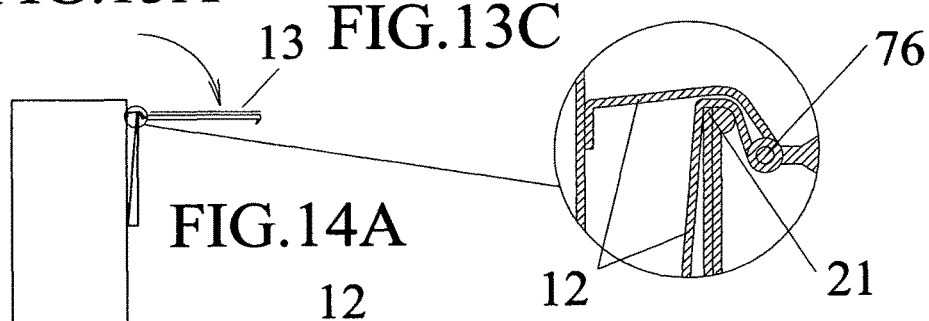
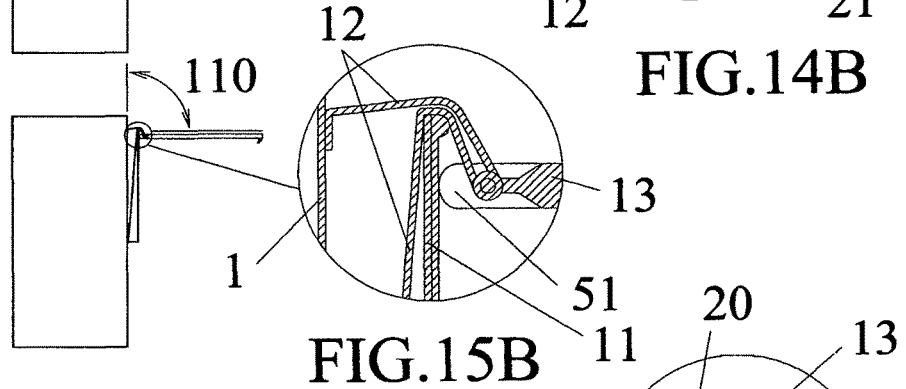
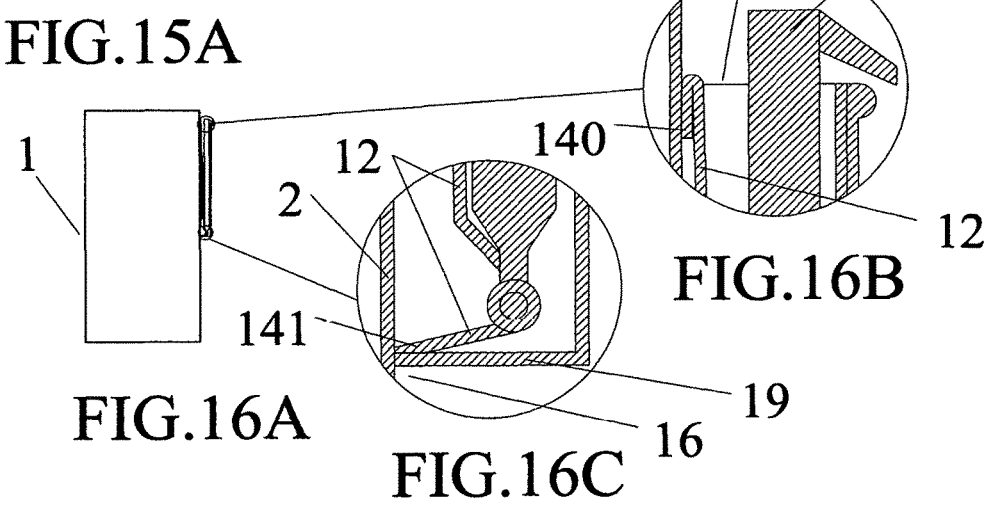

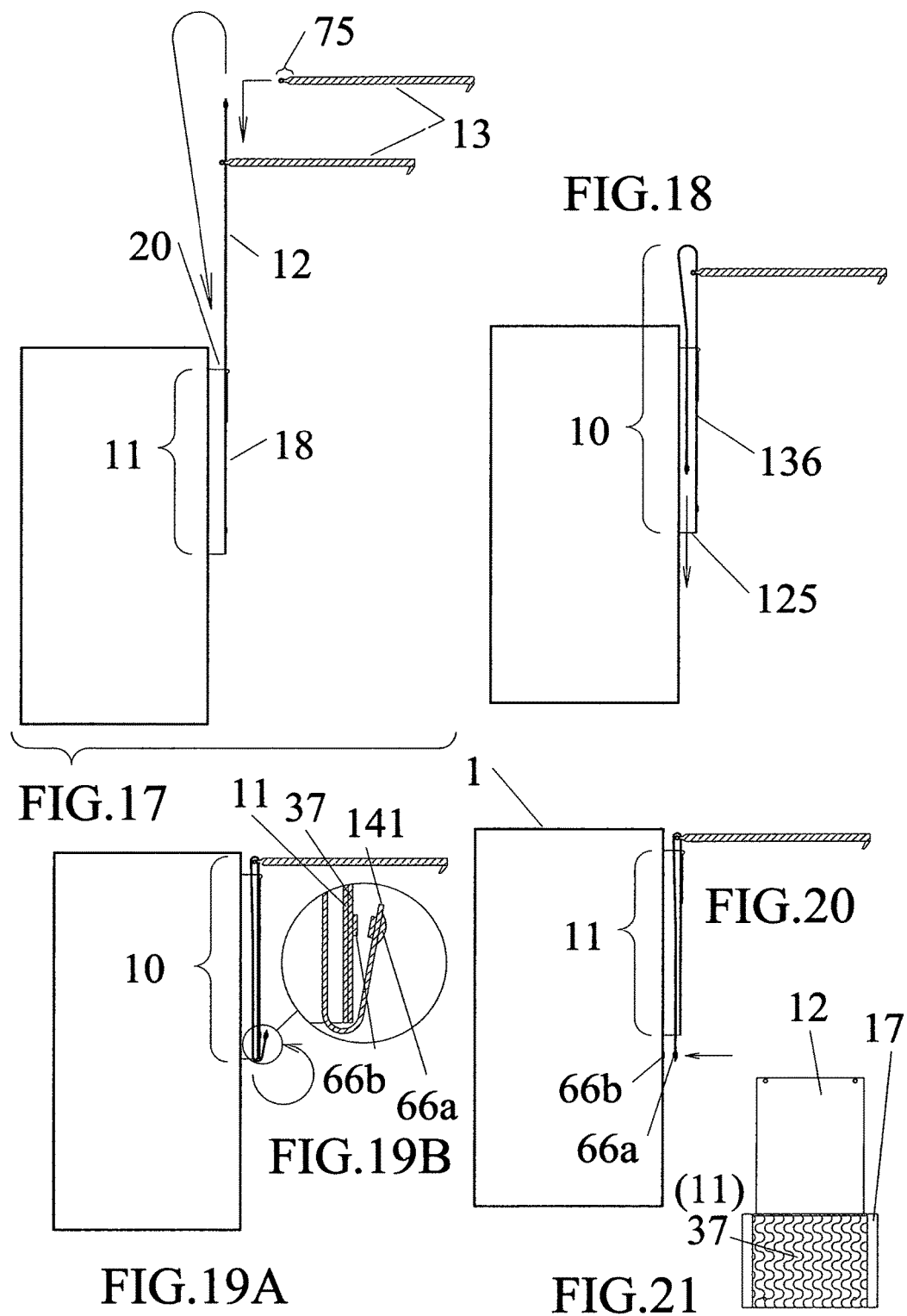

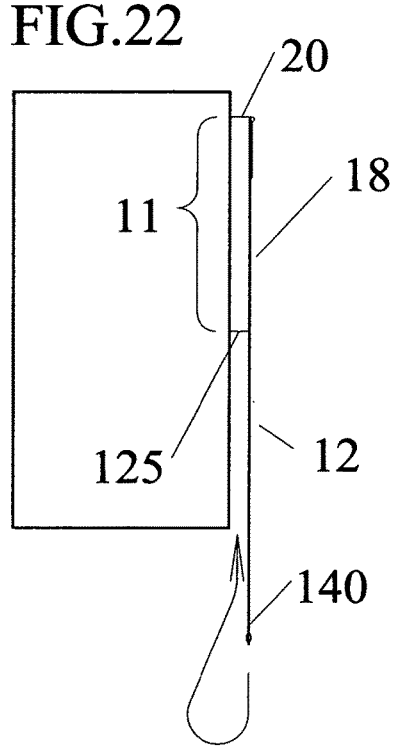
FIG.22
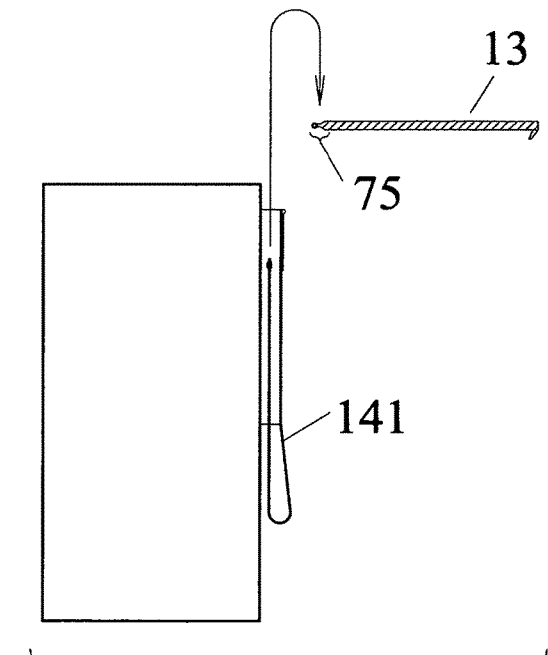
FIG.23
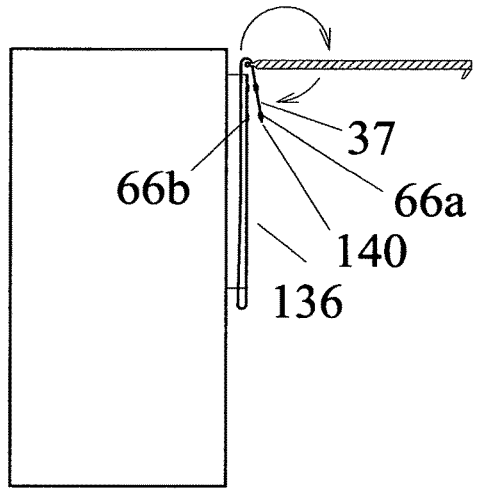
FIG.24
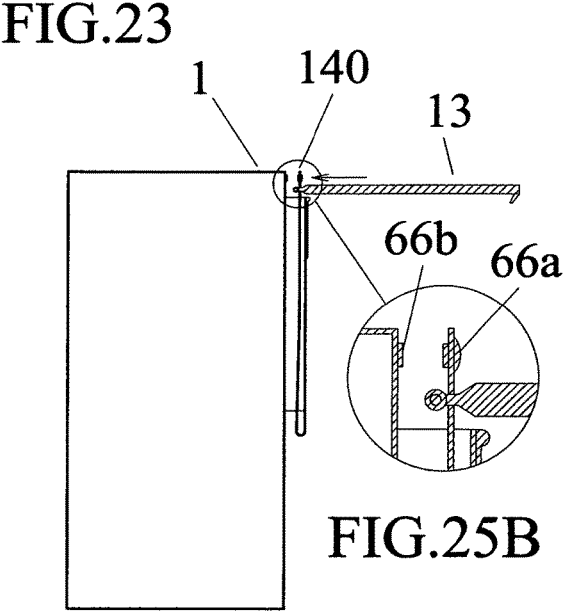
FIG.25A
FIG.25B

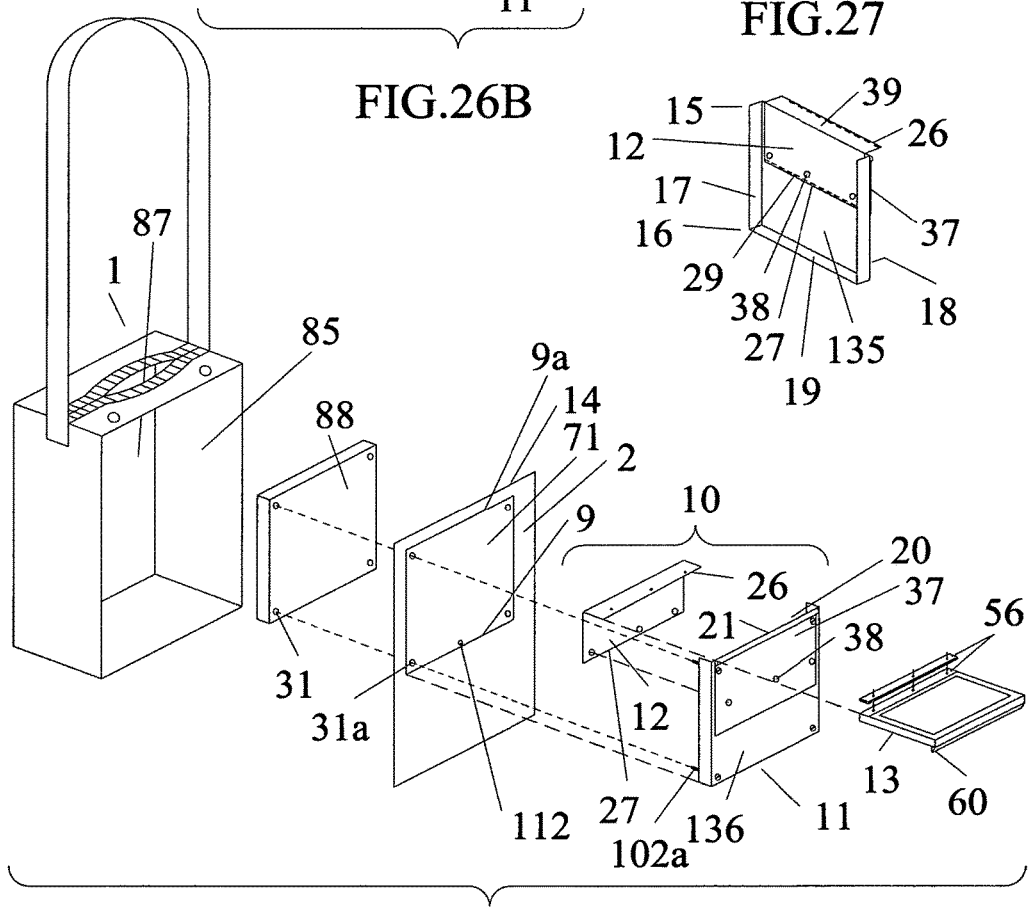

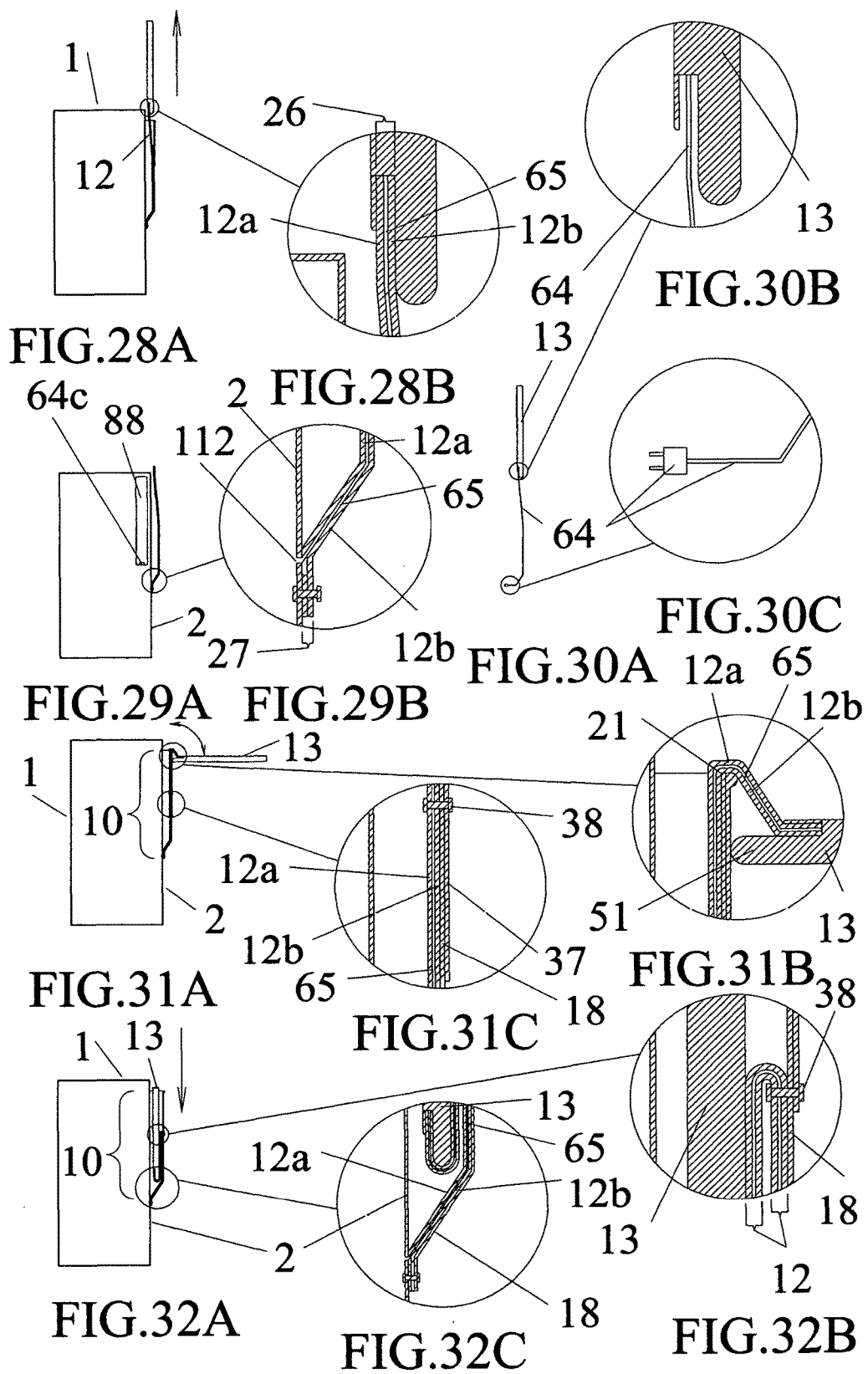

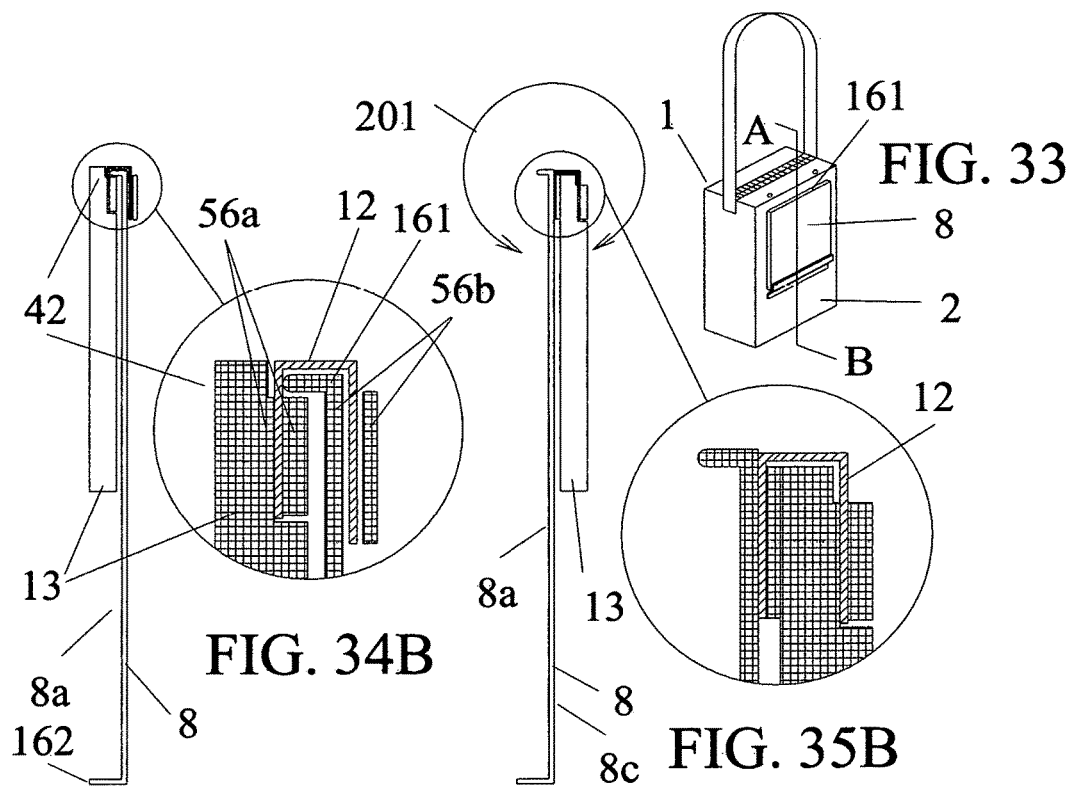
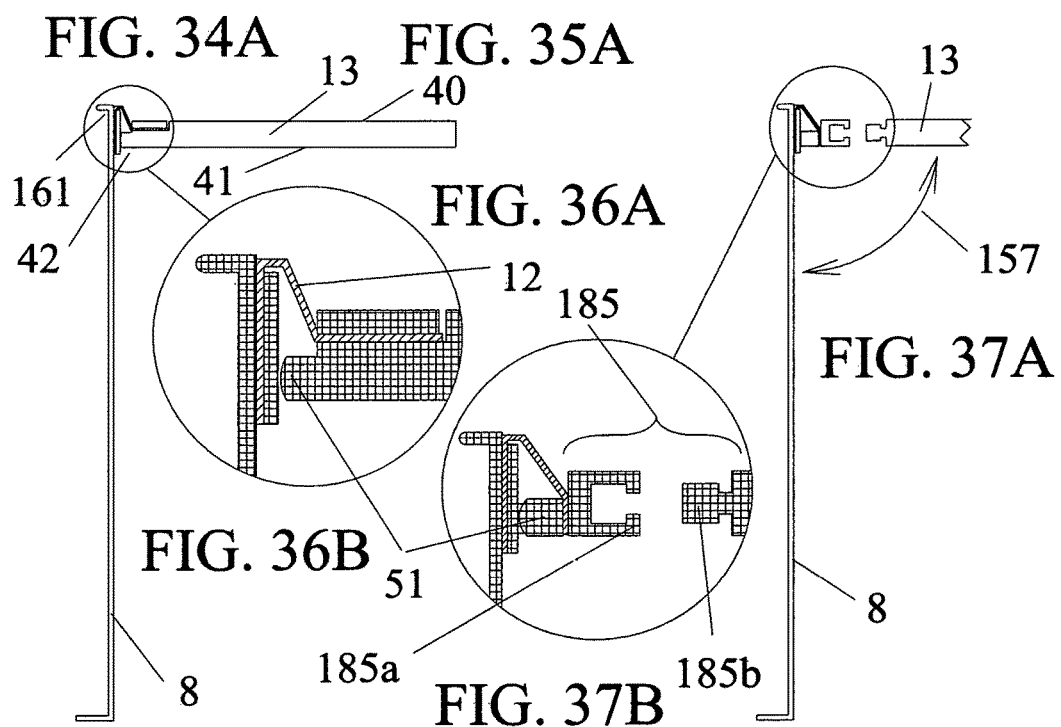

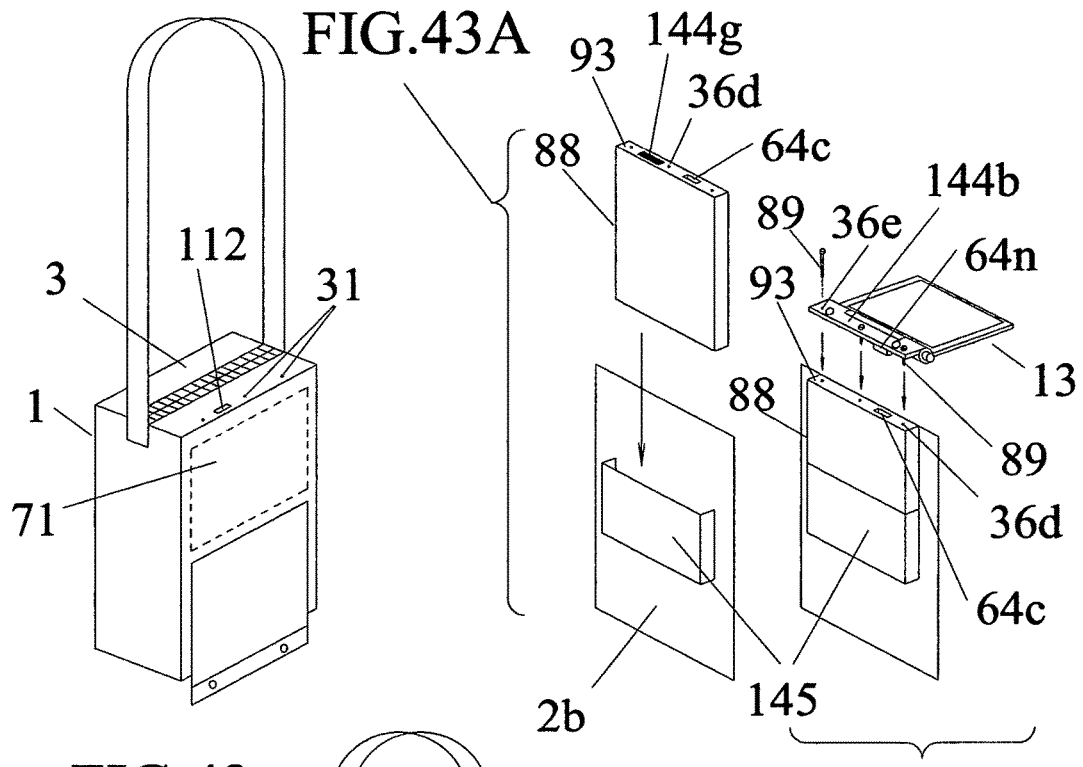
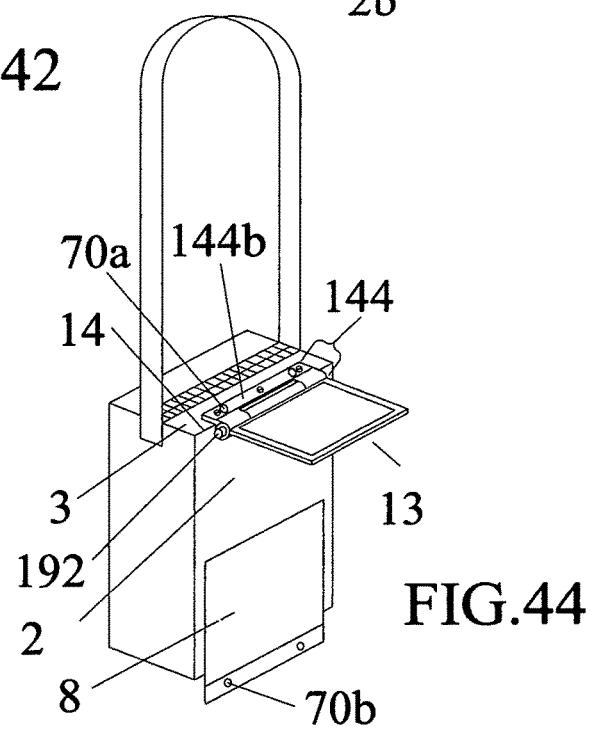
FIG. 42
FIG. 43A
FIG. 43B
FIG. 44

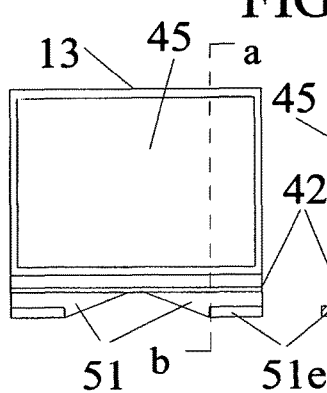
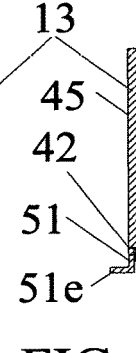
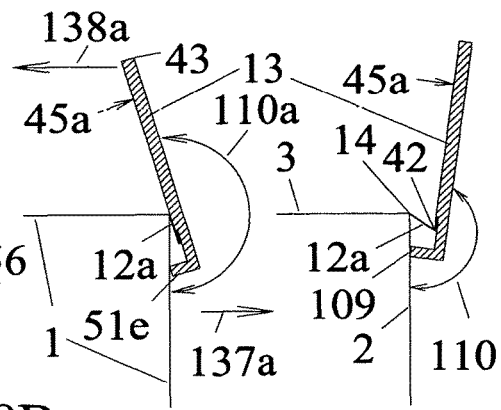
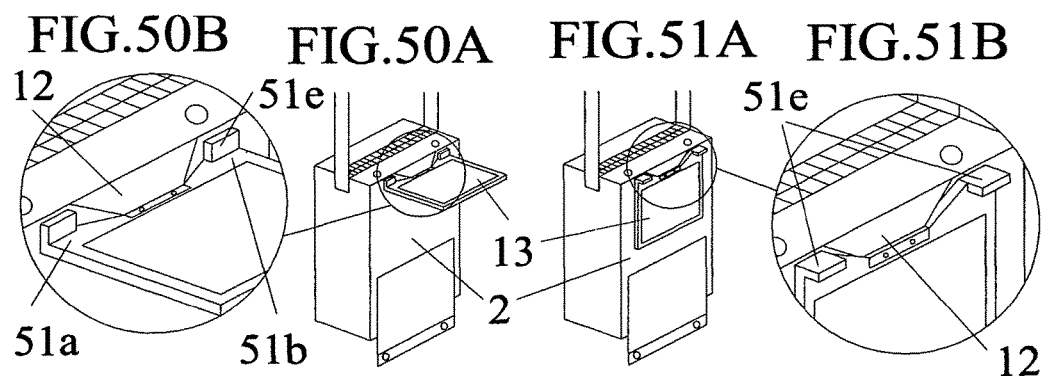

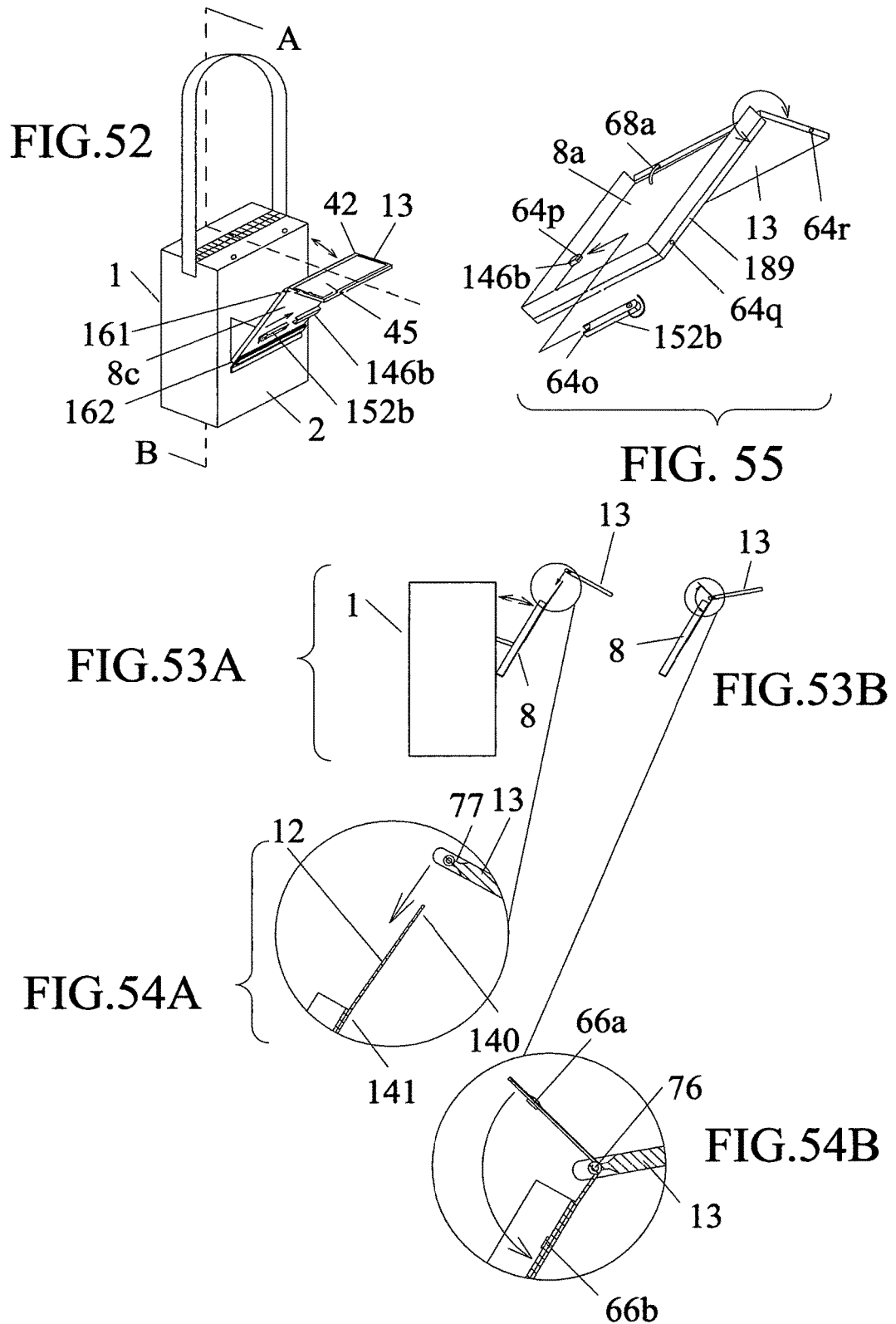

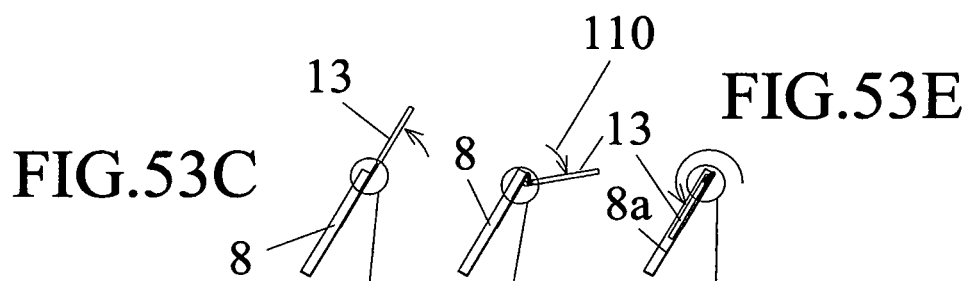
FIG.53C  FIG.53D  FIG.53E
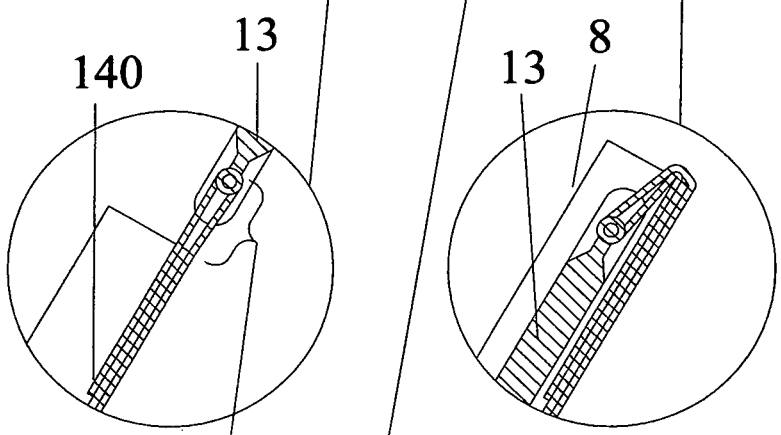
FIG.54C
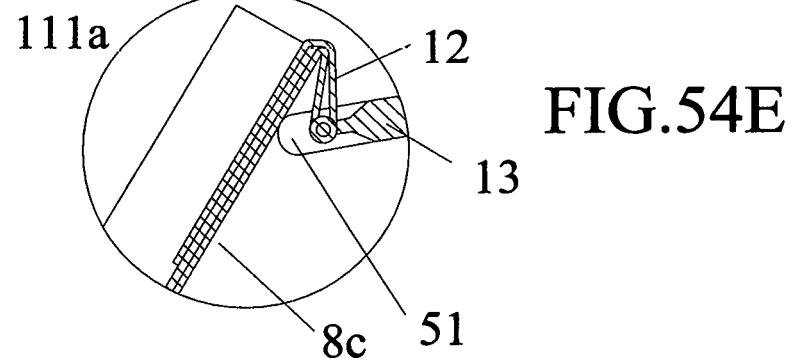
FIG.54E
FIG.54D

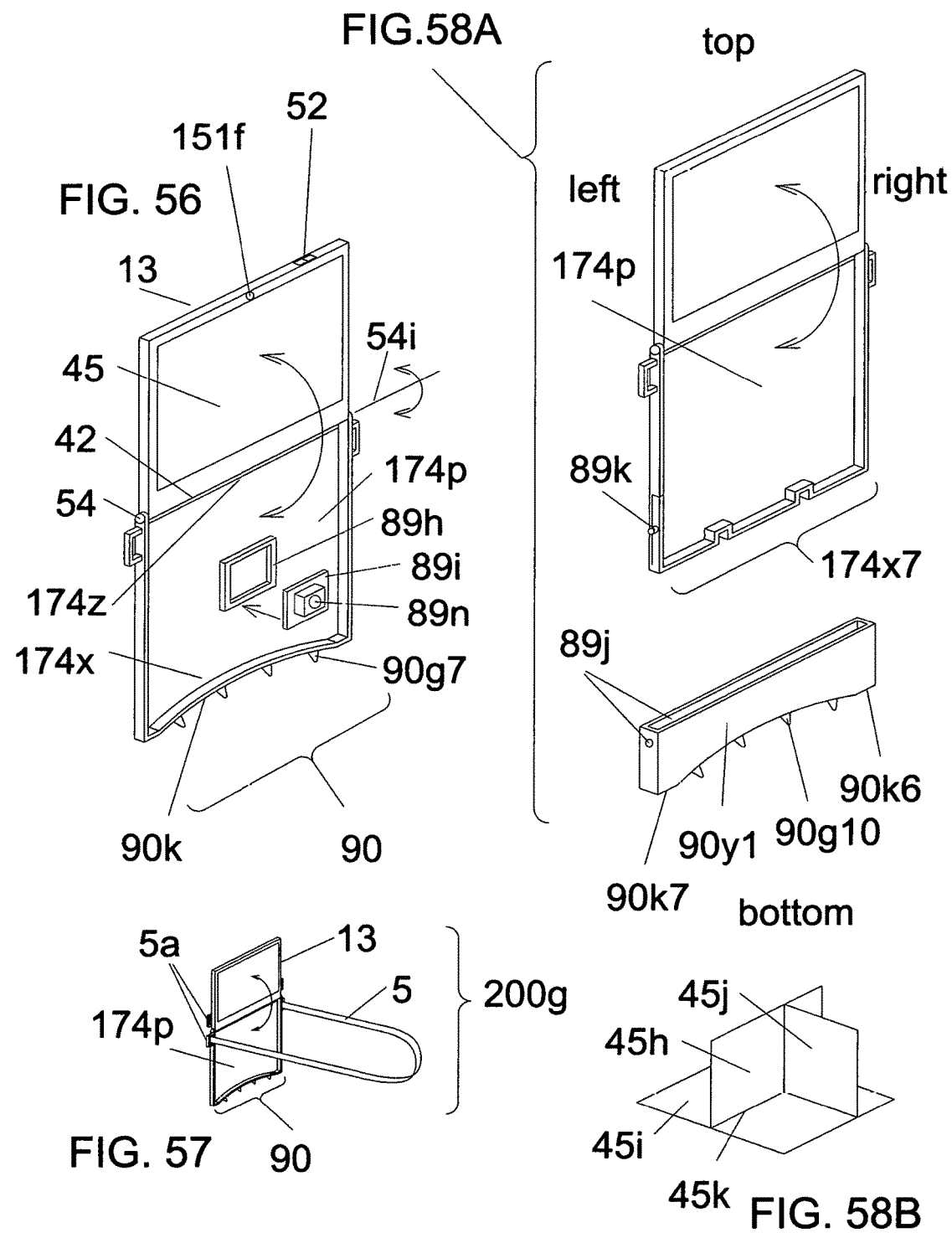

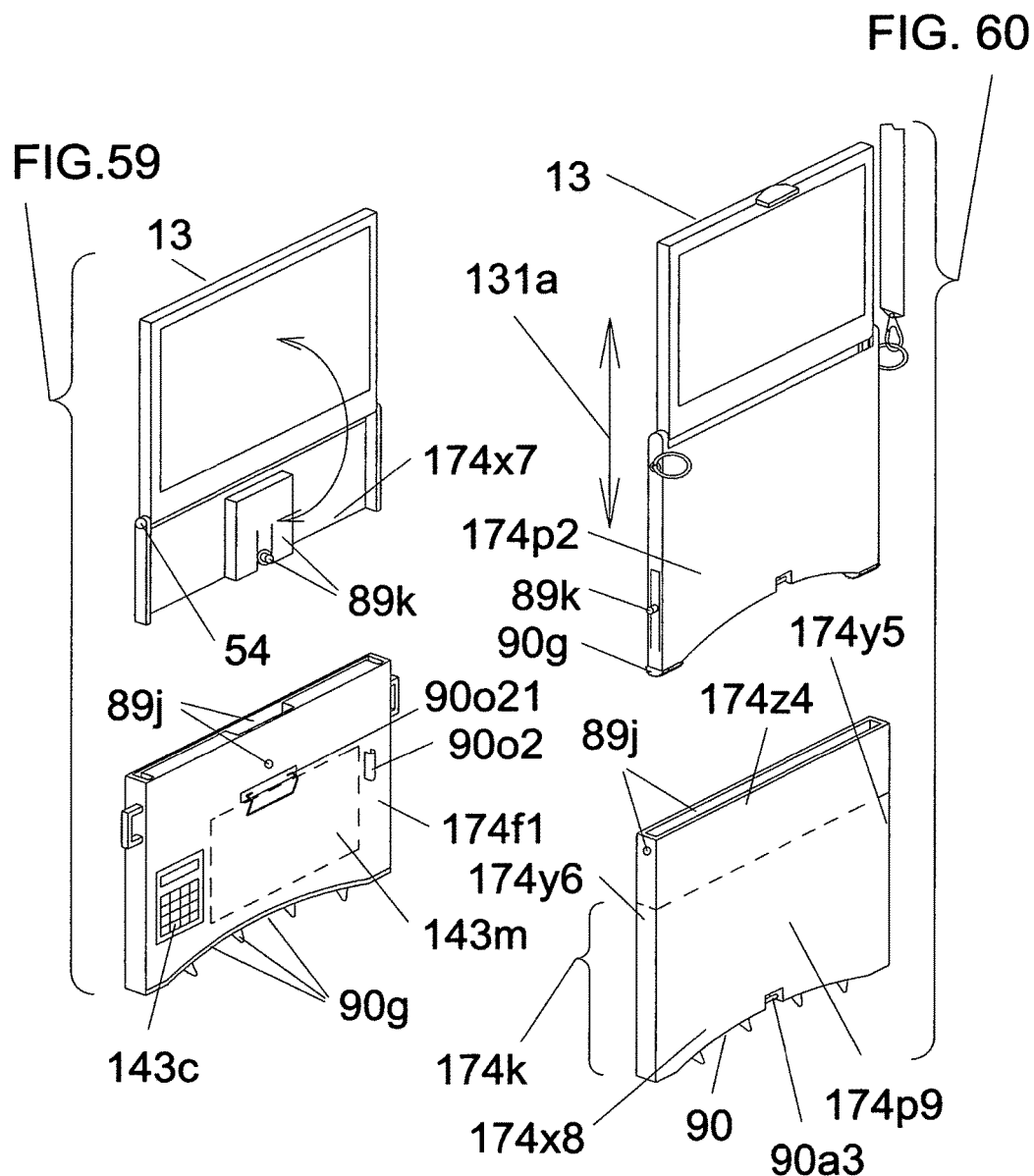

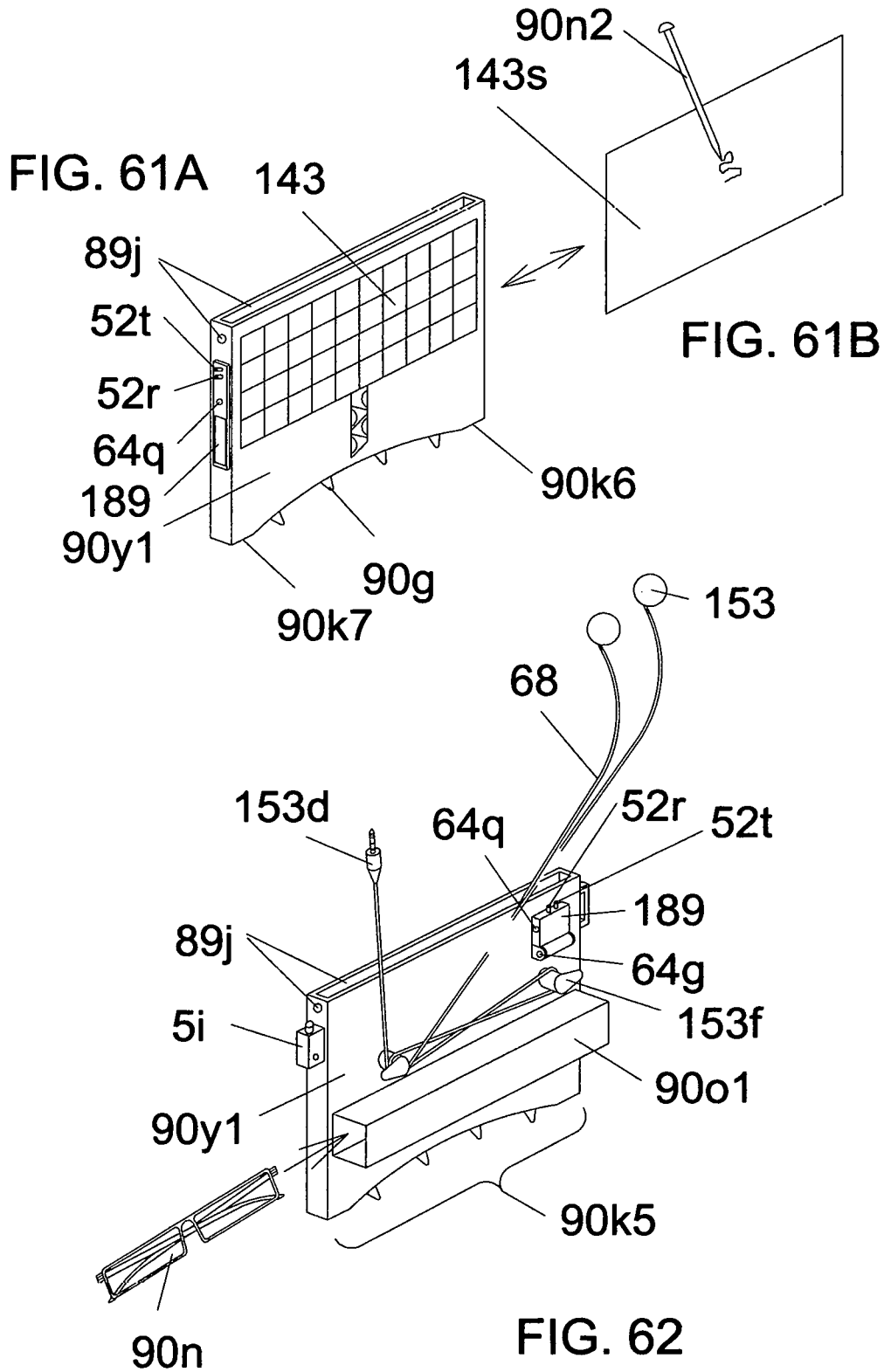

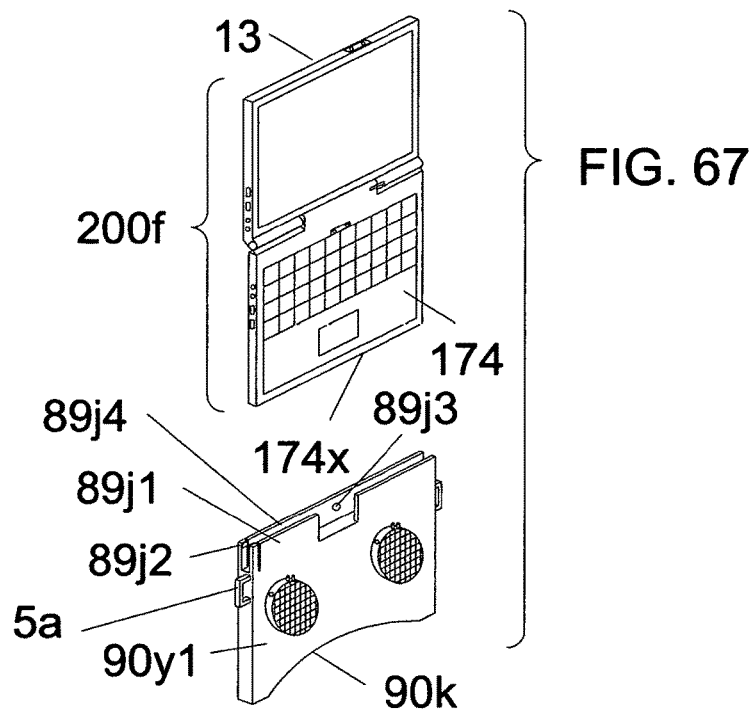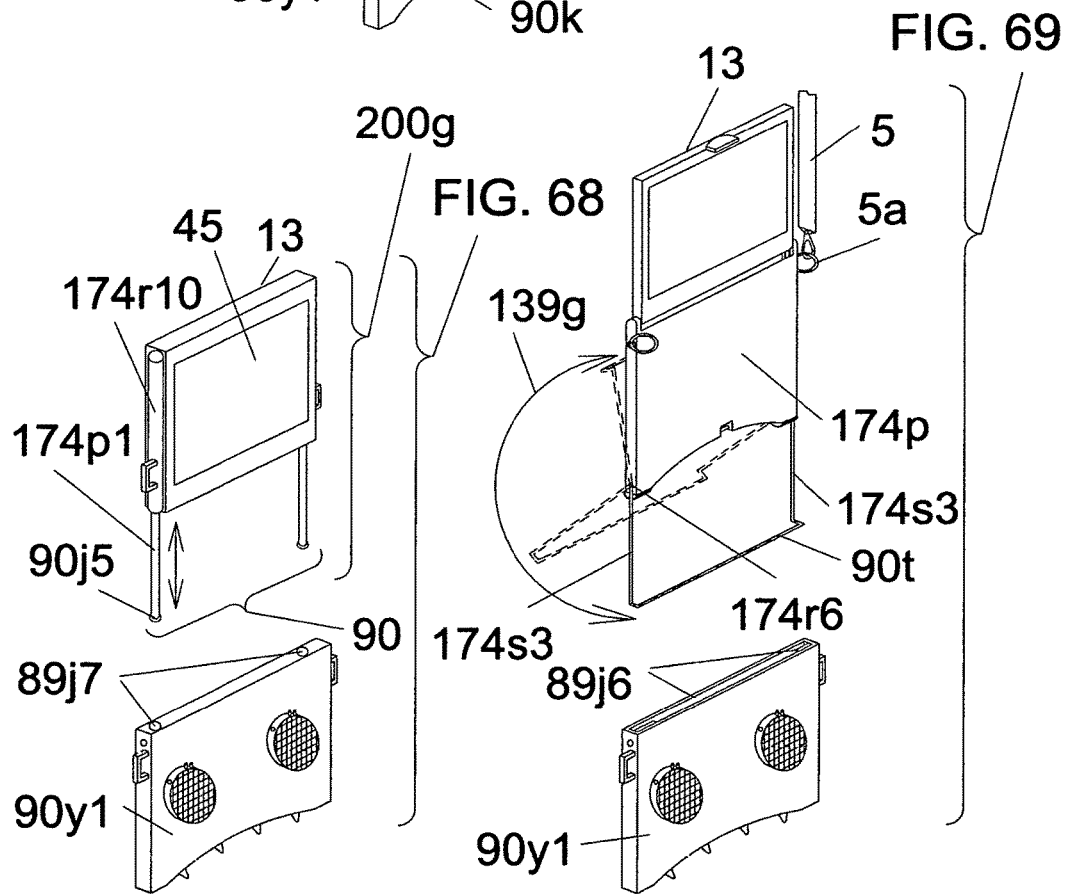

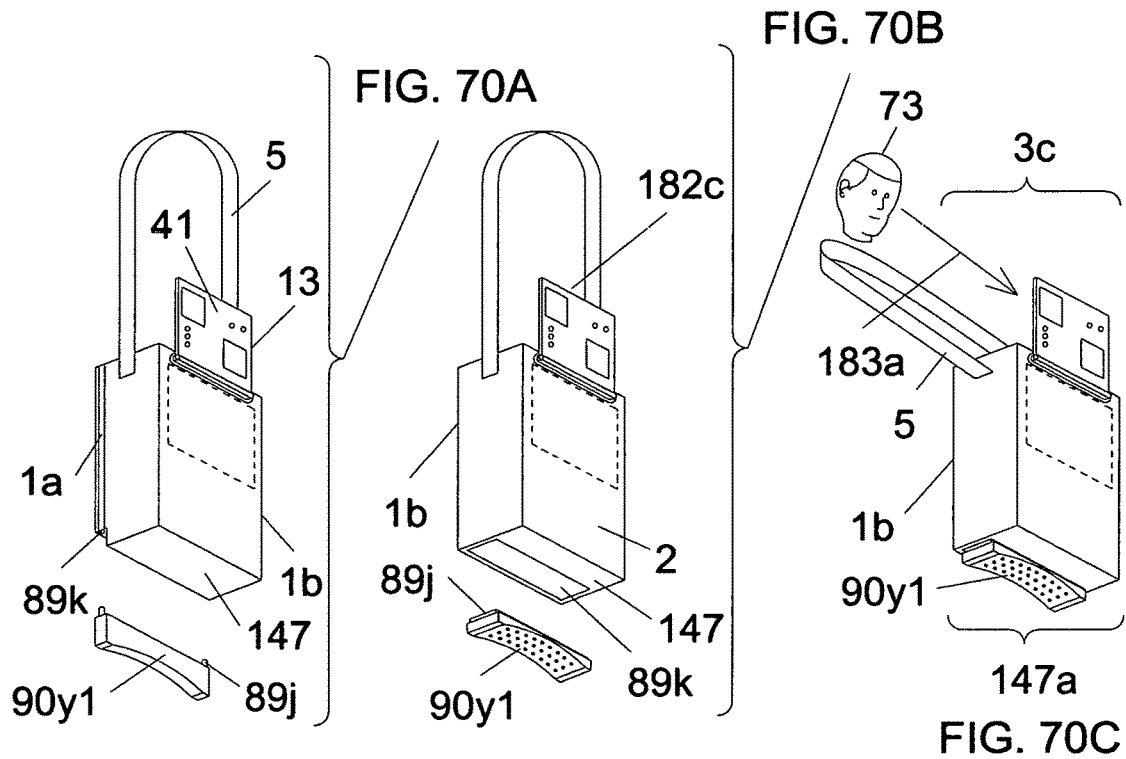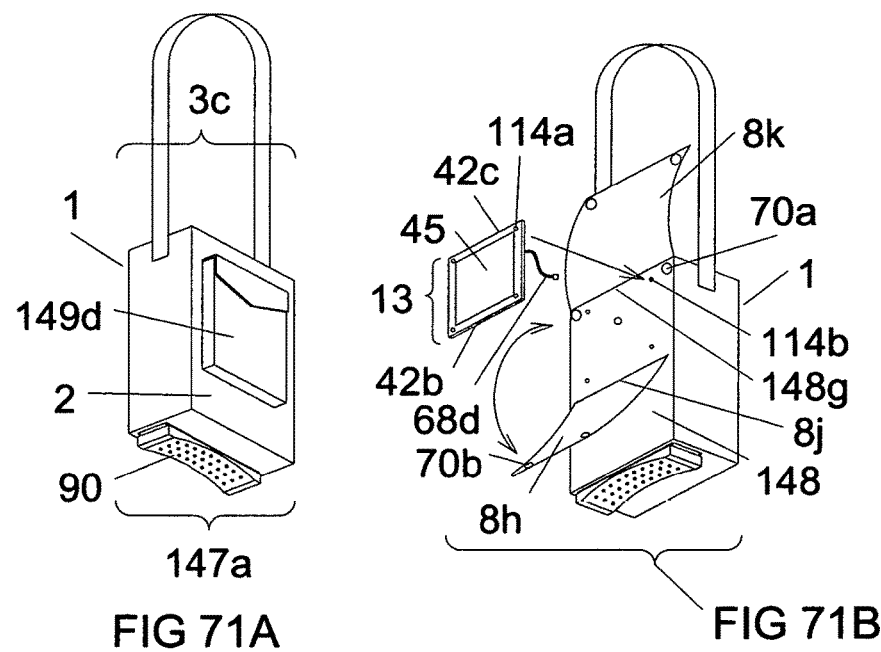

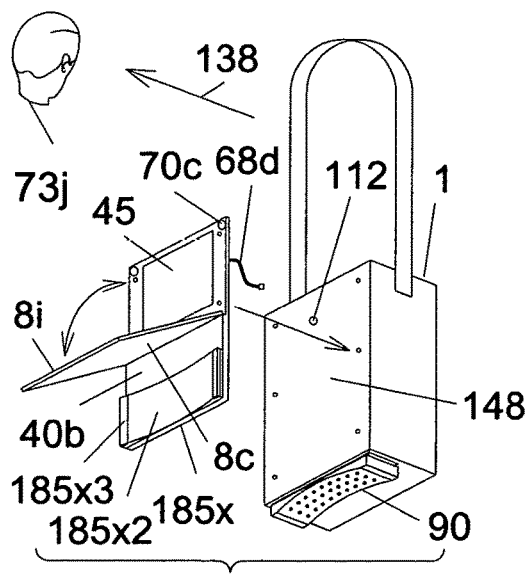
FIG 72A
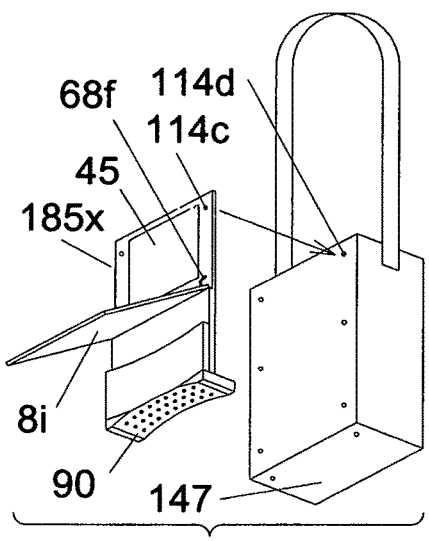
FIG 72B
FIG 73B
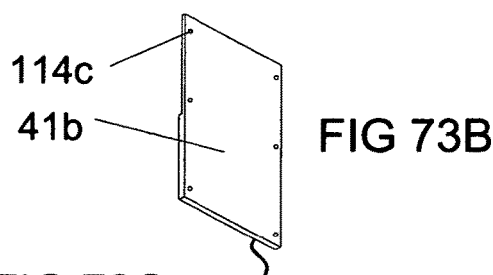
FIG 72C
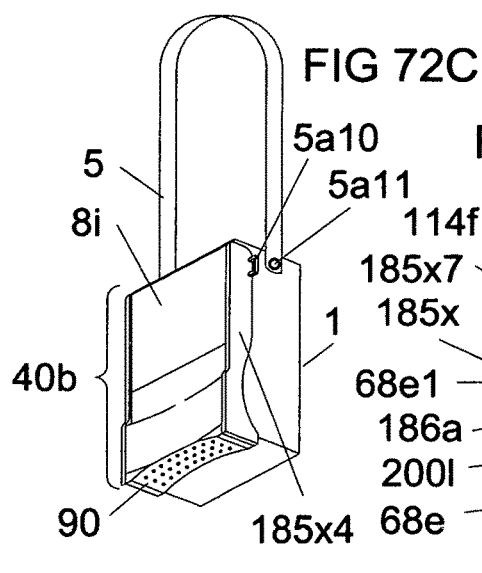
FIG 73A
FIG 74
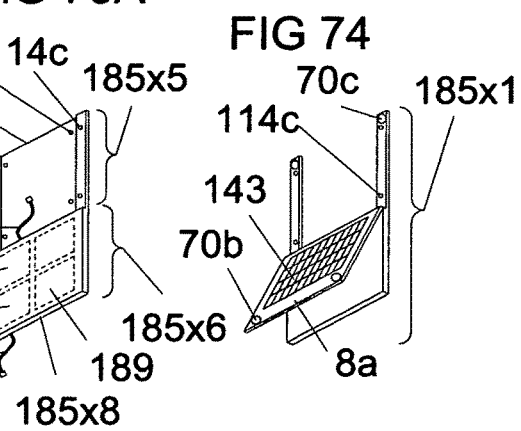

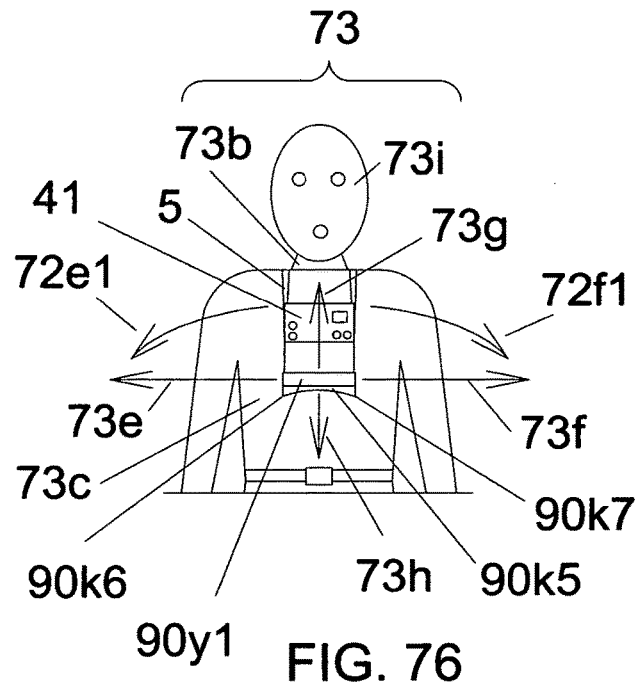
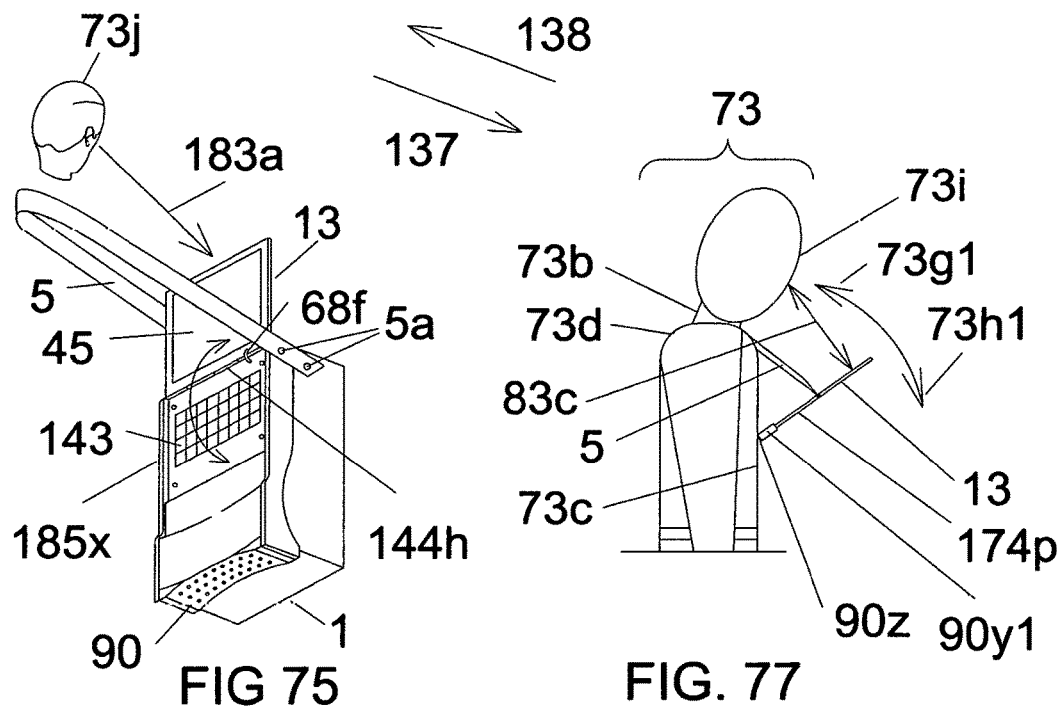

WEARABLE PROPPING DISPLAY APPARATUS IMPROVEMENTS

CROSS-REFERENCE TO RELATED APPLICATIONS

This application is a Continuation-In-Part of U.S. copending patent application Ser. No. 14/999,009, filed on Mar. 17, 2016, the entire teachings of which are incorporated herein by reference.

This application is a Continuation-In-Part of U.S. copending patent application Ser. No. 14/998,517, filed on Jan. 13, 2016, the entire teachings of which are incorporated herein by reference.

This application is a Continuation-In-Part of U.S. copending patent application Ser. No. 14/757,169, filed on Nov. 30, 2015, the entire teachings of which are incorporated herein by reference.

This application is a Continuation-In-Part of U.S. copending patent application Ser. No. 14/121,914, filed on Nov. 3, 2014, the entire teachings of which are incorporated herein by reference.

This application claims the filing benefit under 35 U.S.C. § 119(e) of U.S. Provisional Application No. 62/391,775, filed on May 11, 2016, the entire teachings of which are incorporated herein by reference.

This application claims the filing benefit under 35 U.S.C. § 119(e) of U.S. Provisional Application No. 62/391,813, filed on May 12, 2016, the entire teachings of which are incorporated herein by reference.

This application claims the filing benefit under 35 U.S.C. § 119(e) of U.S. Provisional Application No. 62/231,806, filed on Jul. 16, 2015, the entire teachings of which are incorporated herein by reference.

TECHNICAL FIELD

The present invention relates to a computer designed for mobile use.

BACKGROUND OF THE INVENTION

In several patents, including U.S. Pat. No. 7,881,048 the idea of a bag adapted to hold computer equipment was developed. This bag included a pivoting display panel on the outside front of the bag, a computing unit and input/output, such as a keyboard. The bag was pictured being wearably propped against an operator in several different positions with the display in the view of the operator.

Of course, improvements to this arrangement may be envisioned.

The idea of a display panel mounted to the bag in a way where the display panel pulls vertically out of a pocket and then pivots into a viewing position was presented application Ser. No. 13/135,446. This led to variations of and/or improvements including the bag computer sliding attachment and retainer type display panel mount (shown on sheets 3, 6, 7, 8, and 9) and the bag computer simplified holder and retainer end to display panel mount (shown on sheets 10 and 11).

The idea of a display panel pivotally attached to the bag outside using a display panel with an axle/bearing hinge attached through the bag wall to a computing unit panel base inside the bag was first presented in application Ser. No. 11/796,920. This led to further improvement with display panel and axle/bearing hinge to computing unit panel mount (shown on sheets 13 to 15).

The idea of improving by simplification the bag computer display panel pivoting and propping, especially in the vertical operating position, originated in patent Ser. No. 12/927,884 and continued in application Ser. No. 13/987,618. This led to further improvement with bag computer vertical operating position prop (shown on sheets 16).

The idea of pivotally attaching a display panel to the distal end of a cover pivotally attached to a bag was presented in application Ser. Nos. 12/216,650, 11/796,920 and 13/987,618. A further alternative arrangement/improvement is described in bag computer display panel to cover 360 degree attachment loop mount (shown on sheets 12, 17 and 18).

The idea of the bag computer using a display panel attached to the bag using and intermediate panel was presented in U.S. Pat. No. 7,881,048 and was improved upon in application Ser. No. 13/987,618. This led to further improvement with bag computer intermediate panel to display panel pivoting computer equipment mount (shown on sheets 17 and 18).

The idea of the bag computer with its display panel in a vertical operating position being suspended by its strap from the operator with the bag's bottom contacting the operator's body so that the display is in view of the operator was presented in U.S. Pat. No. 7,881,048. This led to the wearable propping display apparatus and the removable operator body interface (shown on sheets 19 to 25).

The idea developed that the apparatus with bag front side display panel mount in a vertical operating position propped on an operator as described above may be simplified by putting the display on the bag back wall instead of being viewed from the back side of the bag over the top wall of the bag. This idea is a direct outcome of the bag front side display panel mount in U.S. Pat. No. 7,881,048 and improved upon in application Ser. No. 13/987,618. It is a continuation in part of application Ser. Nos. 14/998,517, 14/757,169 and 14/121,914. Bag back wall display apparatus (shown on sheets 25 to 27).

BRIEF DESCRIPTION OF THE INVENTION

A bag computer may be comprised of a bag with a pivoting display panel mounted near the top front corner and including a cover to protect the display while it is stored in the computer equipment storage area on the outside of the bag front. (sheets 1 and 2)

Bag Computer Sliding Attachment and Retainer Type Display Panel Mount (Sheets 3, 6, 7, 8, and 9).

The arrangement of a bag front holder with a display panel deploying upward out of the holder and pivoting into an operating position while still being attached to the bag may have alternative forms.

A display panel may be equipped with a sliding attachment such as a hole or slot, so that it can slide along a guide. The guide may be a retainer which holds the display panel to the bag and may be a piece of sheet material or filament attached at both ends to a bag or the holder.

Further, the guide may be positioned within a holder so that the display panel is protected in the holder in at least one position along the retainer and exposed for use at another position along the retainer. The display panel may include a prop for holding the display panel at an operating position angle relative to the bag front.

This arrangement may be very simply made with a single material pattern cut to include the holder and retainer. The holder front may be a rigid contact surface and the sides may attach to the bag leaving the top and bottom of the holder open for display panel installation. The retainer can be detachably attached at its distal end for installing or removing the display panel.

Bag Computer Simplified Holder and Retainer End to Display Panel Mount (Sheets 10 and 11).

The arrangement of a bag front holder with a display panel deploying upward out of a holder and pivoting into an operating position while still being attached to the bag may have several forms. In one arrangement, one end of the retainer is attached to the bag or holder and the other end is attached to the display panel. The attachment to the bag or holder may be inside a holder so that the display panel may be stored for protection within a holder but still may be withdrawn from the holder for use without being detached from the bag. In an operating position, the display panel may include a prop for holding the display panel at an operating position angle relative to the bag front.

To simplify the construction of this arrangement and protect the electrical connection from the bag inside to the display panel, the retainer may have two layers to accommodate an electrical connection channel leading the bottom of the holder and through an electric access opening to the bag interior. The retainer may be integrated into the holder front as several layers.

Bag Computer Intermediate Panel to Display Panel Pivoting Computer Equipment Mount (Sheet 12).

When mounting a display panel to a bag using a cover/intermediate panel, the pivoting computer equipment mount connecting the display panel to the cover/intermediate panel distal edge may be adapted to be durable, to pivot 360 degrees and to allow removal of the display panel. Such a pivoting mount may be of flexible fabric and may be long enough to stretch completely around the distal end of the cover/intermediate panel. The attachment from the flexible fabric attachment flap (retainer) distal end to the display panel may include a matching quick release attachment for removing the display panel. Further, this pivoting computer equipment mount may include a prop to hold the display panel at various angles relative to the cover/intermediate panel.

Computing Unit Panel Display Panel Mount for Bag Computer—Display Panel and Axle/Bearing Hinge to Computing Unit Panel Mount (Sheets 13 to 15).

The display panel of the bag computer may be mounted via an axle/bearing hinge to the top front of the bag. However, the characteristics of this attachment may be improved if the axle bearing hinge is attached to a computing unit panel attached to the inside surface of the bag front wall. The display panel hinge may have an axle held in two housings, one including the display panel and the other including a flange adapted to attach the hinge to the bag and computing unit panel. The flange attaches through the bag wall to the computing unit to make a solid attachment. The flange may be mounted either to the top edge or the top front side of the computing unit panel.

The hinge for the display panel may include a brake to hold the display panel at angles relative to the bag. The brake may be comprised of a brake contact as part of one of two sleeves attached to either end of the axle. The axle may be moved back and forth along its own axis to engage or disengage the brake contact to the display panel housing and stop or allow rotation of the display panel relative to the mounting flange, computing unit panel and bag.

Bag Computer Vertical Operating Position Prop (Sheet 16).

A display panel stored against the bag front may be pivoted into one or more operating positions including a vertical operating position. The display panel's vertical angle may be increased to more than 180 degrees from the bag outside front and be variable with an improved vertical operating position prop. This prop may be a part of or fixed to an extension prop and, while in a vertical operating position, extend away from the display panel front side and between the display panel and bag to tilt the display panel distal end in a backward direction toward an operator viewing the display from in back of bag and over the of the bag top wall. The vertical operating position prop or the extension prop may be part of a clamp jaw used to attach the bag's display panel retainer to the display panel.

Bag Computer Display Panel to Cover 360 Degree Attachment Loop Mount (Sheet 17 and 18).

A display panel may be attached to a bag by pivotally attaching it to the distal edge of a cover attached to the bag by its proximal edge. The attachment between the distal edge of the cover and the attachment edge of the display panel may be formed by passing the retainer of the cover (e.g. an attachment flap or filament) through the slide attachment (e.g. a bar or a hole) of the display panel. One retainer end is attached to the cover distal end and the other end may be removably attached, also, near the distal end of the cover thus forming a loop with the display panel slide attachment in it. The display panel may pivot 360 degrees and may be quickly removed from the cover. Both the cover and display panel may include electrical equipment (e.g. batteries, radio communications, controls, mountings for removable wireless communications, external recharging connections, etc).

Removable operator body interface for attachment to the bottom end of a lap top (notebook) computer body panel, to length adjuster or to computer bag with vertical operating position capability (sheet 19 and 25).

A display panel hinged to a body panel (e.g. a wearable propping display apparatus or notebook (lap top) style computer) may be adapted for wearable use by including an operator body interface that fits between the operator and computer to stabilize the computer against tipping and sliding. This interface may be removable. Similarly, the removable operator body interface may be adapted to fit a length adjuster extending from a wearable propping display apparatus or to a computer bag with vertical operating position capability. The removable operator interface may further include accessories such as a writing surface, a keyboard, radio equipment, batteries, microphone, speakers and/or speaker wire storage devices (automatic or not). The removable operator body interface may serve a propping function and this may be adjustable.

Bag Back Wall Display Apparatus (Sheet 25 to 27).

To simplify the wearable propping display arrangement with an operator body interface pushing against the operator's body while a suspension device (e.g. strap) suspends the display in the operator's line of sight may be adapted so that the display is fixed to the exterior (outside surface) of the bag's back wall. The bag may include an operator body interface for propping. The display may be independently attached to the bag or the display may be part of a bag back wall display mounting frame which may include a cover, electronic (e.g. computer) equipment, bag attachments and shaping to adapt the frame to comfortable rub against the operator when in a storage position and carried on a shoulder. The frame may be independent of the bag, include the interface and able to attach to a variety of bags.

Wearable Propping Display Stability—(Sheet 27).

The stability characteristics of a display propped and suspended against an operator are reviewed with attention to the operator body interface's ability to resist tipping and sliding while the propped display.

BRIEF DESCRIPTION OF THE SEVERAL VIEWS OF THE DRAWINGS

FIG. 1A This figure shows details a bag computer with a pull up type holder on the front and the display panel pivoted into an operating position about perpendicular to the bag front.

FIG. 1B This is a bag computer with a pull up type holder on the front and the display panel in the computer equipment storage area.

FIG. 3 This figure shows details a bag computer with a pull up type holder on the front and the display panel being moved from a storage position in the holder to an operating position about perpendicular to the bag front.

FIG. 4A This is an exploded view of the bag computer in FIG. 3 showing the various parts.

FIG. 4B This is the retainer part from FIG. 4A but instead of a sheet-like attachment flap it is an attachment filament.

FIG. 5 This shows details of the holder shown in FIG. 4A.

FIG. 6A This shows a front side view of the details of a bag computer display panel.

FIG. 6B This shows a side view of the details of a bag computer display panel.

FIG. 6C This shows a back side view of the details of a bag computer display panel.

FIG. 6D This shows the display panel may connect with an electrical connection on a computing unit panel.

FIG. 6E This shows the display panel may connect with an electrical connection on the audio connector.

FIG. 6F This shows the display panel may with an electrical connection on a battery.

FIG. 7A This shows a front side view of the details of a bag computer display panel meant to used with a sliding attachment.

FIG. 7B This shows a side view of the details of a bag computer display panel meant to used with a sliding attachment.

FIG. 7C This shows a back side view of the details of a bag computer display panel meant to used with a sliding attachment. A slide hole is used here instead of the slot in FIG. 7A.

FIG. 7D This shows that the display panel slide attachment (e.g. a bar) may be disassembled (shown sliding to the right) for the purpose of installing the retainer.

FIG. 8A This is a side cross section view of the bag and display and how the sliding attachment works. The display panel is pulled up as far as possible.

FIG. 8B This is a magnified view of FIG. 8A of the top area of the display panel attachment.

FIG. 8C This is a magnified view of FIG. 8A of the bottom area of the display panel attachment.

FIG. 9A This is a side cross section view of the display panel in an operating position approximately perpendicular to the bag front.

FIG. 9B This is a magnified view of the display panel of FIG. 9A in an operating position showing how the sliding attachment holds the display panel to the bag.

FIG. 10A This is a side cross section view of the display panel in an operating position approximately perpendicular to the bag front. The display panel angle is held using a prop on the display panel.

FIG. 10B This is a magnified view of FIG. 10A showing detail of the pivoting and propping part of the display panel and sliding attachment.

FIG. 11A This is a side cross section view of the display panel in a storage position inside the holder.

FIG. 11B This is a magnified view of FIG. 11A showing detail of top area of the display panel and holder.

FIG. 11C This is a magnified view of FIG. 11A showing detail of bottom area of the display panel and holder.

FIG. 12 This is a perspective view of the bag computer showing the position of the cross section for figures.

FIG. 13A This is a side cross section view of the bag and display and how the sliding attachment works. The display panel is pulled up as far as possible. The sliding attachment is her attached to the bag instead of the holder. Compare to FIG. 8A.

FIG. 13B This is a magnified view of FIG. 13A showing detail of top area of the display panel and holder. The sliding attachment is her attached to the bag instead of the holder. Compare to FIG. 8B.

FIG. 13C This is a magnified view of FIG. 13A showing detail of bottom area of the display panel and holder. The sliding attachment is her attached to the bag instead of the holder. Compare to FIG. 8C.

FIG. 14A This is a side cross section view of the display panel in an operating position approximately perpendicular to the bag front. The sliding attachment is here attached to the bag instead of the holder. Compare to FIG. 9A.

FIG. 14B This is a magnified view of the display panel of FIG. 4A in an operating position showing how the sliding attachment holds the display panel to the bag. The sliding attachment is here attached to the bag instead of the holder. Compare to FIG. 9B.

FIG. 15A This is a side cross section view of the display panel in an operating position approximately perpendicular to the bag front. The display panel angle is held using a prop on the display panel. The sliding attachment is here attached to the bag instead of the holder. Compare to FIG. 10A.

FIG. 15B This is a magnified view of FIG. 15A showing detail of the pivoting and propping part of the display panel and sliding attachment. The sliding attachment is here attached to the bag instead of the holder. Compare to FIG. 10B.

FIG. 16A This is a side cross section view of the display panel in a storage position inside the holder. The sliding attachment is here attached to the bag instead of the holder. Compare to FIG. 11A FIG. 16B This is a magnified view of FIG. 16A showing detail of top area of the display panel and holder. The sliding attachment is here attached to the bag instead of the holder. Compare to FIG. 11B.

FIG. 16C This is a magnified view of FIG. 16A showing detail of bottom area of the display panel and holder. The sliding attachment is here attached to the bag instead of the holder. Compare to FIG. 11C.

FIG. 17 This a cross section side view of the display panel being installed onto a sliding attachment (flexible fabric flap).

FIG. 18 This is a cross section side view of further progress of the display panel being installed onto a sliding attachment.

FIG. 19A This is a cross section side view of the display panel already installed with the sliding attachment being attached to the holder near its bottom.

FIG. 19B This is a magnified view of the attachment of the sliding attachment near the bottom of the holder.

FIG. 20 This is a cross section side view of the display panel already installed with the sliding attachment attached to the bag wall instead of the holder.

FIG. 21 This is a plan view of a piece of material cut to produce the holder and sliding attachment assembly for attachment to a bag front.

FIG. 22 This is again the installation of the sliding attachment to the display panel. In this case the sliding attachment extends downward from the bolder instead of upward.

FIG. 23 This shows the sliding attachment installed upward through the holder and about to pass through the slot in the display panel.

FIG. 24 This is the display panel and sliding attachment already installed and about to be attached to the holder.

FIG. 25A This shows that the end of the sliding attachment may be attached to the bag front instead of to the holder.

FIG. 25B This is a magnified view of the retainer top end and display panel slide attachment area of FIG. 25A.

FIG. 26A This is an exploded view of the bag computer with the pull up holder using a one attached retainer to mount the display panel. Details of the parts are shown.

FIG. 26B This is an exploded view of an alternative holder which is a ring with no front, sides or bottom.

FIG. 27 This shows the inside of the holder shown in FIG. 26A.

FIG. 28A This is a retainer attaching the display panel to the bag. The retainer has 3 layers with an electrical connection between.

FIG. 28B This is a magnified view of the retainer distal end and display panel attachment edge clamp connection area.

FIG. 29A This shows that the two layer retainer and the holder front may be run parallel to the bag and connected together with the bag.

FIG. 29B This is a magnified view of the retainer and holder attaching to the bag.

FIG. 30A This shows the display panel and electrical connection separated from the bag and retainer.

FIG. 30B This is a magnified view of the electrical connection to the display panel.

FIG. 30C This is a magnified view of the electrical connection designed to match a computing unit inside the bag.

FIG. 31A This shows the display panel propped in an operating position.

FIG. 31B This is a magnified view of the retainer extending over the top of the holder and suspending the display panel in an operating position.

FIG. 31C This is a magnified view showing that the retainer may be attached (riveted) to the holder front wall. A rigid contact surface may also be present.

FIG. 32A This shows the display panel in a storage position inside the holder.

FIG. 32B This is a magnified view showing the two layer retainer around the display panel attachment edge and the attachment of the retainer and holder front to the bag.

FIG. 32C This is a magnified view showing that the retainer is attached to the holder front about half way into the holder. Although the retainer is continuous from the bag front, it folds over at the attachment with the holder front.

FIG. 33 This is the bag computer showing the line of cross section for FIGS. 34A to 37B. The cover/intermediate panel (8) is shown on the bag front.

FIG. 34A This is a side view cross section (at A/B of FIG. 33) of the cover/intermediate panel and display panel (bag missing) with the display panel in a storage position parallel to and next to the inside surface of the cover/intermediate panel.

FIG. 34B This is a magnified view of the FIG. 34A pivoting mount area showing the flexible fabric attachment flap/retainer and its attachments to the display panel and to the cover/intermediate panel.

FIG. 35A This is a side view cross section (at A/B of FIG. 33) of the cover/intermediate panel and display panel (bag missing) with the display panel in a operating position parallel to and next to the outside surface of the cover/intermediate panel. Note that the display panel has rotated 360 degrees from FIG. 34A.

FIG. 35B This is a magnified view of the FIG. 35A pivoting mount area showing the flexible fabric attachment flap/retainer and its attachments to the display panel and to the cover/intermediate panel.

FIG. 36A This is a side view cross section (at A/B of FIG. 33) of the cover/intermediate panel and display panel (bag missing) with the display panel in an operating position and propped at about perpendicular to the cover/intermediate panel.

FIG. 36B This is a magnified view of the FIG. 36A pivoting mount area showing details of the flexible fabric attachment flap/retainer, its attachments to the display panel and to the cover/intermediate panel and the display panel prop.

FIG. 37A This is a side view cross section (at A/B of FIG. 33) of the cover/intermediate panel and display panel (bag missing) with the display panel in an operating position and propped at about perpendicular to the cover/intermediate panel. In this case, the display panel is quickly and easily removable from the pivoting mount assembly.

FIG. 37B This is a magnified view of the FIG. 77A pivoting mount area showing details how the display panel may be removable from the cover/intermediate panel, attachment flap/retainer and display panel to attachment flap fitting using the matching fittings shown.

FIG. 42 This is the bag adapted to hold a computing unit panel in the inside and the pivoting display panel on the outside of the top wall.

FIG. 43A This figure shows the inside of the bag front wall and the computing unit panel for mounting to it.

FIG. 43B This figure shows how the display panel assembly and its attachment align with the top wall and computing unit panel for mounting.

FIG. 44 This is the bag with the display panel assembly mounted to the bag top wall.

FIG. 47 This is the front side of a display panel including vertical operating position props for angle adjustment of the display panel's vertical operating position on the bag.

FIG. 48A This is a cross section view of the display panel of FIG. 47 at a/b. It shows the vertical operating position prop projecting from the display panel extension prop.

FIG. 48B This is a cross section view of the display panel of FIG. 47 at a/b. It shows that the vertical operating position prop and/or the extension prop may be a part of a jaw used as part of a clamp to attach the display panel retainer to the display panel.

FIG. 49A This is a cross section view of the display panel of FIG. 47 at a/b. It shows the display panel propped against the bag at an angle greater than 180 degrees.

FIG. 49B This is a cross section view of the display panel of FIG. 47 at a/b. It shows the same as FIG. 49A but the vertical operating position prop has been move to a different place on the bag front.

FIG. 50A This is the bag computer with a display panel with vertical operating position prop and in an operating position.

FIG. 50B This is a magnification of FIG. 50A to show detail including the vertical operating position prop.

FIG. 51A This is the bag computer with a display panel with vertical operating position prop and in a storage position.

FIG. 51B This is a magnification of FIG. 51A to show detail including the vertical operating position prop.

FIG. 52 This is the bag computer with a pivoting cover and a pivoting display panel attached to the distal end of the cover. A wireless audio headset is shows on the outside of the cover.

FIG. 53A This is the first of a series of 5 views showing the display panel being attached to the cover distal end and being installed and moved into operating and storage positions. This view is installing 1.

FIG. 53B This is the second of a series of 5 views showing the display panel being attached to the cover distal end and being installed and moved into operating and storage positions. This is installing 2.

FIG. 53C This is the third of a series of 5 views showing the display panel being attached to the cover distal end and being installed and moved into operating and storage positions. This is installed and out of the cover.

FIG. 53D This is the fourth of a series of 5 views showing the display panel being attached to the cover distal end and being installed and moved into 500 operating and storage positions. This is installed and propped in an operating position.

FIG. 53E This is the fifth of a series of 5 views showing the display panel being attached to the cover distal end and being installed and moved into operating and storage positions. This is installed and in the storage position.

FIG. 54A This is a magnified view of FIG. 53A.
FIG. 54B This is a magnified view of FIG. 53B.
FIG. 54C This is a magnified view of FIG. 53C.
FIG. 54D This is a magnified view of FIG. 53D.
FIG. 54E This is a magnified view of FIG. 53E.

FIG. 55 This is the cover and display panel removed from the bag and turned so the inside surface and electrical connections are showing. A wireless audio headset is shows on the inside of the cover.

FIG. 56 This is a wearable propping display apparatus (a type of portable electronic display). It includes a display panel pivotally attached to an operator body prop with an operator body interface adapted to stably contact the operator's body.

FIG. 57 This is the display apparatus of FIG. 56 including a suspension device to hang the display panel from the operator's neck while being propped against him.

FIG. 58A This the display apparatus of FIG. 56 but with a removable operator body interface designed to stabilize the prop against the operator.

FIG. 58B This figure shows and defines various planes relative to the axis between the laterally separated surfaces shown in FIG. 58A.

FIG. 59 This shows the display apparatus of FIG. 56 with a removable operator body interface that also comprises the majority of the operator body prop. The removable operator body interface may include a writing surface.

FIG. 60 This shows a removable operator body interface that is extended to reposition the display panel in the operator's view.

FIG. 61A This shows that the removable operator body interface may include a keyboard and/or wireless communication equipment for distant communication.

FIG. 61B This shows that the removable operator body interface may include a write pad or touch pad.

FIG. 62 This shows that the removable operator body interface may include an eyeglass holder, sound equipment (speaker), sound equipment holder, battery and/or wireless communication equipment for distant communication.

Figure 64:
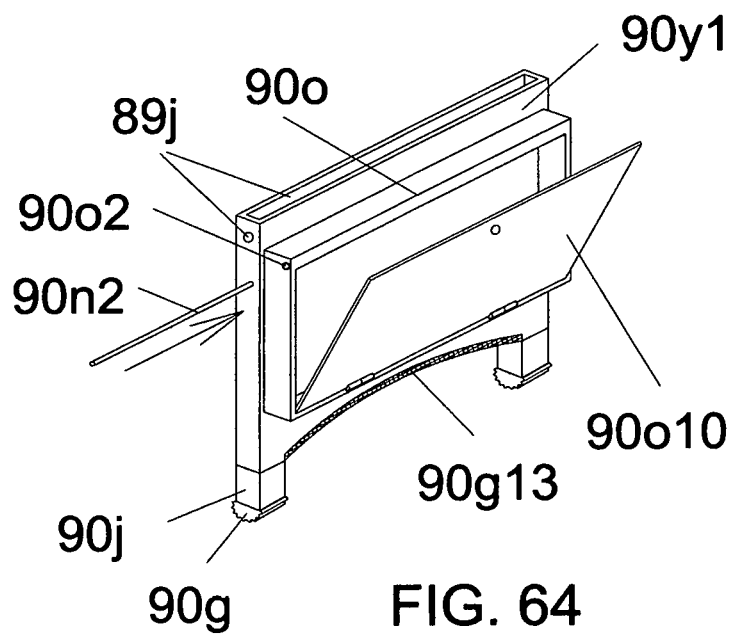

FIG. 64 This shows that the removable operator body interface may include a storage container and/or stylus holder.

Figure 65:
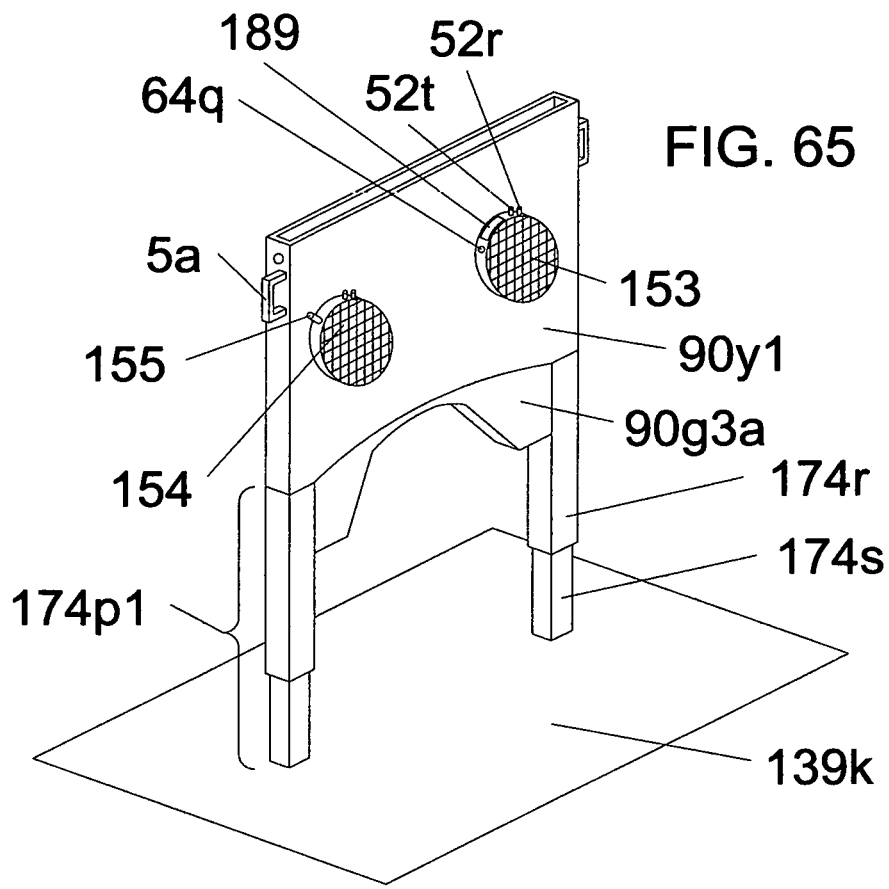

FIG. 65 This shows that the removable operator body interface may include sound equipment (speaker or microphone), battery and/or wireless communication equipment for distant communication.

Figures 66A, 66B:
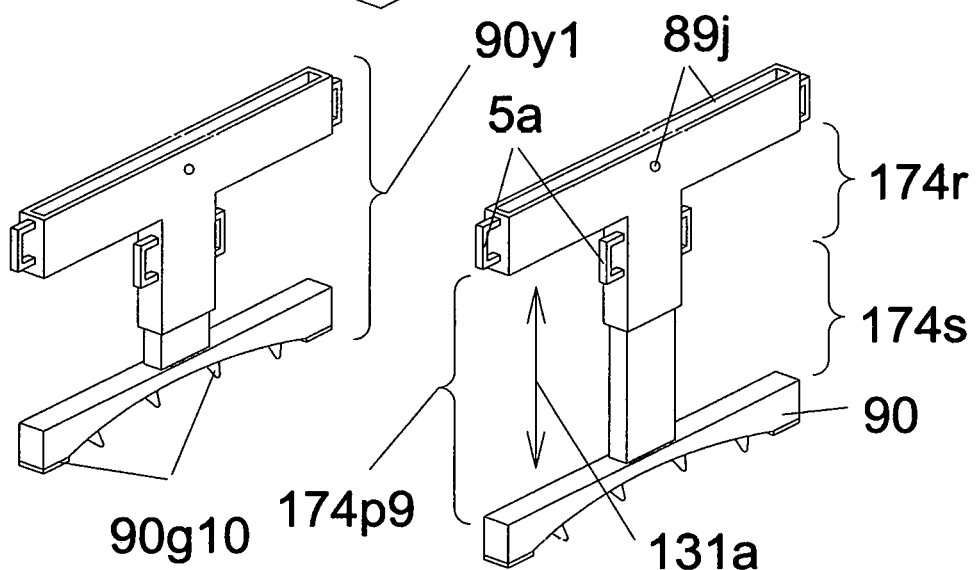

FIG. 66A This shows that the removable operator body interface may come in a variety of shapes and may include a length adjuster and length adjuster holder (in a retracted position).

FIG. 66B This is the removable operator body interface of FIG. 66A in an extended position.

FIG. 67 This shows that the removable operator body interface may be adapted to use with a lap top or notebook (lap top) computer (a type of portable electronic display) for portably propping and positioning the display panel in the operator's view.

FIG. 68 This shows that the removable operator body interface may be adapted to attach to and be used with the length adjusters of a wearable propping display apparatus (the adjusters are shown as sliding legs).

FIG. 69 This shows that the removable operator body interface may be adapted to attach to and be used with the length adjusters of a wearable propping display apparatus (the adjusters are shown as pivoting legs).

FIG. 70A This shows the removable operator body interface positioned for attachment to a bag with vertical operating position capability. The interface attaches to socket-like attachments on the bag that are also vertical bag stiffening members.

FIG. 70B This shows the removable operator body interface positioned for attachment to a bag with vertical operating position capability. The interface attaches to the bag bottom end area using adhesive, hook and loop, clips snaps or similar attachment.

FIG. 70C This shows the removable operator body interface of FIG. 70B attached to the bag with vertical operating position capability (a type of portable electronic display).

FIG. 71A This shows the front side view of a bag back wall display apparatus including the bag's front wall.

FIG. 71B This shows the back side view of a bag back wall display apparatus. The display is attachable to the bag back wall, coverable with a cover and the bag may be propped against the operator with an operator body interface.

FIG. 72A This shows the bag back wall display apparatus as a bag back wall display mounting frame with display and cover. It is separated from the bag but positioned to attach to it.

FIG. 72B This shows the bag back wall display mounting frame of FIG. 72A but now including the operator body interface.

FIG. 72C This shows the bag back wall display mounting frame of FIG. 72B attached to the bag but also including molding edges to shape the frame and bag contours smoothly together.

FIG. 73A This shows the bag back wall display mounting frame made for a removable display panel.

FIG. 73B This shows the back side of the bag back wall display mounting frame of FIG. 73A, the side adjacent to the bag when mounted to it.

FIG. 74 This shows the bag back wall display mounting frame (now called a surrounding frame) made for a display panel already attached to the bag back wall.

FIG. 75 This shows the bag back wall display mounting frame attached to the bag. The display panel is now pivotally attached to the top end of the frame and can be moved from storage to operating position (shown) by pivoting.

FIG. 76 This shows the stability characteristics of the removable operator body interface attached to a wearable propping display apparatus (or lap top computer) worn by an operator (front view of the operator).

FIG. 77 This shows the stability characteristics of the removable operator body interface attached to a wearable propping display apparatus (or lap top computer) worn by an operator (side view of the operator).

DETAILED DESCRIPTION OF THE INVENTION

Shown in FIG. 1A and FIG. 1B, this computer includes a bag 1 which may have a front wall 2, a top wall 3, and one or more side walls 4. Each wall has an inside surface and outside surface (the outside surface of the bag front wall is shown at 2a in FIG. 1B) and the bag walls may enclose a bag interior. The top wall may have an opening 6 to access the interior of the bag and this opening may have a closure such as a zipper, hook and loop or buttons. The bag may have a carrying strap 5 for attaching the bag to the bag wearer and computer operator.

The computer uses a pivoting computer equipment mount (abbreviated PCEM) to pivotally attach the display panel 13 to the bag. The PCEM is configured to deploy the display panel by pivoting along a horizontal axis 7 parallel to the bag front wall into various angles relative to the bag front wall and suitable for viewing by the operator. The PCEM may be an axle/bearing combination, flexible fabric or other means to attach computer equipment, such as a display panel, to the bag while allowing it to pivot by its attachment edge 42. The PCEM may be a retainer 12, especially when it includes several sections or pivoting axes. The PCEM (or a retainer) may be made of flexible fabric such as a flexible fabric attachment flap or a flexible fabric attachment filament. The display panel pivoting may be located at the top of the computer equipment storage area near the junction 14 of the top and front bag walls (also called the top or top edge 14 of the bag front wall). The display panel may attach to the retainer 12 using a pair of jaws 56 or clamp matching the retainer and located on the display panel near its attachment edge 42.

The display panel has a front side 40 and the display 45 is located on the front side of the display panel. Thus, as shown in FIG. 1A, when the display panel is approximately perpendicular to the bag front, the display 45 is facing upward toward the bag wearer and computer operator. The upward direction is from the bottom end of the bag toward the top end of the bag and is illustrated by the upward arrow 131, the downward direction 139 being the opposite direction.

Shown in FIG. 1B, when the display panel is pivoted downward and hanging approximately parallel to the bag front 2a in a storage position, the display 45 is facing away 137 from the bag front wall. When thus stored, the display panel is located in the computer equipment storage area 71, a portion of the outside surface of the bag front wall, shown here with the support structures filling the majority of this area. When slidably stored in a holder on the bag front wall or when the display panel is in a vertical operating position (see FIGS. 2D and 70A to 70C), display panel's display may face a direction toward 138 the bag front wall and toward the operator (wearer) in an operating position.

The bag may include one or more heat dissipation outlets 120, sound outlets 121 or a combination of the two and these may be located in the top wall, front wall or other bag wall. These align with a computing unit panel mounted in the bag interior and allow heat and sound from it to exit the interior of the bag.

The bag may include a support structure 10 found in the computer equipment storage area. The bag may include a pivoting cover 8, such as a flap or rigid shaped cover matching the computer equipment in the computer equipment storage area. The pivoting cover may be attached to the bag near the bottom 9 of the computer equipment storage area and can pivot from an operating position hanging down about parallel to the bag front wall to a storage position upward and covering the computer equipment storage area and any equipment in it. The pivoting cover may include matching attachments 70 to hold it in the storage position.

Figure 2A:
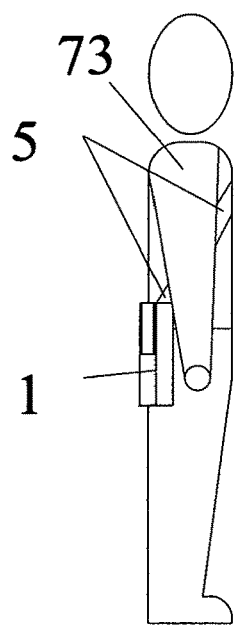
FIG. 2A This is a bag computer operator wearing the bag computer in a storage position.
Figure 2B:
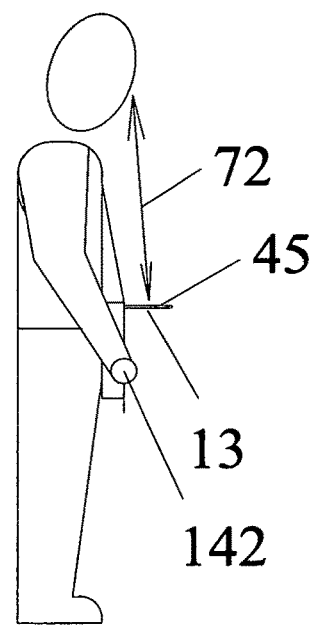
FIG. 2B This is a bag computer operator wearing and operating the bag computer in an operating position. His hands are typing.
Figure 2C:
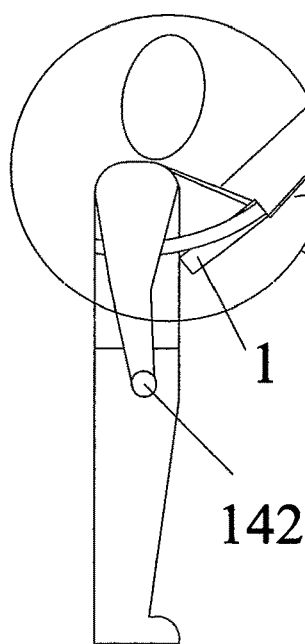
FIG. 2C This is a bag computer operator wearing and operating the bag computer in an operating position. His hands are operating controls on the display panel.
Figure 2D:
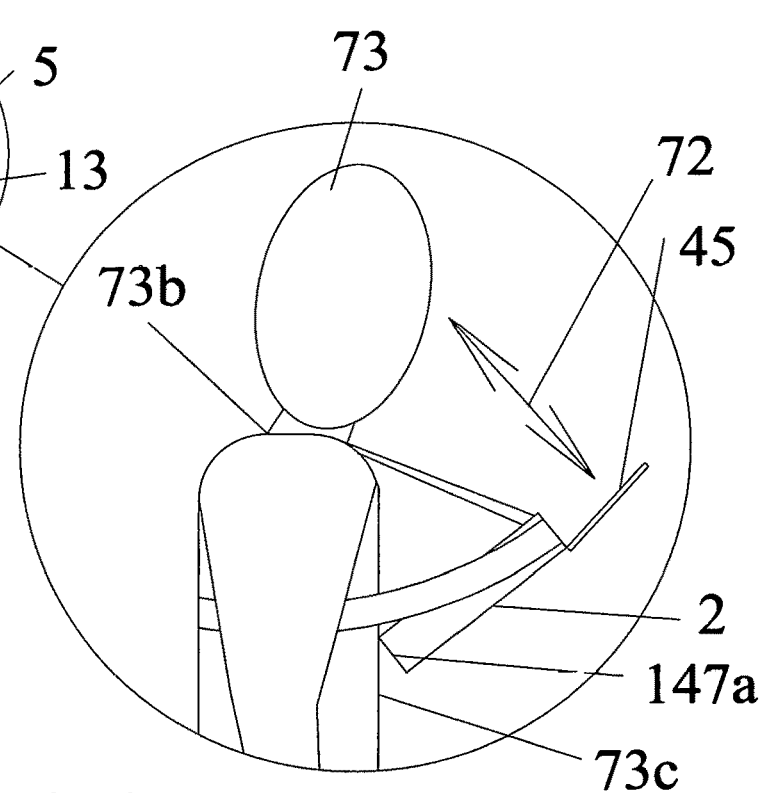
FIG. 2D This is a magnified view of the operator in FIG. 2C.

Shown in FIG. 2A, when the computer is in storage position and not in use, the bag wearer and computer operator 73 may wear the bag 1 by its suspension device 5 (carrying strap) like a normal shoulder bag or other personal strap carried bag. When in an operating position, for example FIGS. 2B, 2C and 2D (magnified), the bag is positioned in front of the operator with the display panel 13 pivoted on the horizontal axis so that the display 45 is in the line of sight 72 of the operator. FIG. 2C and FIG. 2D show the display panel in a vertical operating position with the display viewable (in the operator's line of sight) over the top of the bag top end (top wall) and the bag 1 bottom end area 147a pushing against the operator's body front stomach/chest surface area 73c and propping the display panel away from the operator's body while the computer is suspended by the suspension device 5 from the operator's upper body neck/shoulder area 73b so that the operator may view the display 45 near his normal forward line of sight and without holding the display panel with his hands. The bag computer may be operated with an operator hand 142 (FIG. 2B) or the bag and display panel may be held in place without using any hands (FIG. 2C). The bag's front wall 2 is the side away from the wearer (operator).

This vertical operating position is also representative of the position used with a wearable propping display apparatus or with a notebook (lap top) computer equipped with a removable operator body interface and suspension device as described elsewhere in this and cross referenced applications (see also FIGS. 57, 67 and 70C). In these cases, the operator body prop or the computer body panel (respectively) substitute for the bag.

As shown in FIG. 3 is the bag computer sliding attachment and retainer type display panel mount used to deploy the display panel 13 from a storage position into an operating position. The display panel, retained to the bag and/or holder by a retainer 12 (a type of pivoting computer equipment mount and may be an attachment flap), slides upward 131 out of the storage position in the holder 11 on the bag front wall (display panel shown in dotted lines) and is then pivoted downward 139 into an operating position useful for viewing by the operator.

In the exploded view FIG. 4A, the support structure 10 is designed to attach to the outside of the bag's 1 front wall 2. Its purpose includes assisting in storing the display panel to the bag, protecting the display panel when stored, and assisting in deploying the display panel from its storage position to an operating position.

The support structure is located in the computer equipment storage area 71, a portion of the outside surface of the bag front wall, so that when the display panel is moved into operating position it is positioned near the junction 14 of the top and front walls (also known as the top end or top edge of the bag front wall) so that the display is as close as possible to the operator wearing the bag and the apparent size of the display is maximized.

The support structure 10 may include a holder part 11 and a retainer part 12. The holder part may be any construction that allows the display panel 13 to slide into and out of the holder from the side closest to the junction of the bag top and bag front walls (holder top end). The holder front has an outside surface 136. The retainer (shown as an attachment flap in this figure) has a top end 140 and a bottom end 141 and both ends are designed to be fixed to either the bag or the holder when ready for use (shown in this figure for attachment to the bag wall). Along with attaching the display panel to the bag, the retainer also serves as a guide along which a display panel, including a slide attachment which functions as a traveler, can slide and be directed upward without pivoting and out of its storage position. The retainer also allows a pivoting motion which allows the display, once out of the holder, to be pivoted into an operating position in the view of the operator. In this figure, the area of display panel attachment to the retainer is shown as a loop or fold of retainer material 111a which passes through the display panel slide attachment slot. The display panel may be slidably attached to the retainer using a slide attachment such as a slot 77 and a bar 76 which may be removable for installation of the retainer (see FIG. 7A).

FIG. 4B shows that the retainer may be an attachment filament 111 that attaches by both ends to the bag or holder and passes (here shown as a sliding loop 111a in the retainer attachment filament) through the display panel's slide attachment (see FIG. 7C) and may be an alternative for the attachment flap retainer 12 shown in FIG. 4A.

Alternatively, two retainers (of this type) located on the two side walls of the holder may be used with two slide attachments on the right and left edges of the display panel.

This sliding attachment and retainer type display panel mount may be used to attach and store the display panel to a pivoting cover, in which case the holder is a cover (see FIGS. 52 to 55, cover 8).

Shown in FIG. 5, is the holder top end 15. The end of the holder distal from the junction of the bag top wall and bag front wall is the holder bottom end 16. The holder may have side pieces 17 to attach the holder front 18 to the bag.

The holder may be pocket like and may be made of flexible material, such as bag cloth and may be sewn, glued or bonded to the bag. The holder may be made of a rigid material, such as plastic or metal. The holder may include a back side 76 to protect the display panel from forces from inside the bag and the holder may include attachments such as mounting holes 31 to fix the holder to the bag. The holder may be bracket-like, ring-like or rail-like so that a portion of the display is left exposed, especially at its the bottom or front.

The bottom side 19 of the holder may be extended so that the holder is longer than the display panel. This produces a volume of space at the bottom of the holder and this area may be used as the bottom end retainer storage area for excess retainer material.

The holder may have a holder top end opening 20 for the display panel to slide into and out of the holder. The top end of the holder front may have a holder top front edge 21. The top end of the holder side pieces may have holder top side edges 22.

The top front edge of the holder may include a top front edge reinforcement bar 23 which may be rigid to keep the top front edge straight even under a load, to provide for an axis for the display panel to pivot around and to smoothen the holder top front edge to accommodate retainer material. The top side edge may be rigid and/or reinforced with top side edge reinforcements 24 in such a way to keep the reinforcement bar on the top front edge from collapsing against the front wall and closing the opening in the top end of the holder. The reinforcement bar may be smooth and rounded and may have top edge guides 25 near the top side edges to hold the retainer in a proper position, normally in the center of the top front edge.

The retainer part may be made of a flexible material such as a sheet, cloth, filament, cord, line, strand, wire, belt, electrically conductive wire or cable, strap, chain or other flexible fabric. The retainer material should be capable of retaining the display panel to the holder or bag front wall while still being pliable enough to not interfere with the movement of the display panel into and out of the holder. One suitable type of retainer would be a flat sheet forming an attachment flap and this type of retainer will be used as an example although other types of retainer, such as a filament, may be substituted in many cases. The retainer is a type of pivoting computer equipment mount, a means to pivotally hold computer equipment, such as a display panel, input device, keyboard, electrical write pad, camera or other equipment, to a bag. When the retainer is attached to the attachment edge of the computer equipment, both the front and back of the computer equipment is available for use.

The display panel, shown in FIGS. 6A, 6B, and 6C, is panel-like and has a front side 40 (FIG. 6A), a back side 41 (FIG. 6C), an attachment edge 42, a distal edge 43, and two side edges 44. The display panel may be shaped and sized to fit the inside of a holder, rigid holder or holder receptacle for storage. A display 45 is located on the front side of the display panel. The front side of the display panel may include a touch screen control 130 (indicated by pencil drawing line). For control of the computer or display, the back side of the display panel may include manual controls such as a touch pad/pointing device 46, joystick pad 47 or buttons 48 (e.g. pointing device "clickers"). For faster and more accurate control, the controls may be located on the display panel so that the touch pad may be controlled by the fingers of one hand (e.g. right) and the clicking buttons controlled by the fingers of the other hand (e.g. left). The back side may include one or more finger guides 49 or control guards 49e (for example, a control recessed into the display panel surface or a ridge rising above the display panel surface) to help the operator's finger find a control on the back side (finger guide) and to protect the controls against inadvertent activation (control guard). The finger guides and/or control guards may be removable. The display panel back side may also include a prop or prop fixtures 50 designed to hold an angle between the display panel and bag front by placing a prop between them. The display panel prop 51 may take the form of an extension of the display panel. This prop/extension may be fixed to the attachment edge of the display panel and may be on the same plane as the plane of the display panel or may be angled relative to the plane of the display panel.

The distal edge of the display panel may include a handle or ledge 60 which may serve to keep the display panel from entering the holder too far and assist in extracting the display panel from the holder. The display panel may also include one or more front side guard rails 79 to keep the display on the front side from rubbing against the holder or bag. The display panel may include one or more back side guard rails 80 to provide space between the holder and display panel for an electrical connection wire to fit between them and to keep controls from being actuated while in the storage position.

Shown in FIG. 6D, FIG. 6E and FIG. 6F, the display panel may have an electrical connection 64 to connect it with an electrical connection 64c on a computing unit panel 88 (FIG. 6D) attached to the inside front wall of the bag or connect with an electrical connection 64k on the audio connector 146 (FIG. 6E) attached to the inside wall of the bag or connect with an electrical connection 64i on a battery 189 (FIG. 6F) or connect to a peripheral inside the bag or connect with a computing unit or battery that may be part of a holder or cover attached to the outside of the bag. The connection may be a wire 68 long enough to reach through an attachment flap electrical access channel and/or through the front wall to the inside of the bag. Alternatively, the display panel may include a disconnectable electrical connection 67, such as a socket or plug, designed to match and electrically connect with an electrical connection fixture on the retainer distal end.

The retainer may be attached to the display panel on or near the display panel attachment edge. If the display panel includes a prop extending from the attachment edge for holding the display panel angle, the attachment edge may not be on an edge of the display panel. In this case, the attachment edge may be a line of attachment, axis of attachment or point of attachment of the retainer to the display panel near the attachment edge (e.g. see FIG. 49B). The display panel may be removable from the retainer. For easy removal, the display panel may have an attachment on or near its attachment edge to match and connect with the attachment on the retainer distal end. The attachment on the display panel may be a clamp or two jaws 56 adapted to hold retainer or attachment flap to the display panel.

For privacy, the operator may want to blacken the display panel when it is not in use and hanging down in front of the bag. The display panel may include an electrical down position on/off switch 132 to turn off the display when the display panel is in the storage position in front of the bag (see FIG. 1B). The switch may be a button or lever located on the display panel so that it is actuated by pressing against the bag or holder when the display panel is in the storage position. The switch may be a gravity switch which senses and is actuated when the display panel is vertically down, for example, in the storage position.

Shown in FIGS. 7A, 7B and 7C, the display panel attachment edge 42 may be adapted to slidably fit onto a retainer that forms a guide on which the display panel slides. In this case, the display panel may include a display panel slide attachment 75 (indicated by a brace) on or near the display panel attachment edge and adapted to slide along the retainer from a storage position to an operating position. This slide attachment may be comprised of a bar 76 or axle separated from the attachment edge by a slot 77 opening through which the retainer (for example, a sheet, flap or strip) can pass and slide as the display panel is moved between operating and storage positions.

Alternatively, shown in FIG. 7C, the display panel slide attachment may be comprised of one or more slide holes 78 or other openings in the display panel near the attachment edge to match one or more retainers such as a filament, band or strip.

If the display panel includes a prop 51 extending from the attachment edge for holding the display panel angle, the attachment edge may not be on an edge of the display panel. In this case, the attachment edge may be a line of attachment, axis of attachment or point of attachment of the retainer to the display panel near the attachment edge of the display panel (e.g. see FIG. 49B). A prop or props on the attachment edge may be a right prop 51a and/or a left prop 51b to the right and/or left of the display panel, slide attachment, bar, slot or hole. An electrical connection 64 may be included.

FIG. 7D shows that the display panel may be removable from the retainer. For removal, the bar 76 may be detachable from the display panel 13, for example by sliding out of the display panel, so the retainer can be put in place in the attachment edge slot (see FIG. 4A). Alternatively, an end of the retainer may be disconnectable from the bag or holder so it can be passed through the slot or hole in the slide attachment in a display panel including, for example, a molded in or fixed slot or hole.

FIGS. 8A to 11C show cross section views (cut sections shown with 45 degree hatching) of the bag 1, display panel 13 and support structure 10 (holder 11 and retainer 12) cut through at A/B in FIG. 12 and aligned along a plane shown with the perpendicular dotted line near the top of the bag. In this figure the retainer is a guide along which the display panel with a slide attachment may slide.

In FIG. 8A with parts magnified in FIGS. 8B and 8C, the display panel 13 is installed to the bag 1 but removed from the holder 11 with an upward movement. The retainer 12 top end 140 is attached near the top front edge 21 of the holder front side 18 and, in this case, may be an extension of the holder front extending upward from the top front edge of the holder. The retainer then goes around the bar 76 and through the slot 77 of the display panel slide attachment and then extends downward where the retainer bottom end 141 attaches to the holder bottom side 19 or to the holder front side near the holder bottom end 16. The display panel is free to pivot where the retainer rounds the display panel bar or hole.

In FIG. 9A with parts magnified in FIG. 9B, the display panel 13 has been pivoted into an operating position with the retainer 12 hanging slightly over the holder top front edge 21. The display panel is free to pivot where the retainer rounds the display panel bar or hole and may be moved into a useful operating position. In these drawings, a contact surface 37 and a top front edge reinforcement bar 23 are included. The support structure 10 is shown in FIG. 9A.

In FIG. 10A with parts magnified in FIG. 10B, the arrangement of FIG. 9A is shown again but in this case a prop 51 is included so that the display panel 13 is suspended by the retainer 12 and the prop pushes against the bag and holder to hold the display panel at one or more angles 110 relative to the bag front wall.

In FIG. 11A with parts magnified in FIGS. 11B and 11C, the display panel 13 is in a storage position in the holder 11. FIG. 11B shows that the handle/ledge 60 at the distal end of the display panel may serve to maintain the position of the display panel in the holder and holder top end opening, to extract the display panel from the holder and to cover the holder top front edge and exposed retainer 12. FIG. 11C shows the display panel attachment edge area including the slide attachment and bar 76 with the retainer 12 bottom end 141 attached to the holder with the retainer still holding the display panel to the bag.

The series of drawings, FIG. 13A to FIG. 16C, show cross section views (cut sections shown with 45 degree hatching) of the bag 1, display panel 13 and support structure 10 cut through at A/B in FIG. 12 and aligned along a plane shown with the dotted line. They show that the retainer top end and bottom end may be alternatively attached, fixed, or fastened to the outside surface of the bag front wall instead of to the holder.

In FIG. 13A with parts magnified in FIGS. 13B and 13C, shows the display panel 13 withdrawn from the holder 11 through the top end opening 20 but is still attached to the bag with the retainer. It shows the retainer 12 top end 140 attached to the bag 1 front wall 2 outside surface 2a near the holder top end opening and the retainer bottom end 141 attached to the bag front wall outside or holder bottom 19 near the holder bottom end 16. The retainer leads around the slide attachment (bar 76) thus slidably holding the display panel to the bag. Thus the attachment from the bag to the display panel is a loop in the retainer (in this case an attachment flap but may alternatively be an attachment filament).

In FIG. 14A with parts magnified in FIG. 14B, the display panel 13 is in an operating position with the retainer 12 leading over the holder top front edge 21 and the display panel is pivotable by the slide attachment (bar 76) to any operating position.

In FIG. 15A with parts magnified in FIG. 15B, the same arrangement as FIG. 14A is shown but here a prop 51 is used along with the retainer 12 suspending the display panel 13. With the prop pushing against the holder 11 and bag 1, the display panel may hold and be operated at one or more angular positions 110 relative to the bag front wall.

In FIG. 16A with parts magnified in FIGS. 16B and 16C, the display panel 13 is now in storage position in the holder and the retainer 12 top end 140 is attached to the bag 1 near the holder top end opening 20. The bottom end 141 of the retainer is attached to the bag front wall 2 or holder bottom side 19 near the holder bottom end 16.

In various alternatives: The retainer top end may be attached to the holder near the holder top end and the retainer bottom end may be attached to the bag near the holder bottom end: The retainer top end may be attached to the bag near the holder top end and the retainer bottom end may be attached to the holder near the holder bottom end. The result is a stationary guide (the retainer) along which the display panel slide attachment may slide.

FIGS. 17 to 25B show a simplified version of the sliding attachment and retainer type display panel mount that easily mounts and dismounts the display panel to the retainer, holder and bag. FIGS. 17 to 20 show a cross section side view (cut sections shown with 45 degree hatching) of the bag, support structure and display panel at A/B in FIG. 12. Since the majority of the retainer is hidden inside the holder, inserting and removing the retainer from the slide attachment on the display panel can be difficult. The following embodiment uses a band-like holder with open top and bottom along with a retainer with one end detachable and re-attachable to an attachment in an accessible place on the holder or bag.

Shown in FIG. 17, the retainer 12 is a long upward extension of or addition to the front 18 of the holder 11. The retainer may be passed through a slot or hole in the slide attachment 75 on the display panel 13. The retainer can then be turned and passed downward through the holder top end opening 20 as shown in FIG. 18. In FIGS. 19A and 20, the retainer is at the bottom of the support structure 10 and may be passed through the holder bottom end opening 125. One or more attachments near the bottom end 141 of the retainer can be attached to one or more matching attachments on the holder 11 (FIG. 19B, 66b) or, alternatively, on the bag 1 front (FIG. 20, 66b). FIG. 19A and FIG. 19B, a magnification of the circled area of FIG. 19A, shows that the holder front may include a contact surface 37 which may cover most or all of the outside surface of the holder front 136 and may include the attachment 66b matching the retainer bottom end attachment 66a. The contact surface may be rigid and may be panel that is all of, part of or attaches to the holder front and forms a compression column against which the retainer may pull without collapsing the holder front.

FIG. 21, in the bottom right corner of the sheet, shows a flat plan for a possible pattern (in one half scale) for the support structure material before it is affixed to the bag. The holder front (11, shown coinciding with the contact surface) may be covered with a contact surface 37 which may be a part of or attached to the pattern material and is shown with a squiggly line pattern. The plan also shows the retainer 12 and holder side pieces 17. The support structure (holder sides) may be sewn, riveted, glued, bonded or otherwise attached to the bag.

FIGS. 22 to 25 shows style of cross sectional view (cut sections shown with 45 degree hatching) and the same way of attaching the display panel 13 to the retainer 12 as in FIGS. 17 to 20 but in this case the retainer is a long downward extension of or addition to the front 18 of the holder 11.

The figures show the retainer 12 bottom end 141 attaches to the holder bottom end and extends downward from the holder front 18 with retainer top end 140 turning and passing upward through the bottom end opening 125 of the holder (a side to side band open at the bottom and top ends) 11, through the holder top end opening 20, through the slide attachment 75 on the display panel 13 and being attached to the outside surface of the holder front 136 (FIG. 24) using matching attachments 66a and 66b. The attachment near the retainer top end 140 may be or include a contact surface 37. FIG. 25A and FIG. 25B show that the attachment of the retainer top end 140 may, alternatively, be to the bag 1 instead of to the holder and may use attachments 66a and 66b.

It is easy to imagine, instead, that either the top end or the bottom end of the retainer, whether extending upward or downward, may removably attach to the bag or holder with the opposite end permanently fixed to the bag or holder for the same purpose of installing or removing the display panel to the retainer, support structure and bag. As in other description and drawings, a prop may be included near the display panel attachment edge.

FIG. 26A to 32C show a bag computer holder with a retainer end to display panel mount. In this arrangement the display panel deploys upward out of the holder and pivots into an operating position. In contrast to the previously described embodiment, these figures show the retainer having two ends with one attached to the bag or holder and the other attached to the display panel.

In the exploded view of the bag and support structure, FIG. 26A, and in the inside view of the holder, FIG. 27, the support structure 10 is attached to the outside of the bag's 1 front wall 2 in the computer equipment storage area 71 which may include a top 9a and a bottom 9. The bag front wall may have a top end 14.

The support structure may have a holder 11 part and a retainer part 12. The holder part may be any construction that allows the display panel 13 to slide into and out of the holder from the side closest to the front wall top end (e.g. holder top end opening 20). The holder may have a front 18, a top end 15, a bottom end 16, a top end opening 20, a top front edge 21, bottom side 19 and one or more side pieces 17. The holder front may have an inside surface 135 and outside surface 136. The holder may be fitted with a contact surface 37 to assist in temporarily holding a display panel prop to the holder. The contact surface, holder and/or retainer may be attached together by, for example, riveting 38 or sewing through the holder front.

The display panel may be adapted to fasten to the retainer or retainer distal end, for example, by using a clamp, two jaws 56 or other means.

The bag may include an electrical access opening 112 to allow an electrical connection from the display panel to pass the bag front wall 2 to the interior 87 of the bag 1 which may hold electrical equipment or general cargo. Any of the walls may have an inside surface 85 (show as a side wall inside surface).

FIG. 26A also shows that one or more fasteners 102a, such as screws, may be used to fasten the holder through openings in the front wall 31a to matching fastening fixtures 31, such as screw holes, in a computing unit panel 88 meant to be attached to the inside of the bag front wall. Any sort of holder may be used in this fashion to hold both the holder and the computing unit panel to the bag and its walls.

FIG. 26B shows that the holder may be a ring holder 11 without front, sides or bottom. With its proximal end 27 attached to the bag's computer equipment storage area 71, the retainer 12 distal end 26 passes upward through the ring holder top end opening 20 and over its top front edge 21 to hold the display panel to the bag. The ring holder top end opening is large enough for the display panel to pass through and the display panel may be held in place by its handle/ledge 60.

FIG. 27 shows the retainer and holder with its inside surface 135 showing. The retainer may be an attachment flap 39, attachment filament, flexible fabric or other means to attach the display panel to the bag and/or holder. The retainer may have two ends, a proximal end 27 attached to the bag and a distal end 26 for attaching to the display panel. The proximal end may be adapted to fasten the retainer to the bag or the holder. The retainer 12 proximal end may attach to the inside surface 135 of the holder with, for example, sewing 29 or riveting 38.

This holder and retainer end to display panel type display panel mount may be used to attach and store the display panel to a pivoting cover, in which case the holder is a cover (see FIGS. 52 to 55, cover 8).

FIG. 28A to 32C show an improvement to the support structure of FIGS. 26A, 26B and 27 where the retainer 12 includes a proximal end 27 and a distal end 26 with the distal end attached to the display panel and the proximal end attached to the bag 1 or holder. The retainer is double layered and parallels the holder front. The purpose of this arrangement is to make series of parallel layers of material that may be easily manufactured by attaching them together with, for example, sewing, gluing, bonding and/or riveting. The layers provide a continuous and protected electrical access channel to the bag interior that is easily manufactured. All the figures show cross section views (cut sections shown with 45 degree hatching) of the bag 1, display panel 13 and support structure 10 cut through at A/B in FIG. 12 and aligned along a perpendicular plane shown with the dotted line. The cut sections shown with 45 degree hatching.

Shown in FIG. 28A and magnified in FIG. 28B, the retainer distal end 26 is attached to the display panel. The retainer 12, which may be an attachment flap, has two layers, a first layer 12a and a second layer 12b, with an electrical access channel 65 between them. The two layers may be of the same flexible fabric material or they may have different characteristics such as the material weight, thickness or elasticity. These two layers may be of different characteristic from the holder with, for example, the 12a and 12b layers being made of a lighter more flexible material and the holder made of a thicker less flexible material while all layers may be sewable.

FIG. 29A and FIG. 29B, a magnification of the circled area in FIG. 29A, show the bag and retainer with the holder, display panel and electrical connection removed. The retainer proximal end 27 may be comprised of two layers, first layer 12a and second layer 12b, fixed (with, for example, sewing or riveting) to the bag front wall 2. The electrical access channel 65 between the two layers aligns with an electrical access opening 112 in the bag front wall.

FIG. 30A shows that the display panel 13 may have an electrical connection 64, such as a wire, adapted to match the electrical access channel in the retainer and the electrical access opening in the bag.

FIG. 30B, a magnification of the circled area in FIG. 30A, shows the electrical connection 64 to the display panel 13 and FIG. 30C, a magnification of the circled area in FIG. 30A, shows the electrical connection 64 adapted to fit the retainer electrical access channel, the electrical access opening in the bag and to match electrical equipment inside the bag such as the electrical connection 64c on a computing unit 88 (FIG. 29A), peripherals or batteries.

FIG. 31A and magnification FIG. 31B show the display panel 13 in an operating position with the retainer two layers, first layer 12a and second layer 12b, and electrical access channel 65 extending over the holder top front edge 21 and suspending the display panel while a prop 51 on the display panel pushes against the holder part of the support structure 10 and bag 1 to hold the display panel at one or more angles relative to the bag front wall 2. FIG. 31C, a magnification of the circled area in FIG. 31A, shows that the retainer may be fixed to the inside of the holder front wall (for example, with riveting 38, sewing or clamping) and/or to the contact surface 37 for the purpose of allowing the retainer to fold in half to remove any slack in the retainer when the display panel is put in storage position (shown in FIG. 32A to 32C). The layers shown are the holder 18 and the two retainer layers, first layer 12a and second layer 12b, with the electrical access channel 65 between these two retainer layers. (For drawing clarity, FIGS. 31A to 31C and 32A to 32C exclude the electrical wire in the electrical access channel.)

FIG. 32A and magnification FIG. 32B show the display panel 13 in the storage position in the holder part of the support structure 10. The retainer 12 (including the two layers) has doubled over and turned downward as the riveting 38 (or sewing or other attachment of the retainer to the holder) holds the retainer to the holder front 18. The holder may be made of material that is normal bag material, extra heavy or stiff bag material, rigid or semi-rigid material or may include parts that are rigid or semi-rigid. The contact surface may be part of the holder. The holder sides may be rigid to hold the holder front away from the bag 1 or may be flexible or elastic to allow or assist the holder front to collapse against the bag front when the display panel is moved into an operating position.

FIG. 32C, a magnification of the circled area in FIG. 32A, shows the bottom end of the support structure, holder and retainer. The retainer curves around the display panel 13 attachment edge (and prop if present), extends upward to the riveting and returns downward along the holder front 18. The retainer layers, first 12a and second layer 12b, along with the electrical access channel 65 and the holder front are attached together with the bag front wall 2 (for example, by sewing, riveting or other means).

The purpose of this arrangement is to simplify and combine the construction of the holder and retainer and to build in an electrical access channel that is entirely enclosed and protected when not in the interior of the bag.

When the display panel of a bag computer is mounted to the distal edge of a cover/intermediate panel (see FIG. 52) the hinge attaching the display panel to the cover may be improved for durability, ease of construction and pivoting characteristics. In FIG. 33, the bag 1 is shown with a cover 8 in a closed position on the bag front wall 2 with the display panel hidden between the cover and bag front wall. The cover (intermediate panel) distal edge 161 is toward the top of the bag front wall. (Please refer to FIG. 52 to see the cover and display panel in an operating position).

FIG. 34A to FIG. 37B show in cross section at A/B in FIG. 33 the improved bag computer intermediate panel to display panel pivoting computer equipment mount. In the magnified views, the cut sections of the retainer are shown with 45 degree hatching. In the magnified views, the cut sections of other components are shown with horizontal and vertical cross hatching.

FIG. 34A is the cross section side view of the cover 8 (also called an intermediate panel) and display panel 13 assembly (for drawing clarity, the bag and front wall are not shown—the cover proximal edge 162 would normally be pivotally attached to the bag front wall) with the display panel in a closed storage position next to the inside surface 8a of the cover. In FIG. 34B, a magnification of the circled PCEM area on FIG. 34A, a pivoting computer equipment mount or retainer 12, here shown as a flexible fabric attachment flap but may alternately be an attachment filament, attaches the display panel to the bag and is shown with 45 degree diagonal hatching. It extends from the display panel attachment 56a, such as a socket/plug, clamp or two jaws, on the attachment edge 42 of the display panel 13 to a cover attachment 56b, such as two jaws, a clamp, glue, sewing, rivet or socket/plug near the cover distal edge. The flexible fabric for a PCEM may be clamped, screwed, riveted or otherwise attached near the distal edge 161 of the cover or may be a part of the cover or its surface, such as a bonded or glued covering, layer or overlay.

Shown in FIG. 35A and FIG. 35B, a magnification of the circled PCEM area of FIG. 35A, the display panel 13 has been pivoted out of the storage position from beside the inside surface 8a of the cover 8 to an operating position next to the outside surface 8c of the cover. The flexible fabric retainer 12 now leads out of the cover. The display panel has rotated 360 degrees 201. This large amount of rotation is due to the use of the flexible fabric retainer as a PCEM.

Shown in FIG. 36A and FIG. 36B, a magnification of the circled PCEM area of FIG. 36A, the display panel 13 is now propped in an operating position outside of the cover 8 and about perpendicular to the cover surface plane. An extension of the display panel is used as a display panel prop 51, contacts the cover and, along with the retainer, holds the display panel in an operating position angle 157 relative to the cover. The flexible fabric retainer 12 suspends the display panel.

One advantage and purpose of attaching the display panel 13 by its attachment edge 42 to the display panel cover 8 (also called an intermediate panel) distal edge 161 is that both the front side 40 and back side 41 of the display panel are exposed for using a computer related tool such as a display, manual controls, camera, heat sink/dissipater. With the back side of the display panel exposed, the operator can use his fingers to manipulate the computer and display panel controls found there (including graphic user interface) while holding the display panel with his hands in a most natural way and with great accuracy.

Shown in FIG. 37A and FIG. 37B, a magnification of the circled PCEM area of FIG. 37A, the PCEM (retainer) may be connected to a display panel clasp 185 designed to removably hold a display panel 13 to the cover 8. The clasp may have a clasp attachment 185a to match a display panel attachment 185b on an edge of the display panel.

FIG. 38 to FIG. 46E show a bag computer apparatus with an computing unit panel display panel mount for bag computer where a display panel/hinge assembly mounts solidly through the bag wall to a computing unit panel inside the bag.

Figure 38:
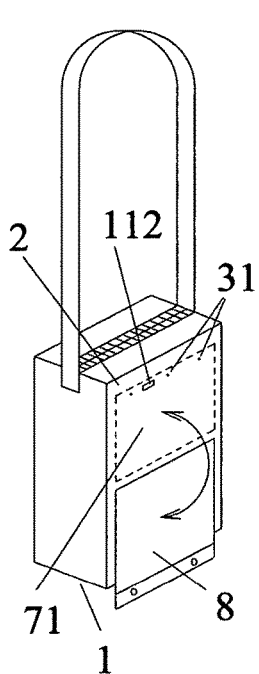
FIG. 38 This is the bag adapted to hold a computing unit panel in the inside and the pivoting display panel on the outside of the front wall.

FIG. 38 shows the bag 1 used to mount a computing unit panel and display panel for the bag computer. It includes a computing equipment storage area 71 on the outside of the front wall 2 for storing the display panel when in a storage position and a pivoting cover 8 to cover the computer equipment storage area and any equipment in it. Also shown are the electrical access opening 112 and one or more bag passage attachment holes 31 through the front bag wall 2 to electrically and physically attach the display panel and computing unit panel together with the bag wall between.

Figure 39:
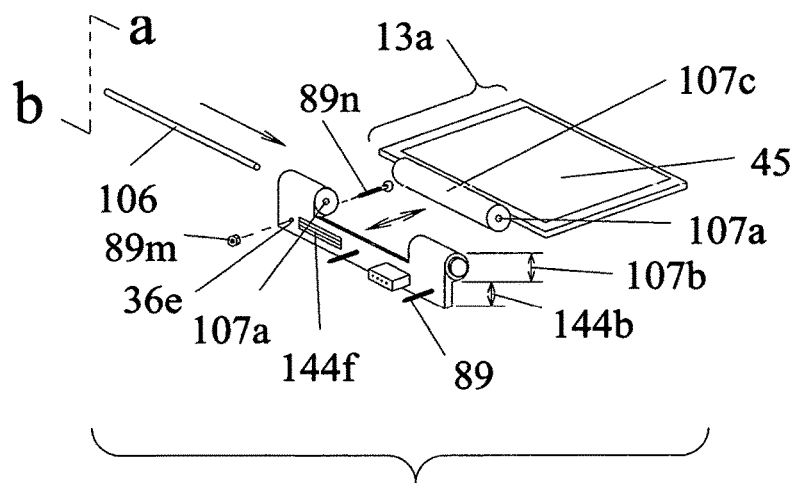
FIG. 39 This is the display panel assembly dissected to show the display panel, mounting flange, axle and axle housings.

FIG. 39 shows the display panel assembly for mounting to the bag. It includes a display panel portion 13*a* and a pivoting computer equipment mount (PCEM) (see 144, FIGS. 41 and 44) comprised of a PCEM to computing unit panel coupling such as one or more projections, sockets or flanges 144*b*, a coupling axle housing 107*b*, a display panel axle housing 107*c* and an axle 106. The display panel portion includes a display 45 facing upward into the view of an operator wearing the bag. The display may include a touch screen and the display panel side opposite the display (the back side) may include manual computer controls such as a pointing device, touchpad, buttons, slides, etc. (see FIGS. 6A and 6C). The flange and display panel axle housings include a bearing hole 107*a* which serves as a bearing for the axle and/or axle sleeve. The PCEM to computing unit panel coupling (in this case the flange) may include display panel assemble fastener 89 (e.g. screw 89*n*, or screw or bolt and nut 89*m*) to attach the display panel assembly to the bag and computing unit via the display panel assembly attachment feature 36*e* (e.g. a hole or socket), the bag passage attachment hole 31, the computing unit panel attachment feature 36*d* (e.g. a hole or socket) and the display panel assembly fastener 89. The PCEM (flange) may include a PCEM to bag gripping surface 144*f*, such as one or more points, ridges, network of lines, elastomeric material or raised or sunken pattern for the purpose of keeping the bag material in place relative to the PCEM (flange).

Figures 40A, 40B, 40C:
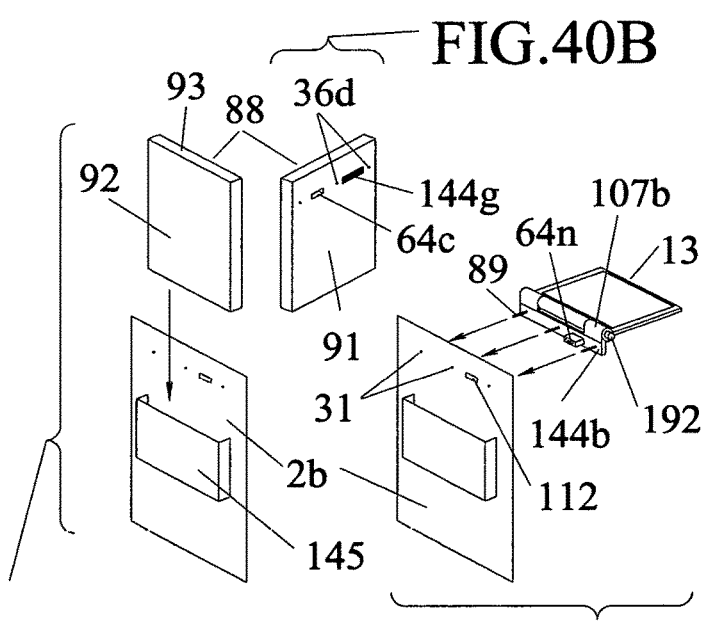
FIG. 40A This figure shows the inside of the bag front wall and the computing unit panel for mounting to it.
FIG. 40B This figure shows the opposite side of the panel (front).
FIG. 40C This figure shows how the display panel assembly and its attachment align with the front wall for mounting.

FIG. 40A shows the inside surface 2*b* of the bag front wall removed from the rest of the bag. It may include a support structure 145 suitable to hold the computing unit panel 88 to the inside surface of the bag front wall. The computing unit panel may have a top edge 93 and a back side 92 which faces away from the bag wall when attached to it. FIG. 40B shows the same computing unit panel but now it is turned so the front side 91 (side facing the bag wall when installed) is visible. This side of the panel may include an electrical connection 64*c* adapted to match the electrical connection on the PCEM flange of the display panel assembly. This side of the panel may include one or more computing unit panel attachment feature 36*d* to match attachment parts connecting the PCEM flange of the display panel assembly to the computing unit panel. The computing unit panel may include one or more computing unit panel to bag gripping surface 144*g* such as one or more points, ridges, network of lines, elastomeric material or raised or sunken pattern for the purpose of keeping the bag material in place relative to the computing unit panel.

FIG. 40C shows the inside surface of the bag front wall 2*b* with the display panel assembly 13 aligned to pass its display panel assemble fastener 89 through the bag passage attachment hole 31 and on into the computing unit panel thus connecting the display panel assembly, bag and computing unit together. It can be seen that the display panel assemble attachments are attached to (or through) the display panel assembly flange 144*b* which also includes a display panel assembly to computing unit panel electrical connection 64*n* aligned to pass through the electrical access opening 112 in the bag front wall for connection to the computing unit panel's electrical connection. Thus the display and the computing unit are electrically connected. Also shown is the coupling axle housing 107*b* which includes a brake control button 192.

Figure 41:
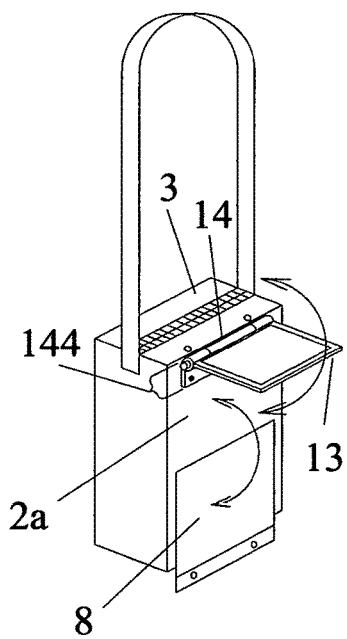
FIG. 41 This is the bag with the display panel assembly mounted to the bag front wall.

FIG. 41 shows the bag, display panel assembly 13, including the PCEM 144, and computing unit panel (not visible) assembled. The display panel assembly is attached to the bag front wall near the top end 14 of the outside surface of the bag front wall 2*a*. The display panel may pivot from a storage position in the computer equipment storage area to one or more operating positions which may include a vertical operating position (see FIGS. 2C and 2D). Also shown are the bag top wall 3 and the pivoting cover 8 for the computer equipment storage area.

FIG. 42 shows a bag 1 very similar to the bag of FIG. 38 and including a computer equipment storage area 71. In this case, though, the electrical access opening 112 and one or more bag passage attachment holes 31 pass through the top bag wall 3 to electrically and physically attach the display panel assembly and computing unit panel together with the bag wall between.

FIG. 43A shows the inside surface 2*b* of the bag front wall removed from the rest of the bag. It may include a support structure 145 suitable to hold the computing unit panel 88 to the inside surface of the bag front wall. The computing unit panel may have a top edge 93. In this case, the top edge of the computing unit panel may include an electrical connection 64*c* adapted to match the electrical connection on the PCEM flange of the display panel assembly. This edge of the panel may include one or more computing unit panel attachment feature 36*d* to match the attachment parts connecting the PCEM flange of the display panel assembly to the computing unit panel. FIG. 43B shows the inside surface of the bag front wall with the display panel assembly 13 aligned to pass its display panel assembly fastener 89 through the bag's top wall bag passage attachment hole and on into the computing unit panel attachment feature 36*d* thus connecting the display panel assembly, bag and computing unit 88 together via the display panel assembly attachment feature 36*e*, the bag passage attachment holes 31 in the bag, the computing unit panel attachment feature 36*d* and the display panel assembly fastener 89. It can be seen that the display panel assemble attachments are attached to (or through) the display panel assembly flange 144*b* which also includes an display panel assembly to computing unit panel electrical connection 64*n* aligned to pass through the electrical access opening 112 in the bag top wall for connection to the computing unit panel's electrical connection 64*c*. The computing unit panel fixtures for these connections are located on the top edge 93 of the computing unit panel. Thus the display and the computing unit are electrically connected. The bag top wall (not shown) is located between the display panel assembly (flange) and the computing unit panel and fixed between them. As in FIGS. 39 and 40B, the computing unit panel and/or PCEM (flange) may include one or more gripping surface (see 144*f* and/or 144*g*) such as one or more points, ridges, network of lines, elastomeric material or raised or sunken pattern for the purpose of keeping the bag material in place relative to the computing unit panel and/or PCEM (flange).

FIG. 44 shows the bag, display panel assembly 13, including the PCEM 144, and computing unit panel (not visible) assembled. The display panel assembly is attached to the outside of the bag top wall 3 near the top end 14 of the bag front wall 2. The display panel may pivot from a storage position in the computer equipment storage area into one or more operating positions which may include a vertical operating position (see FIGS. 2C and 2D). Also shown is that the pivoting cover 8 for the computer equipment storage area may include one or more cover attachments 70b matching flange cover attachments 70a on the flange 144b of the PCEM to keep the cover in place over the equipment in the storage area. Also show is the brake control button 192 on the PCEM flange axle housing of the display panel assembly.

Figure 45:
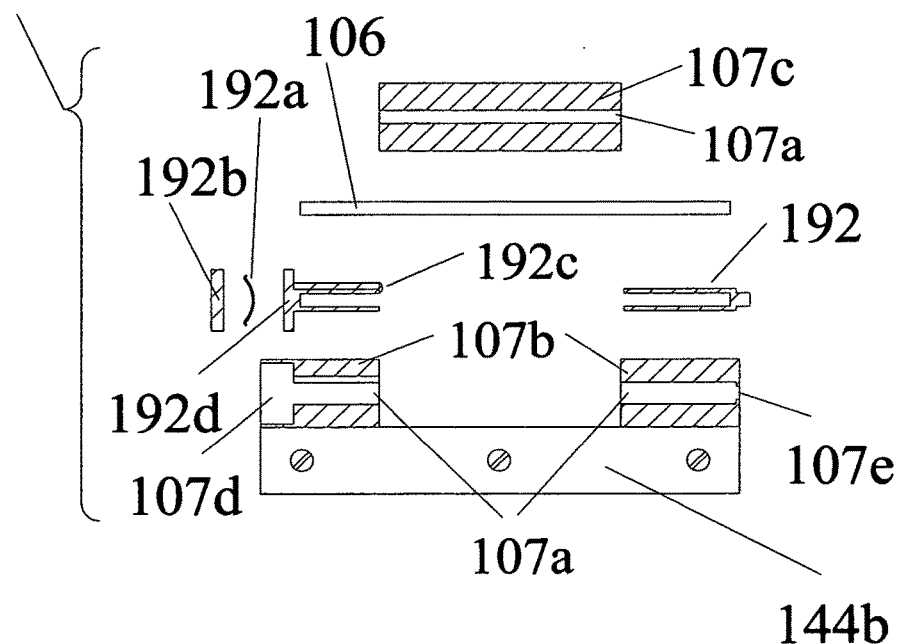
FIG. 45 This is a cross section view (at a/b of FIG. 38) of the disassembled parts of the hinge part of the display panel assembly for bag mounting. It shows parts used for holding the angle of the display panel relative to the bag.

FIG. 45 shows the computing unit panel display panel mount for bag computer with the pivoting computer equipment mount parts separated and in cross section view (cut parts in 45 degree hatching) at a/b in FIG. 39 with its plane running alone the axis of the axle. The flange 144b and coupling axle housing 107b remain connected as one piece but the display panel axle housing 107c has been removed upward. The axle 106 has also been removed upward and it can be seen that it fits both the display panel axle housing (bearing hole 107a) and the two sleeves (both removed upward also) which slide onto the ends of the axle. The brake control button end axle sleeve 192 slides onto one end (right) of the axle and the spring end axle sleeve 192d slides onto the opposite end (left) of the axle, the end nearest the brake spring. The brake spring 192a and brake spring retainer 192b have been removed to the left. When assembled for use, the brake spring is located in the coupling axle housing brake spring holder area 107d and provides pressure to engage the brake contact 192c (a part of the spring end axle sleeve) to the display panel axle housing. The area of the display panel axle housing that contacts the brake contact may include a friction surface such as rubber, teeth or other means to regulate the braking of the brake contact. The coupling axle housing brake control button opening 107e provides an opening to access the brake control button and move the axle and sleeve assemble in a lateral direction.

Figures 46A, 46B, 46C, 46D, 46E:
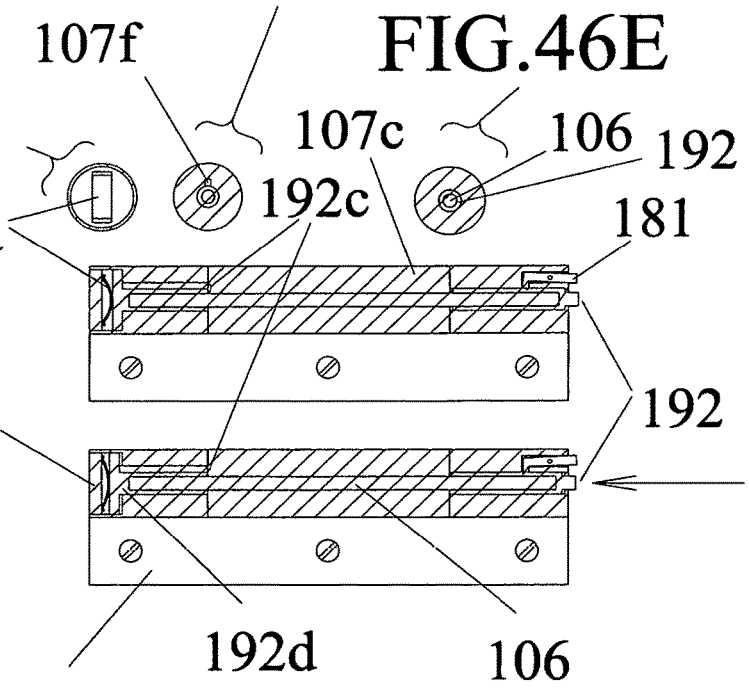
FIG. 46A This is a cross section view (at a/b of FIG. 38) of the assembled parts of the hinge part of the display panel assembly for bag mounting of FIG. 44. It shows the hinge brake engaged.
FIG. 46B This is a cross section view (at a/b of FIG. 38) of the assembled parts of the hinge part of the display panel assembly for bag mounting of FIG. 44. It shows the hinge brake disengaged.
FIG. 46C This shows a perpendicular cross sections at a first point along the hinge.
FIG. 46D This shows a perpendicular cross sections at a second point along the hinge.
FIG. 46E This shows a perpendicular cross sections at a third point along the hinge.

FIG. 46A, FIG. 46B, FIG. 46C, FIG. 46D and FIG. 46E show the parts of the pivoting computer equipment mount parts assembled. In FIG. 46A, a cross section view (cut parts in 45 degree hatching) at a/b in FIG. 39, the spring holds the axle and spring end axle sleeve to the right and the brake contact 192c engages the display panel axle housing to stop rotation of the display panel so it can hold an angular position relative to the bag and its front wall when mounted to the bag. A brake lock 181 may be included to hold the brake disengaged so the display panel may pivot freely. FIG. 46C, FIG. 46D and FIG. 46E are cross section views on a plane perpendicular to the axle axis with each view above the specific area in FIG. 46A to be depicted. FIG. 46C shows the brake spring holder area of the coupling axle housing as a cylinder containing the brake spring 192a. FIG. 46D shows the area near the brake contact 192c where it passes through a coupling axle housing brake contact keyway 107f, the keyway keeping the brake contact from rotating when engaged to the display panel axle housing. FIG. 46E shows how the axle 106 is the inner concentric circle within the brake control button end axle sleeve 192 (outer concentric circle) which fits in the coupling axle housing. In FIG. 46B the brake control button 192 has been pressed and the sleeves and axle 106 move to the left compressing the brake spring 192a between the spring end axle sleeve 192d and the brake spring retainer 192b. The brake contact 192c disengages from the display panel axle housing and the display panel is free to turn to any angle relative the bag and its front wall. The display panel axle housing 107c and display panel assembly flange 144b are also shown.

When propping a display panel on a bag using a flexible fabric pivoting computer equipment mount, the use of the display panel in a vertical operating position may be improved using a bag computer vertical operating position prop. FIG. 47 shows a front view of the display panel 13 including a display 45 where the display panel extension prop 51 is adapted to also act as a vertical operating position prop. One or more vertical operating position props 51e, here shown attached at right angles to the display panel extension prop 51, serve to improve and increase the viewing angles available in the display panel's vertical operating position.

FIG. 48A shows a cross section (a/b on FIG. 47) side view (cut sections shown with 45 degree hatching) of the display, panel 13 with one or more vertical operating position props 51e fixed to the display panel extension prop and projecting away from the display panel front side and the display 45 (and toward the bag when in a vertical operating position). In this case, the display panel extension props and the vertical operating position props 51e are parts of the same structures. The attachment axis 42 (also called attachment edge) of the display panel is the place of attachment of the retainer. The vertical operating position prop 51e may be movable, for example by pivoting, and/or may be made of an elastomeric material to protect against breakage if mishandled.

FIG. 48B is the same as FIG. 48A except that one of the two jaws 56 used to clamp the retainer to the display panel attachment axis includes all or part of the display panel extension prop 51 and/or the vertical operating position props 51e. In this way, the props may be a removable (but necessary) component of the display panel.

FIG. 49A and FIG. 49B show a cross section (a/b on FIG. 47) side view (cut sections shown with 45 degree hatching) of the display panel 13 now mounted to a bag 1 (top front part only is shown) near the junction 14 of the top 3 and front 2 bag walls and with the vertical operating position prop 51e in contact with the bag wall. In this vertical operating position (FIG. 49A), the vertical operating position props project away from the display panel front side toward the bag and moves the extension prop and attachment edge area of the display panel in a frontward direction 137a away from the outside of the bag front wall. With the display panel pivoting against the top edge 14 of the front wall or by the attachment axis 42, the distal edge 43 of the display panel moves in a backward direction 138a over the top wall of the bag and toward the back of the bag. Thus the vertical operating position of the display panel may be adjusted in a direction backward of vertical and greater than 180 degrees 110a from its storage position against the outside of the bag front wall. FIG. 49B shows that the angle 110 between the display panel and the outside of the front wall can be adjusted by shifting the contact position of the vertical operating position prop end 109 on the bag front and adjusting the view of the display 45a to an operator viewing from in back of the bag and over the top of the bag's top wall 3. One or more extension props and/or vertical operating position props may be shaped or curved to assist in this function. These drawings show the display panel suspended by the free section 12a of the pivoting computer equipment mount's retainer (here shown as an attachment flap but may alternatively be a filament).

FIG. 50A shows the bag computer with the display panel 13 in an operating position. The magnification FIG. 50B shows the display panel suspended by the retainer 12 and the right extension prop 51a and the left extension prop 51b contacting the bag front wall 2. The vertical operating position props 51e are located on each of the right and left extension props and are projecting away from the display panel front side and not in use in this figure.

FIG. 51A shows the bag, computer with the display panel 13 in a storage position against the bag front wall 2. The magnification FIG. 51B shows the display panel suspended by the retainer and the vertical operating position props 51e are projecting away from the bag and display panel front side. They are not in use in this figure. As shown, vertical operating position props may be located to the right and to the left of the retainer 12 (located between the two props) thus allowing the vertical operating position props to extend away from the bag and display panel front side while in the storage position without interfering with the retainer and display panel movement into the storage position.

FIG. 52 shows a bag computer with a pivoting cover 8c (outside surface) which may be rigid and includes a proximal edge 162 pivotally attached to the bag 1 front wall. 2 near the bottom of the computer equipment storage area and a distal edge 161. The cover distal edge is pivotally attached to the display panel 13 attachment edge 42 with the display 45 facing up into the line of sight of a bag wearer/operator. The line A/B is the position of the cross sections (cut sections shown with 45 degree hatching) for FIGS. 54A to 54E. The drawing plane is aligned with the dotted line.

FIG. 53A, FIG. 53B, FIG. 63C, FIG. 63D and FIG. 53E are a series of five views showing a pivoting computer equipment mount arrangement including a bag computer display panel to cover 360 degree attachment loop mount. This way of mounting the display panel to the cover is simple and the display panel is easy to remove. The five views are: FIG. 53A, the display panel 13 being installed to the retainer, cover 8 and bag 1; FIG. 53B, the display panel. 13 partially installed to the retainer and cover 8 (for simplicity, the bag is not shown); FIG. 53C, the display panel 13 installed to the retainer, cover 8 (bag not shown) and held approximately vertical (vertical operating position); FIG. 53D, the display panel 13 propped in an operating position on the outside surface of the cover 8 at an angle 110 relative to the cover and viewable by the operator (bag not shown); FIG. 53E, the display panel 13 pivoted to beside the inside surface 8a of the cover in the storage position.

FIG. 54A, FIG. 54B, FIG. 54C, FIG. 54D and FIG. 54E are a series of five magnified views of FIG. 53A, FIG. 53B, FIG. 53C, FIG. 53D and FIG. 53E, respectively. In FIG. 54A, the display panel 13 is separate from the bag and about to be mounted to it with the retainer 12 bottom end 141 attached to the cover and the retainer top end 140 to be slid through the display panel sliding attachment slot 77. In FIG. 54B, the retainer is through the display panel slot and being turned around the bar 76 of the sliding attachment so it can be attached back to the inside of the cover using matching attachments 66a and 66b. In FIG. 54C, both the retainer top end 140 and bottom end are attached to the cover and they form a loop 111a of retainer material that pivotally holds the display panel sliding attachment and display panel to the cover distal end and allows it to pivot about 360 degrees. This loop of retainer material may be large enough to allow the display panel 13 to be moved into a storage position inside the bag or to be moved into an operating position outside the bag and may include enough size to allow propping the display panel on the outside of the bag. In FIG. 54D, the display panel has been moved to the outside of the cover and is suspended by the retainer 12 loop of material while the display panel 13 prop 51 contacts the cover outside surface 8c and holds the display panel in an operating position angle relative to the cover and in the view of an operator. In FIG. 54E the display panel 13 has been pivoted counterclockwise about 225 degrees to a storage position along side the inside surface of the cover 8. It should be noted that this arrangement allows 360 degrees of pivoting for the display panel (compare with sliding mount to FIGS. 3, 4A and 26A). This arrangement may be used with the vertical operating position prop described previously (see FIGS. 47 to 51) and this sort of prop may form a handle and/or a cover for the area between the top of the cover and the bag when in storage.

In an alternative arrangement, the retainer loop (111a, FIG. 54C) may, be permanent and the display panel bar (76 in FIG. 54B and FIG. 7A) may be removable from the display panel for the purpose of installing the display panel to the retainer, cover and bag (see FIGS. 4A and 7D).

In an alternative arrangement, the retainer top end 140 may extend to near the cover proximal attachment edge 162 and attach there (see FIG. 8A to 16C and description). In this case, the display panel deployment includes an up/down sliding motion instead of only a pivoting motion.

FIG. 55 shows the cover and display panel removed from the bag and showing the cover inside surface 8a. The cover may include an electrical connection 64p and mounting station 146b for a wireless (e.g. electromagnetic wave or radio) microphone and/or speaker 152b (here shown as a headset) including electrical connection 64o matching the mounting station. The mounting station electrical connection may electrically connect to electrical equipment in the cover and/or include a battery recharge connection and/or a control such as telephone answer and hang up sensor and switching. The mounting station for a wireless microphone and/or speaker may, alternatively, be attached to the outside surface of the cover 8c (see FIG. 52). The cover may include electrical equipment, a battery 189 for recharging the microphone, and/or speaker and electrical connection 64q for recharging the battery from an external power source. The display panel 13 may include telecommunications and local area wireless to match the wireless microphone and/or speaker. The display panel may have its own electrical connection 64r for recharging its own battery. There may be an electrical connection 68a, such as a wire, connecting the electrical equipment in the cover to electrical equipment in the display panel. In this way the cover and display panel assembly may be a simple, durable and autonomous unit for bag mounting.

FIG. 56 shows as wearable propping display apparatus including a display panel 13 with a display 45 and attachment edge 42. The display panel attachment edge is attached to an operator body prop 174p top end 174y. The display panel and operator body prop may be attached in a variety of ways including, but not limited to, pivoting attachment, sliding attachment and/or fixed attachment. In this figure, the attachment edge and top end are pivotally 54i attached along an axis parallel to the attachment edge using a hinge 54. The display panel and operator body prop are pivoted into an open operating position. The operator body prop a bottom end 174x is attached to an operator body interface 90 designed to temporarily hold the bottom end to the apparatus to the operator. In this figure the operator body interface includes a gripping feature (gripping projection 90g7) to improve gripping to and shaping 90k (shown as concave shaping) to improve stabilizing on the front body (e.g. stomach/chest) surface area of the operator (see FIGS. 72 and 73). The figure shows that the display panel may include electromagnetic wave communication equipment 52 for remote connection for the panel's various electronic equipment, for example, a camera 151f. This figure also shows that the operator body prop may include a tool holding attachment feature 89h that is complimentary (for example, using shaping and/or a magnet/iron) to a tool attachment feature 89*i* (a separate part removably attachable the operator body prop) fixed to a tool such as an electrical device, a writing surface or a glue patch 89*n* for sticking the tool attachment feature to a wide variety of other tools (e.g. a keyboard).

FIG. 57 shows the same wearable propping display apparatus 200*g* including a suspension device 5 used to suspend the apparatus for the operator's upper neck/shoulder area while the operator body interface adheres to the operator's front stomach/chest surface area. The suspension device may be attached to the display panel 13 or operator body prop 174*p* using one or more suspension device attachment 5*a*.

FIG. 58A shows that the wearable propping display apparatus may include a supplementary or removable operator body interface 90*y*1 which matches the apparatus. The removable operator body interface may be primarily rigid and made of materials such as rigid plastic or metal. Some parts of the interface, for example those associated with operator body interface comfort for the operator (wearer) or with friction for sliding stability, may be made of soft, flexible or elastomeric material. The removable operator body interface may include a removable interface attachment 89*j* which matches a removable interface prop attachment 89*k* on the operator body prop 174*p*. The attachment may involve matching shape, friction fit, clip, notch, spring or other device to hold the removable interface to the operator body prop. The removable operator body interface may include a lateral stability member (see FIG. 76) including a right laterally separated surface 90*k*6 and a left laterally separated surface 90*k*7. The removable operator body interface may include a friction enhancing feature to keep the interface from sliding on the operator's body and this friction enhancing feature may include one or more elastomeric sticking surfaces 90*g*10. Additionally or in combination with operator body prop matching removable interface prop attachment 89*k*, the operator body prop may include a matching operator body prop bottom edge 174*x*7 configured to fit the prop to the removable operator body interface. The generalized bearings "right", "left", "top" and "bottom" are included on the drawing sheet around FIG. 58.

The removable operator body interface may be adapted to removably attach to a variety of portable electronic displays for the purpose of stabilizing the display against the operator's front stomach/chest (body) surface area and pushing against the operator's body so the display is moved into the line of sight of the wearer (operator) while the display is being worn by the operator in an operating position. Under certain circumstances (for example, with the operator in a reclined position and the suspension device attached to the operator's lower body) the operator body interface may be adapted to press against the operator's neck or around the operator's neck to a surface in back of or below the operator to provide lateral stability (see FIG. 65). The variety of portable electronic displays (for example, display panels or display devices) may include, at least, a wearable propping display apparatus, a "notebook" (lap top) computer, a bag with vertical operating position capability, a bag back wall display apparatus and a wearable propping display holder apparatus.

FIG. 58B shows the various conceptual planes which may define the shaping of the wearable propping display apparatus parts relative to the lateral stability axis 45*k* (in bold line) between the right laterally separated surface and the left laterally separated surfaces (FIG. 58A) of the lateral stability member (FIG. 76). The stability axis pivot plane 45*h* may be flat to allow pivoting on the operator's body toward and away from the operator's face for viewer distance control (see also FIG. 77). The stability axis interface plane 45*i* may be curved or shaped to conform with projecting laterally separated surfaces (for example, legs or shaping) which allow the contacting surfaces to touch the operator preferentially and laterally stabilize the operator body prop bottom end, operator body interface or removable operator body interface to the operator. The stability axis perpendicular plane 45*j* is the plane perpendicular to the stability axis.

FIG. 59 to FIG. 69 show that the removable operator body interface may include an operator tool for the use of display wearer (operator) such as a writing surface (FIG. 59), an electric wire storage device (FIG. 62), an automatic wire storage device (FIG. 63), a container (FIG. 64), an eyeglass container (FIG. 62), a stylus holder (FIG. 64), or other tool of use to the operator.

Figure 63:
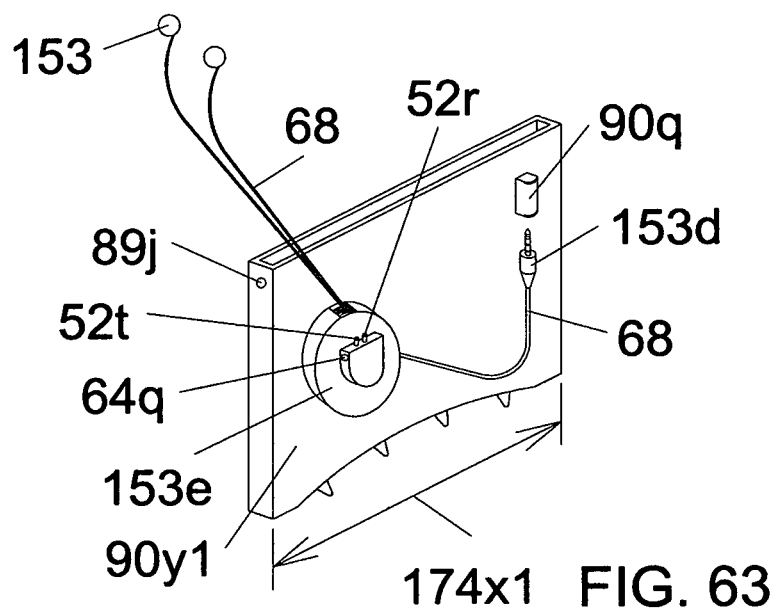
FIG. 63 This shows that the removable operator body interface may include sound equipment (speaker) including an automatic wire storage device, battery and/or wireless communication equipment for distant communication.

The operator tool may be an electronic operator tool such as an electronic keyboard (FIG. 61A), an electronic write pad or touch pad (FIG. 61B), a sound speaker (FIG. 65), microphone (FIG. 65), an electric connection (FIG. 63), an electromagnetic wave transmitter and/or receiver (FIGS. 61A, 62, 63).

FIG. 59 shows that the operator body prop may be shortened so that all or most of the prop is a matching operator body prop bottom edge 174*x*7 configured to fit the removable operator body interface without any regard to pushing and propping the display panel 13 away from the operator. This matching operator body prop bottom edge may include one or more removable interface prop attachments 89*k* meant to match removable interface attachments 89*j* on the removable operator body interface. In this figure the display panel and matching operator body prop bottom edge are pivotally attached with a hinge 54. The removable operator body interface may include one or more friction enhancing features 90*g*. The removable operator body interface may include an extension (see 174*k*, FIG. 60) that partially or wholly substituted for an operator body prop for pushing the display away from the operator's body and into his line of sight. The removable operator body interface may include a writing station 143*m* (an example of an operator tool) which may be found on the interface body front side 174*f*1 and the writing station may include a paper clip 90*o*21 and a stylus or writing tool holder 90*o*2. The removable operator body interface may include an electronic calculator 143*c*.

FIG. 60 shows another wearable propping display apparatus. In this figure the display panel 13 slides with an up/down motion 131*a* into and out of a holder which is also the operator body prop 174*p*2 panel holder. The prop may include a removable interface prop attachment 89*k* to match removable interface attachments 89*j* on the removable operator body interface (pictured below the wearable propping display apparatus). The bottom end of the operator body prop (panel holder) may include an operator body interface separate from the removable operator body interface and this may include a friction enhancing feature 90*g* (gripping surface).

The removable operator body interface may include an interface body 174*p*9 which may include an interface body top end 174*z*4, an interface body bottom end 174*x*8, interface body right side 174*y*5, an interface body left side 174*y*6, an interface body front side 174*f*1 and an interface back side opposite the front side.

The interface body serves to attach together other parts of the removable operator body interface. These parts may include, but not limited to, the removable interface attachment, the operator body interface, operator tool, suspension device attachment and any of these parts which may be located on the right side and left side of the removable operator body interface (for example, two suspension device attachments or two removable interface attachments or various lateral stability member parts). For this purpose, the interface body may be panel-like, bar-like, leg-like or other shape. If present, one or more of the operator tools or electronic operator tools, described below, would normally be located on the interface body of the removable operator body interface.

The removable operator body interface may include an extension $174k$ to elongate the distance between the interface bottom end and the interface top end and to increase the space between the operator's body and the display panel as the operator body interface pushes against the operator's stomach/chest surface area to hold the display in the line of sight of the operator. The interface's extension length may differ with different removable operator body interfaces for the purpose of adjusting the operator to display panel distance. The removable operator body interface includes an operator body interface 90. In this figure, the removable operator body interface includes a type of operator body interface called an operator linking attachment $90a3$ suitable for removably attaching the removable operator body interface (with the wearable propping display apparatus) to a matching attachment or to an incidental object (e.g. button, pocket or belt) on the operator.

FIG. 61A shows removable operator body interface $90y1$ including an electrical device (an electronic operator tool) such as an input/output device such as a manual input device such as an electronic keyboard 143. The removable operator body interface may include an operator body interface with a right laterally separated surface $90k6$ and left laterally separated surface $90k7$, both contactable with the operator's body to provide lateral tipping stability. The operator body interface may include a friction enhancing feature $90g$ to temporarily adhere to the operator's front stomach/chest surface area, provide sliding stability in all directions and keep interface from sliding (see also FIG. 76 and FIG. 77). The removable operator body interface includes shaping and/or removable interface attachments $89j$ to attach the interface to the operator body prop of a separate wearable propping display apparatus. For electromagnetic wave communication with external sources, the removable operator body interface may include an electromagnetic wave transmitter $52t$ and/or an electromagnetic wave receiver $52r$. A battery 189 may be includes to drive this communication equipment and this battery may be removable or may be permanent and include a recharging electrical connection $64q$.

FIG. 61B shows that the electrical device or input/output device or manual input device may be a touch activated input device $143s$ such as a write pad and/or touch pad which may be activated with an operator's finger or with a stylus $90n2$. The figure shows that the electrical device may be removable from the removable operator body interface.

FIG. 62 shows the removable operator body interface $90y1$ with other features attached to it. The removable operator body interface may include an eyeglass holder $90o1$ to hold magnifying eyeglasses $90n$ for close operator viewing of the display of the wearable propping display apparatus held by the shaping and/or removable interface attachments $89j$ of the removable operator body interface. The removable operator body interface may include an audio wire storage device $153f$ to store wire to the removable operator body interface for use when the operator desires.

For operation, the audio speaker wire 68, which leads from the speakers 153 to a speaker audio plug $153d$, is connectable to a sound source (electrical current or sound wave), for example, a matching socket $64g$ or plug on the removable interface or, alternatively, on the wearable propping display apparatus. The sound may be receive by electromagnetic wave from an external source using one or more an electromagnetic wave transmitters $52t$ and/or an electromagnetic wave receivers $52r$ (examples of electronic operator tools) on the removable operator body interface. For this purpose, the removable operator body interface may also include a battery 189 which may be recharging using an electrical connection $64q$. The removable operator body interface may include one or more adjustable suspension device attachments $5i$ (shown here as a line pinching device) and an operator body interface 90. FIG. 62 also shows the lateral stability member $90k5$, a part of the operator body interface, extending laterally to hold the right laterally separated surface and the left laterally separated surface apart and to connect them to the removable operator body interface. Once the removable operator body interface is attached to the wearable propping display apparatus (or to a notebook computer or to the length adjuster of a wearable propping display apparatus—see FIGS. 67 to 69) the lateral stability member provides lateral stability as described in FIG. 76 and FIG. 77.

FIG. 63 shows that the removable operator body interface $90y1$ may include an audio wire storage device that is an automatic audio wire storage device $153e$. The wire storage device, which include a reel or pulley with motive power (e.g. a spring) rewind action, may include one or more transmitters $52t$ and/or receivers $52r$, a battery 189 and one or more recharging electrical connections $64q$ for recharging the battery. The stored audio wire 68 may lead to the battery and electromagnetic wave receiving/transmitting equipment in the automatic audio wire storage device. Alternatively, a wire 68 may be included to lead from the speakers via the storage device to a speaker audio plug $153d$ which may be electrically connected to the display panel, to a transmitter or receiver in the interface or stored in a simulated earphone socket $90q$ on the removable interface. The removable operator body interface includes shaping and/or removable interface attachments $89j$ to attach the interface to the operator body prop of a separate wearable propping display apparatus. The removable operator body interface includes an operator body interface 90 and may be seen to include a lateral direction width $174x1$ in a right to left direction for separating the right and left lateral separated surfaces which provide lateral (tipping) stability.

FIG. 64 shows that the removable operator body interface $90y1$ may include a storage area which may be a storage chamber $90o$ which may include a cover or door $90o10$ to seal miscellaneous contents inside. The removable interface may include a holder such as a stylus holder $90o2$ to hold a stylus $90n2$ or writing tool. The removable operator body interface includes shaping and/or removable interface attachments $89j$ to attach the interface to the operator body prop of a separate wearable propping display apparatus. The removable operator body interface may include an operator body interface with a gripping surface $90g13$ and one or more legs $90j$ usable a lateral stability member for lateral tipping stability and/or for sliding stability in all directions. For tipping stability, the two legs present two laterally separated surfaces contactable with the operator and, for sliding stability, these surfaces may include a friction enhancing feature $90g$ (see also FIG. 76). The removable operator body interface may include a length adjuster adapted to provide lateral tipping stability and/or sliding stability in all directions.

FIG. 65 shows that the removable operator body interface 90y1 may include other electrical equipment such as one or more speakers 153 and/or microphones 154. The speakers and/or microphones may be electronically self-contained, may include a battery 189 and recharging electrical connection 64q. The speakers and/or microphones may include electromagnetic wave communication equipment such as receiver 52r and/or transmitter 52t. One or more controls 155, such as on/off or volume may be included. The removable operator body interface may include two or more long legs 174p1 configured to straddle and push against a surface 139k in back of or below a reclined operator for the purpose of laterally stabilizing the interface and display around the operator's neck. These legs may include one or more length adjusters 174s and/or length adjuster holders 174r. The operator body interface part of the removable operator body interface may include a neck adapted operator body interface 90g3a shaped to supply right and left contact surfaces, to serve as a lateral stability member and to support the removable operator body interface and display against the neck regardless of any legs. This neck adaption may include cushioning and/or shaping to eliminate choking. The removable operator body interface may include a suspension device or suspension device attachment 5a.

FIG. 66A and FIG. 66B show an example where the interface body 174p9 joining together the removable operator body interface 90y1 parts (removable interface attachment, operator body interface, body right side and body left side) is adjustable in a up/down direction 131a. The interface body is or includes a length adjuster 174s and length adjuster holder 174r between the removable interface attachment 89j and operator body interface 90. One or more suspension device attachments 5a are shown attached to the removable interface attachment or to the length adjuster holder. The interface body may include a length adjuster holder that holds the length adjuster in a movable way to form an adjustable extension (see 174k, FIG. 60) so it may increase the interface body extension (shown in an extended position in FIG. 66B) or decrease the interface body extension (shown in a retracted position in FIG. 66A) between the removable interface attachment and the operator body interface. In this figure, the movement between the length adjuster holder and the length adjuster is in a sliding up/down motion 131a. The motion of these two parts may, alternatively, be in a pivoting way, a twisting way or in some other way to use the length adjuster to increase or decrease the interface body extension and the length of the removable operator body prop. The operator body interface may include a surface or projection or other feature made of an elastomeric material 90g10 for the purpose of friction enhancement, fitting or operator comfort.

FIG. 67 shows a "notebook" computer 200f (also called a "lap top" computer) including a display panel 13 and body panel 174 pivotally attached together. It is a type of portable electronic display. Also shown is the removable operator body interface 90y1 configured to attach to the bottom end 174x of a notebook computer body panel. In this case, the removable interface attachment may be generalized to fit a variety of notebook style computers and may not have specifically matching parts on the notebook computer. The removable interface attachment may include friction fit producing sizing or shaping 89j4, may be configured with one or more flexible flanges 89j1 to pinch and hold the removable interface to the computer, may include one or more projecting contact points or ridges 89j3 may include elastomeric socket liner or one or more elastomeric friction points or surfaces 89j2 or other contrivances to hold the computer to the removable interface without specifically matching parts. The removable operator body interface may include one or more suspension device attachments 5a and includes an operator body interface which may include shaping 90k suitable to stabilize the removable operator body interface and notebook computer on the operator's body when in an operating position.

FIG. 68 shows a wearable propping display apparatus 200g including a display panel 13 with display 45. The apparatus includes two (right and left) sliding deployment operator body props 174p1 (up/down deploy/store movement) that attach to the display panel using operator body prop holders (tube-like) 174r10. The two legs also form an operator body interface 90 and a lateral stability member with laterally separated surfaces to stabilize the wearable propping display apparatus. The legs form sliding stability leg end features 90j5 to stop sliding of the interface. The removable operator body interface 90y1 includes one or more removable interface attachment 89j7 adapted to fit and hold the removable interface to the leg-like operator body prop/interface of the wearable propping display apparatus.

FIG. 69 shows a wearable propping display apparatus including a display panel 13 slidably attached to an operator body prop 174p, one or more length adjuster holders 174r6 (pivoting holder), one or more length adjuster legs 174s3 (pivoting legs) and an operator body interface 90t attaching the two pivoting length adjuster legs together. The length adjuster may deploy with a pivoting motion 139g and may be, for example, panel-like, frame-like or wire-like (shown in this figure). The length adjuster is part of the operator body prop and serves as a lateral stability member and may provide sliding stability as well. Also shown on the wearable propping display apparatus are a suspension device 5 (cut short to conserve space) and a suspension device attachment 5a. The removable operator body interface 90y1 includes one or more removable interface attachments 89j6 adapted to fit and hold the removable interface to the length adjuster. Comparing this figure to FIG. 68, it is easy to imagine that the leg-like operator body prop with holder and forming an operator body interface, as in FIG. 68, may be used as the length adjuster in the FIG. 69 making an alternative example of a removable operator body interface adapted to attach to a length adjuster.

FIGS. 70A, 70B and 70C shows that the removable operator body interface may, alternatively, be used with a bag 1b with vertical operating position capability. This bag is a type of portable electronic display. This type of bag is arranged to hold a display panel 13 in a vertical operating position that positions the bag's display in the line of sight of (viewable by) the operator from in back of the bag and over the top end of the bag when in an operating position propped against the operator's front stomach/chest area (see FIG. 2A to 2D) and with the suspension device 5 suspending the bag from the operator's upper body area (neck and/or shoulder In FIG. 70A, the removable operator body interface 90y1 is shown separated from the bag but ready to be moved upward and attached using one or more removable interface attachment 89j and one or more removable interface prop attachment 89k near the bag's bottom wall 147 in the bag's bottom end area. The removable interface prop attachment may be associated with one or more vertical bag stiffening members 1a extending vertically to keep the bag erect in a top to bottom direction even when propped or with a heavy load in the bag. The display panel is in a vertical operating position with the back side 41 of the display panel visible and the front side of the display panel hidden and facing the operator (73, FIG. 70C).

FIG. 70B shows the bag 1*b* with vertical operating position capability with a different kind of removable operator body interface 90*y*1. In this case the removable interface is adapted to stick to the bag in the bag bottom end area or bottom wall 147 using, for example, complimentary adhesive patches or hook and loop material on the removable interface (removable interface attachment 89*j*) and on the bag (removable interface prop attachment 89*k*). This figure shows the display panel pivotally attached to the top end of the bag front wall 2 and storable on the bag front wall. The display panel has been pivoted into a vertical operating position 182*c*.

FIG. 70C shows the bag 1*b* with vertical operating position capability with the operator 73 viewing the display (in his line of sight 183*a* from in back of the bag) on the display panel's front side. The display panel is in a vertical operating position. The display panel is attached to the bag and is visible to the wearer (operator) over the top end area 3*c* of the bag. The back side of the display panel (with controls) is visible in the figure. The removable operator body interface 90*y*1 is now attached to the bag in the bag's bottom end area 147*a*. It can be seen that the bag 1*b*, in this case, substitutes for the operator body prop of FIG. 58 (see also FIG. 2A to 2D).

The bag and display panel of FIG. 1A-B, FIG. 2A-D and FIG. 70A-C may be adapted and simplified to produce the bag back wall display apparatus (shown in FIG. 71A-B, FIG. 72A-C, with frame alone shown in FIG. 73 and FIG. 74). This bag and display arrangement is meant to be used in a position propped on the operator as shown in FIGS. 2C and 2D.

FIG. 71A and FIG. 71B show the outside surface of the front wall 2 and the outside surface (exterior) of the back wall 148 of a bag 1 designed to hold and prop a display in the line of sight of a wearer (operator). In FIG. 71A the outside surface of the front wall 2 of the bag back wall display apparatus may have no electronics or computer equipment. It may include one of more pockets 149*d* to hold, for example, general cargo. The bag may have a top end area 3*c*. An operator body interface 90 is located in the bag's bottom end area 147*a*. The operator body interface may include tipping and sliding stability features (such as) as previously described in order to stability the bag on the operator's body for propping and viewing (in the operator's line of sight).

In FIG. 71B the outside surface (exterior) of the bag's 1 back wall 148 includes a display panel 13, including an electronic display 45 and a top edge 42*c* positioned near the top end 148*g* of the back wall. As shown, the display panel may be removable for replacement and may include bag to display panel attachment 114*b* on the bag and complimentary display panel to bag attachment 114*a* on the display panel. The outside of the back wall also includes a back wall pivoting cover 8*h*, here shown as a flexible fabric cover attached by its pivoting attachment 8*j* near the bottom of the display panel 42*b* and configured to protect the display. The pivoting cover may include one or more cover attachments 70*b* on the cover matching bag cover attachments 70*a* on the bag (or computer). Also shown is an alternative pivoting cover 8*k* with an alternative placement that may be used instead (only one cover is needed). The alternative cover may pivot in the top end area of the bag, for example, near a top end 148*g* of the back wall. If a bag back wall display mounting frame is used, the alternative pivoting cover may be pivotally attached to the top end of the display mounting frame (see 185*x*7, FIG. 73) instead of to the top end of the back wall.

FIG. 72A shows the bag back wall display apparatus with the display panel separated from the bag 1 back wall. The display panel has been enlarged and now includes a bag back wall display mounting frame 185*x* (also referred to in the description for FIG. 72A to FIG. 75 as the "display mounting frame") which serves to hold the display and cover to the exterior (outside surface) of the bag back wall 148 in a way that keeps the display mounting frame operator side 40*b* smooth and suitable for rubbing against the operator when carried and not in an operating position. (The bag back wall display mounting frame is attachable to the bag back wall and the display mounting frame operator side is the side facing away from the bag and in a direction toward 138 the operator (the back of the operator's head is shown 73*j*) when in an operating position (i.e. not the side adjacent to the bag—see also FIG. 2D). The display mounting frame may include shaping 185*x*2 and/or cushioning 185*x*3 for the purpose of making the contact between the operator and the display mounting frame more comfortable for the operator when not in an operating position and in a storage position hanging by the suspension device (carrying strap) alongside the operator (see FIG. 2A) and intermittently rubbing against or swinging against the operator's body. The display mounting frame, along with the cover, also serves to protect the display. The display mounting frame may be partially or wholly made of semi-rigid (semi-elastomeric) material to add flexibility to the frame and bag. As shown in this figure, the display 45 faces away from the bag and toward the operator (wearer) 138 and may be physically and/or electrically integrated into the display mounting frame and any electronic equipment located in it. The display and/or frame may include an electrical connection 68*d* configured to connect to the bag or electronic equipment (e.g. computing, telecom or battery) in or on the bag. An electrical access opening 112 is shown in the back wall to provide access for the electrical connection to the bag interior. The cover is pivotally attached to the display mounting frame. The cover may be a rigid cover 8*i* and shaped to conform to the shaping of the display mounting frame. The operator body interface 90 is shown attached to the bag bottom end area.

FIG. 72B shows the bag back wall display mounting frame 185*x* separated from the bag. The display mounting frame has been further adapted for bag mounting and operator wearing by including the operator body interface 90 into the display mounting frame at the bottom end (see 185*x*8, FIG. 73A) of the display mounting frame (in this figure, shown extending slightly under the bottom wall 147 of the bag). In this way all display 45, protection (i.e. cover 8*i*) and operator mounting features are found on the display mounting frame and the bag is relatively generic. To attach the display mounting frame to the bag, the display mounting frame may include one or more display mounting frame to bag attachments 114*c* and the bag may include one or more complimentary bag to display mounting frame attachments 114*d*. An electrical connection 68*f* may be provided to connect the display panel frame and/or display panel to the pivoting cover and any electronic equipment found there.

FIG. 72C shows the bag back wall display apparatus with its display mounting frame attached to the bag 1 with the cover 8*i* pivoted closed to cover the display in a storage position. The operator side 40*b* of the display mounting frame (including the pivoting cover) present a surface suitable for normal contact with the operator when in storage hanging by the suspension device 5 (carrying strap). The suspension device attachment may be a bag located suspension device 5a11 located on the bag or, alternatively (shown in this figure), may be a frame located suspension device attachment 5a10 located on the bag back wall display mounting frame. Further added to FIG. 72B is that the display mounting frame may include molding edges 185x4 to make form to, clings to, follow the contour of and/or shape around portions of the bag to fit the display mounting frame and bag together in the manner of some sportswear shoe soles to their fabric upper parts. The molding edges may have the purpose of, but not limited to, protecting the bag, electronic equipment or display from impact, covering the edges of the bag and/or decoration. Especially with the use of molding edges, the bag and display mounting frame may be attached together using, but not limited to, adhesive.

FIG. 73A shows a version of the bag back wall display mounting frame alone and separated from the bag. It shows that the display panel may be removable attached to the display mounting frame using one or more mounting frame to display panel attachments 114f. The display panel may include complimentary display panel to mounting frame attachments (same as 114a, FIG. 71B). The display mounting frame may include a display panel portion 185x5 located on the top portion (about half) of the bag back wall and a bottom portion 185x6 located on the bottom portion (about half) of the bag back wall. The display mounting frame, for example the bottom portion, may include electronic equipment such as a computing unit 200l, telecommunication equipment 186a and/or battery 189. The display may be located in the top portion. The display mounting frame may have a top end 185x7 which may be used to pivotally attach the display using a display panel and hinge (see FIG. 75) to the frame near the bag's top end area (3c, FIG. 71A). The display mounting frame may include a frame to bag electrical connection 68e intended to connect to electronic equipment inside the bag and/or a display panel electrical connection 68e1 to connect the frame to the display panel.

FIG. 73B shows the back side 41b of the bag back wall display mounting frame of FIG. 73A. This is the side adjacent to the bag's back wall when mounted to the bag. Also shown is a mounting frame to display panel attachment 114c.

FIG. 74 shows a version of the bag back wall display mounting frame alone and separated from the bag. This arrangement depends on the display being attached to the bag independently. This version of the display mounting frame is called a display surrounding frame 185x1 and serves to smooth and integrate the display panel into the display surrounding frame operator side (same as 40b, FIGS. 72A and 72C) of the display surrounding frame on the bag wall of the bag to make the storage position wearing or the bag more comfortable to the operator. The display surrounding frame may be attached to the bag using one or more mounting frame to display panel attachments 114c. The display surrounding frame may include the pivoting cover which may include a keyboard 143 on its inside surface 8a. For securing closed the cover, the cover may include a cover attachment 70b and the display surrounding frame may include one or more frame cover attachments 70a.

FIG. 75 shows a bag back wall display mounting frame (see FIG. 73) attached to a bag 1 and in an operating position (the storage position would look like FIG. 72C with the display panel parallel to the frame and bag back wall). In this embodiment, though, the pivoting cover has been removed and the display 45 is attached to the front side of the display panel 13 (see FIG. 6A to 6C) which is pivotally attached by its display panel attachment edge to the top end (185x7, FIG. 73) of the bag back wall display mounting frame 185x by, for example, using a hinge 144h, so that the display may be pivoted from a storage position to an operating position in the line of sight 183a (view) of the operator (the back of the operator's head 73j is shown). In this operating position, the front side of the display panel is facing away from the back wall of the bag and toward the operator (wearer) 138 and the display panel back side is facing a direction toward the bag and away from the operator (wearer) 137. The pivoting display panel is a connected part of the frame in this arrangement. The display panel back side (opposite the front side and shown in FIGS. 6C and 7C) may include one or more controls (e.g. pointing device and/or its clicker buttons) for the operator to manipulate the display and/or electronic equipment located in the display mounting frame or found in the interior of the bag. The back side of the display panel, as a part of the display mounting frame, may include shaping or cushioning to make the contact between the operator and the frame more comfortable for the operator when carried by the suspension device and rubbing against the operator. Any display panel back side controls may include one or more finger guides or control guards (for example, a control recessed into the display panel surface or ridges rising above the display panel surface) to help the operator find controls on the back side and to protect the controls against inadvertent activation. A keyboard 143 may be includes on the display mounting frame and it may be located to be covered by the pivoting display panel when the display panel is in a storage position. An electrical connection 68f may be included to electrically connect the display panel to the display mounting frame and to any electronics found in it. A suspension device 5 (e.g. strap) and/or suspension device attachment 5a may be includes on the display mounting frame or on the bag to use with the operator body interface 90 to prop and suspend the bag, frame and display from the operator's body for operation (see FIGS. 2C, 2D, 76 and 77).

FIG. 76 and FIG. 77 show the stability characteristics of the wearable propping display apparatus with a removable operator body interface 90y1. In FIG. 76, the wearer's 73 (operator's) face 73i is facing forward (toward the application reader) with the wearable propping display apparatus in an open operating position with the suspension device 5 suspending the apparatus from his neck 73b. Visible is the display panel back side 41 including one or more manual controls and the operator body prop 174p. The operator is viewing the display on the front side of the display panel opposite the display panel back side. The removable operator body interface 90y1 (including the operator body interface) is pushing against the operator's front stomach/chest surface area 73c. It can be seen that the operator body interface extends in a lateral direction (right/left) from the operator's body center front in a direction toward the operator's left side 73f and toward the operator's right side 73e. This extension of the operator body interface forms a lateral stability member 90k5 and includes a right laterally separated surface 90k6 and a left laterally separated surface 90k7, each of these two surfaces being contactable (engageable) with the operator's body (front stomach/chest surface area) to block lateral tipping of and provide lateral stability for the wearable propping display apparatus. Hence, the operator body interface lateral stability member along with the downward 73h direction distance of the laterally separated surfaces (as measured along the prop's vertical centerline) provides lateral direction (right/left) tipping stability because of the lateral direction width of the lateral stability member where the right and left laterally separated surfaces contact (engages) the operator's body. This lateral direction tipping stability may be in terms of resisting or preventing the operator body prop with display panel from tipping to the right 73e1 or tipping to the left 73f1. For this purpose, the lateral stability member may include or be tipping stability components such as (but not limited to) right and left interface legs, right and left prop rods, extended right and left operator body prop panel side edges, concave shaping or shaping to compliment the operator's body.

Lateral direction stability may alternatively or additionally be provided by the removable operator body interface 90y1 operator body interface (90) providing sliding stability in terms of the removable interface resisting sliding on the operator's body to the right 73e or sliding to the left 73f. On the other hand, the operator body interface may provide sliding stability in an upward/downward direction in terms of the removable interface resisting sliding on the operator's body upward 73g toward or sliding downward 73h away from the operator's face. As sliding stability components, one or more friction enhancing features or surfaces (see, for example, but not limited to, 90g, 90g7, 90g10, 90j, 90k, 90g13, 90a3, may be included on the operator body interface to provide this sliding stability that resists sliding of the operator body prop in all directions on the operator's body surface.

FIG. 77 shows the operator 73 of FIG. 76 turned 90 degrees to the side (profile view). The display panel 13 is in front of the operator (in an operating position) and pushed away from the operator's front stomach/chest surface area 73c by the removable operator body interface 90y1 and the operator body prop 174p. At or near the contact place between the removable operator body interface and the operator's front stomach/chest surface area the operator body interface (90) may include, create or be comprised of a lateral pivot axis 90z. This lateral pivot axis allows the operator body prop and display panel to pivot in a toward direction or away direction (73g1 and 73h1 respectively) on the operator's front stomach/chest surface area as regulated by the length of the suspension device and to adjust the distance between the display and the operator's face. The suspension device 5 extends to or around the operator's neck 73b and/or shoulder 73d area to suspend the wearable propping display apparatus and to provide stability in a toward/away direction in terms of the display panel with operator body prop tipping toward 73g1 or tipping away 73h1 from the operator's face 73i. In this sense, the suspension device also provides a way to adjust the viewing distance 83c (along the operator's line of sight) of the display toward 73g1 or away 73h1 from the operator's face.

It can be seen that, for operation, the removable operator body interface temporarily adheres to the operator's front stomach/chest surface area while the operator body prop pushes the display panel away from the operator's body and into his view as the suspension device suspends the wearable propping display apparatus from the operator's upper neck or shoulder area so that the operator may view the display while in a variety of mobile conditions at close range and with no hands.

The removable operator body interface may, alternatively, be used with a notebook (or lap top) computer or with length adjusters of the wearable propping display apparatus (see FIGS. 67, 68 and 69). In these cases, the stability and viewing angle adjustment referred above also refers to a notebook (or lap top) computer or a wearable propping display apparatus with length adjuster regarding stability and viewing angle adjustment.

The wearable propping display apparatus and the removable operator body interface along with the way they used and their stability characteristics (FIGS. 76 to 77) represent a method of use for a display panel propped by an operator body prop and removable operator body interface against an operator's stomach/chest area and suspended by a suspension device from the operator's neck/shoulder area.

The invention claimed is:

1. A wearable electronic display apparatus comprising:
    a. a display panel comprised of a proximal edge, a front side and a back side, the front side including an electronic display;
    b. an operator body prop comprised of an operator body prop bottom end, an operator body prop top end and a removable interface prop attachment located near the operator body prop bottom end, wherein the operator body prop top end is pivotally attached to the display panel near the display panel proximal edge;
    c. an interface body comprised of a panel including an interface body bottom end, an interface body top end, and a removable interface attachment matching the removable interface prop attachment and located near the interface body top end wherein the removable interface attachment is removably attachable to the removable interface prop attachment and the attached operator body prop and interface body are pivotable on the display panel from an operating position to a storage position covering and protecting the electronic display;
    d. an operator body interface comprised of a friction enhancing feature and a lateral stability member including at least two laterally separated surfaces contactable with a body of an operator when the operator body prop is in the operating position wherein the OBI is attached to the interface body and located near the interface body bottom end;
    e. at least one suspension device attachment attached to one of the display panel and the operator body prop wherein the suspension device attachment is located in a central attachment zone.

2. The apparatus of claim 1 wherein the interface body is further comprised of a structure selected from a group consisting of an operator tool, a length adjuster, a length adjuster holder and an extension.

3. The apparatus of claim 2 wherein the operator tool is comprised of a structure selected from a group consisting of an eyeglass holder, an audio wire storage device, an audio speaker wire, an automatic audio wire storage device, a storage chamber, a stylus holder, a writing tool holder, a clip to hold paper and a writing station with a writing surface.

4. The apparatus of claim 2 wherein the operator tool is an electronic operator tool.

5. The apparatus of claim 4 wherein the electronic operator tool is comprised of a structure selected from a group consisting of an electronic keyboard, an electrical speaker, an electrical microphone, an electronic calculator, an electrical battery, an electromagnetic wave transmitter, an electromagnetic wave receiver, an electronic write pad, an electronic touch pad, an electronic control, electrical connection socket and a computer pointing device.

6. The apparatus of claim 1 further comprised of a suspension device attachable to the suspension device attachment.

7. The apparatus of claim 1 wherein the suspension device attachment is located near the junction of the display panel and the operator body prop.

8. The apparatus of claim 1 wherein the lateral stability member of the operator body interface is further comprised of a structure selected from a group consisting of a right interface leg and left interface leg, a right prop rod and left prop rod, and a shaping to compliment the operator's body.

9. The apparatus of claim 1 wherein the friction enhancing feature is comprised of a structure selected from a group consisting of a leg, a blade, a point, a bump, a serration, a drum, a gripping projection, a elastomeric gripping projection, a rigid gripping projection, a ridge and a friction enhancing cup.

10. The apparatus of claim 1 wherein the friction enhancing feature is comprised of a material selected from a group consisting of a gripping surface, a sticking material, an abrasive surface, an elastomeric material and a sticking pattern.

11. The apparatus of claim 1 wherein the display panel is further comprised of one of an electromagnetic radiation first transmitter and an electromagnetic radiation first receiver.

12. The apparatus of claim 1 wherein the back side of the display panel is further comprised of at least one manually operated electronic computer input control.

13. The apparatus of claim 11 wherein the manually operated electronic computer input control is selected from a group consisting of a touch pad, a computer graphical user interface input device, a button, a computer pointing device and a pointing device clicker.

14. A wearable electronic display system comprising:
   a. a display panel comprised of a proximal edge, a front side and a back side, the front side including an electronic display;
   b. an operator body prop comprised of an operator body prop bottom end, an operator body prop top end and a removable interface prop attachment located near the operator body prop bottom end, wherein the operator body prop top end is pivotally attached to the display panel near the display panel proximal edge;
   c. a plurality of interface bodies, each interface body comprised of a panel including an interface body bottom end, an interface body top end, an operator body interface located near the bottom end of the interface body and a removable interface attachment matching the removable interface prop attachment and located near the interface body top end wherein each operator body interface is comprised of a friction enhancing feature and a lateral stability member including at least two laterally separated surfaces contactable with a body of an operator when the operator body prop is in the operating position and wherein each removable interface attachment is removably attachable to the removable interface prop attachment and the attached operator body prop and interface body are pivotable on the display panel from an operating position to a storage position covering and protecting the electronic display;
   d. at least one suspension device attachment attached to one of the display panel and the operator body prop wherein the suspension device attachment is located in a central attachment zone.

15. The system of claim 14 wherein the interface body is further comprised of a structure selected from a group consisting of an operator tool, a length adjuster, a length adjuster holder and an extension.

16. The system of claim 15 wherein the operator tool is comprised of a structure selected from a group consisting of an eyeglass holder, an audio wire storage device, an audio speaker wire, an automatic audio wire storage device, a storage chamber, a stylus holder, a writing tool holder, a clip to hold paper and a writing station with a writing surface.

17. The system of claim 15 wherein the operator tool is an electronic operator tool.

18. The system of claim 17 wherein the electronic operator tool is comprised of a structure selected from a group consisting of an electronic keyboard, an electrical speaker, an electrical microphone, an electronic calculator, an electrical battery, an electromagnetic wave transmitter, an electromagnetic wave receiver, an electronic write pad, an electronic touch pad, an electronic control, electrical connection socket, and a computer pointing device.

19. The system of claim 14 further comprised of a suspension device attachable to the suspension device attachment wherein the suspension device is one of a filament and a strap.

20. The system of claim 14 wherein the suspension device attachment is located near the junction of the display panel and the operator body prop.

21. The system of claim 14 wherein the lateral stability member of the operator body interface is further comprised of a structure selected from a group consisting of a right interface leg and left interface leg, a right prop rod and left prop rod, and a shaping to compliment the operator's body.

22. The system of claim 14 wherein the friction enhancing feature is comprised of a structure selected from a group consisting of a leg, a blade, a point, a bump, a serration, a drum, a gripping projection, a elastomeric gripping projection, a rigid gripping projection, a ridge and a friction enhancing cup.

23. The system of claim 14 wherein the friction enhancing feature is comprised of a material selected from a group consisting of a gripping surface, a sticking material, an abrasive surface, an elastomeric material and a sticking pattern.

24. The system of claim 14 wherein the display panel is further comprised of one of an electromagnetic radiation first transmitter and an electromagnetic radiation first receiver.

25. The system of claim 14 wherein the back side of the display panel is further comprised of at least one manually operated electronic computer input control.

26. The system of claim 25 wherein the manually operated electronic computer input control is selected from a group consisting of a touch pad, a computer graphical user interface input device, a button, a pointing device and a pointing device clicker.

* * * * *